United States Patent [19]

Mochizuki

[11] Patent Number: 5,546,515
[45] Date of Patent: Aug. 13, 1996

[54] IMAGE PROCESSING APPARATUS

[75] Inventor: Yoshiyuki Mochizuki, Osaka, Japan

[73] Assignee: Matsushita Electric Industrial Co., Ltd., Osaka, Japan

[21] Appl. No.: 542,874

[22] Filed: Oct. 13, 1995

Related U.S. Application Data

[63] Continuation of Ser. No. 86,861, Jul. 7, 1993, abandoned.

[30] Foreign Application Priority Data

Jul. 8, 1992 [JP] Japan .................................. 4-180840

[51] Int. Cl.⁶ .................................................. G06F 15/00
[52] U.S. Cl. .................................................. 395/133
[58] Field of Search .............................. 395/133, 118, 395/120, 126, 127, 129, 132; 345/118, 132

[56] References Cited

U.S. PATENT DOCUMENTS 4,928,250  5/1990  Greenberg et al. ...................... 364/518

FOREIGN PATENT DOCUMENTS 2246057  1/1992  United Kingdom .

OTHER PUBLICATIONS

Goral et al.,"Modeling the Interaction of Light Between Diffuse Surface", Computer Graphics (SIGGRAPH '84 Proceedings), vol. 18, No. 3 pp. 213–22 (Jul. 1984).

Cohen et al., "The Hemi–Cube: A Radiosity Solution for Complex Environments", Computer Graphics (SIGGRAPH '85 Proceedings), vol. 19, No. 3, pp. 31–40 (Jul. 1985).

Immel et al., "A Radiosity Method For Non–Diffuse Environments", Computer Graphics, vol. 20, No. 4, pp.133–42 (Aug. 1980).

Trumbore et al., "A Testbed For Image Synthesis",Eurographics '91, pp. 467–480 (Sept. 1991).

Yilmaz et al., "A Hardware Algorithm For Fast Realistic Image Synthesis", Advances In Computer Graphics Hardware IV, pp. 37–60, 1991.

*Primary Examiner*—Phu K. Nguyen
*Attorney, Agent, or Firm*—McDermott, Will & Emery

[57] ABSTRACT

In the radiosity calculation, the intersection decision is effected by the ray-casting method with respect to one portion of element of the polygon interior with the use of the coherence of the dodow so as to obtain the illumination intention and the interpolation domain of the form-factor from the intersection decision results. As the radiosity calculation is effected in accordance with the algorithm that the linear, non-linear interpolation equations are properly used in accordance with the precision to use the interpolation calculation in the interior portion the interpolation domain, the intersection decision frequency is sharply reduced so that the whole processing can be effected with higher speed.

22 Claims, 16 Drawing Sheets

ELEMENT

ELEMENT

FIG. 18

| SAMPLING ELEMENT | $a_{11}$ | $b_{11}$ | $c_{11}$ | $d_{11}$ | $e_{11}$ | $a'_{11}$ | $b'_{11}$ | $c'_{11}$ |
|---|---|---|---|---|---|---|---|---|
| ELEMENT NO.1 ↑ (SHOOTING PATCH-i) ↓ ELEMENT NO.$ne_i$ | $F_{j_1 i_1}$ ↕ $F_{j_1 i ne_i}$ | $F_{j_2 i_1}$ ↕ $F_{j_2 i ne_i}$ | $F_{j_3 i_1}$ ↕ (APPLYING $F_{j_3 i ne_i}$ | $F_{j_4 i_1}$ ↕ SAMPLING $F_{j_4 i ne_i}$ | $F_{j_5 i_1}$ ↕ METHOD) $F_{j_5 i ne_i}$ | $F_{j_6 i_1}$ ↕ $F_{j_6 i ne_i}$ | $F_{j_7 i_1}$ ↕ $F_{j_7 i ne_i}$ | $F_{j_8 i_1}$ ↕ $F_{j_8 i ne_i}$ |
| ELEMENT NO.1 ↑ (SHOOTING PATCH-j) ↓ ELEMENT NO.$ne_i$ | $F_{j_4 i_1}$ $F_{j_1 i_1}$ ↕ $F_{j_2 i_1}$ $F_{j_6 i_1}$ ↕ $F_{j_3 i_1}$ $F_{j_8 i_1}$ ↕ $F_{j_7 i_1}$ $F_{j_5 i_1}$ | $F_{j_4 i_2}$ $F_{j_1 i_2}$ ↕ $F_{j_2 i_2}$ $F_{j_6 i_2}$ ↕ $F_{j_3 i_2}$ $F_{j_8 i_2}$ ↕ $F_{j_7 i_2}$ $F_{j_5 i_2}$ | $F_{j_4 i_3}$ $F_{j_1 i_3}$ ↕ $F_{j_2 i_3}$ $F_{j_6 i_3}$ ↕ $F_{j_3 i_3}$ $F_{j_8 i_3}$ ↕ $F_{j_7 i_3}$ $F_{j_5 i_3}$ | $F_{j_4 i_4}$ $F_{j_1 i_4}$ ↕ $F_{j_2 i_4}$ $F_{j_6 i_4}$ ↕ (APPLYING $F_{j_3 i_4}$ $F_{j_8 i_4}$ ↕ $F_{j_7 i_4}$ $F_{j_5 i_4}$ | $F_{j_4 i_5}$ $F_{j_1 i_5}$ ↕ $F_{j_2 i_5}$ $F_{j_6 i_5}$ ↕ SAMPLING METHOD) $F_{j_3 i_5}$ $F_{j_8 i_5}$ ↕ $F_{j_7 i_5}$ $F_{j_5 i_5}$ | $F_{j_4 i_6}$ $F_{j_1 i_6}$ ↕ $F_{j_2 i_6}$ $F_{j_6 i_6}$ ↕ $F_{j_3 i_6}$ $F_{j_8 i_6}$ ↕ $F_{j_7 i_6}$ $F_{j_5 i_6}$ | $F_{j_4 i_7}$ $F_{j_1 i_7}$ ↕ $F_{j_2 i_7}$ $F_{j_6 i_7}$ ↕ $F_{j_3 i_7}$ $F_{j_8 i_7}$ ↕ $F_{j_7 i_7}$ $F_{j_5 i_7}$ | $F_{j_4 i_8}$ $F_{j_1 i_8}$ ↕ $F_{j_2 i_8}$ $F_{j_6 i_8}$ ↕ $F_{j_3 i_8}$ $F_{j_8 i_8}$ ↕ $F_{j_7 i_8}$ $F_{j_5 i_8}$ |

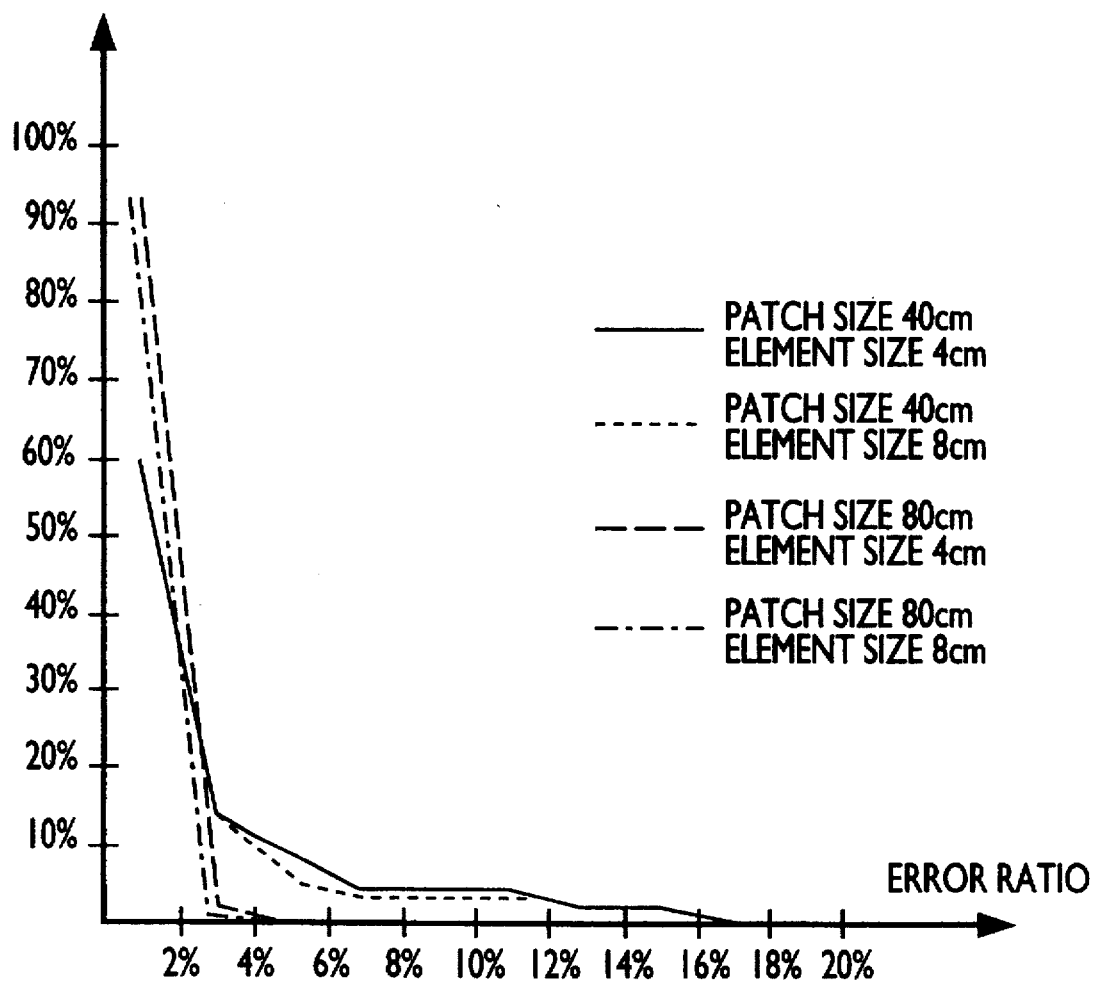

IMAGE PROCESSING APPARATUS

This is a continuation of application Ser. No. 08/086,861 filed Jul. 7, 1993 abandoned.

BACKGROUND OF THE INVENTION

The present invention generally relates to image production using a radiosity method which is one of arts for obtaining the irradiance of the body surface in a tertiary dimension space in a computer graphic field.

In recent years, the radiosity method noteworthy in real image producing art is an algorithm which assumes the body surface in the tertiary dimension space as diffuse surface, calculating the irradiance values of the body surface, considering interreflection. The radiosity means energies per unit time, unit area in the radiating operation of, by light receiving faces, the light received directly from a light source and the light received indirectly by the interreflection. The radiosity is often mixed with illumination, because it is equal to the radiation, in terms of unit, in the light engineering. (In the present patent, the radiosity is used in the mixture with the illumination.) The calculation art is a step of dividing the body surface into mesh shaped elements as in the general numeral calculation and obtaining the radiation illumination, considering form-factors with respect to the elements by one. It is a step lose to a boundary element method in terms of this fact.

An article, Goral, Cindy M., Torance, Kenneth e., Greenberg, Donald P., "Modeling The Interaction of Light between Diffuse Surface", Computer Graphics (SIGGRAPH'84 proceedings), vol. 18, no. 3, pp213–222, July 1984, has known the algorithm generally for the first time in the field of computer graphics.

A big difference is in that an intersection processing (hidden face processing) used in the field of the computer graphics conventionally is applied as a step of effecting a processing operation of taking the complexes into consideration with the form of the body of the calculation object and the positional elation between the bodies being very complex. Non-linear elements are added because of the above described complex. Judgment is required to be made as to whether lights from the light source or the reflection lights from a certain faces reaches the bodies of the target, namely, a body to be covered exists between them. The intersection test processing operation is provided to effect the processing operation.

In the intersection test processing operation, the processing time is largest during he radiosity calculation processing operation. The high speed of the intersection test processing operation is the most useful effect in the higher sped operation of the radiosity calculation.

In an article, Cohen, Michael F., Greenberg, Donald P., "The Hemi-Cube: A radiosity Solution for Complex Environments factor", Computer Graphics (SIGGRAPH'85 Proceedings), vol. 19, no.3, pp 31–40, July 1985, a Hemi-Cube method applying z buffer method as one step of the higher speed of the intersection test is announced for the fist time. In addition to the Hemi-Cube method, there are many articles about the Henmi-Cube method.

SUMMARY OF THE INVENTION

In the above described article, the form to be handled is rectangular polygon, but does not handle the general square and triangular polygons. General square, triangles have to be handled so as to raise the degree of freedom of a body to be used for produced images. It is a problem whether or not the forms can be handled especially so as to make optional curved surfaces approximate in plane. It is necessary to develop a producing method of a patch and an element where the general square and triangle form are better in precision, and the struggling of accuracy is less within the polygon. As a method of fast illumination mapping method with better accuracy with respect to the general squares and the triangle polygons when images are actually produced on the display apparatus with the use of the obtained illumination distribution.

Hardware cost becomes higher in either cases, because z buffer has to be provided as software or hardware when the Hemi-Cube method as the higher speed of the intersection test. Especially, in the parallel processing operation, a plurality of z buffers have to be provided, or z buffers capable of simultaneous access operation in order to provided the parallel effect. Hardware cost is highest so as to provide z buffers. The Hemi-Cube method has fatal defect in that polygon (element) smaller than the grid size are buried among the grids so that the polygons can not be grasped (which is often caused as the distance to the object body becomes far). As a solution over the defect is considered to effect an intersection test by a ray-casting method, instead of the hemi-cube method. In the ray-casting, the paralyzing operation is easier, parallel effect can be produced with better efficiency, a situation where the grasping operation cannot be effected as in the hemi-cube method is not caused. The intersection test is conventionally effected with the ray-casting method with respect to the all the elements of the object body, with a defect that the processing time is required most. The number of the intersection tests are sharply reduced by a step of the present patent considered the solving method, which is a method of effecting an intersection test with a ray-casting method with respect to the element of one portion within the polygon with the suc of the shady coherence, the interpolation region of the illumination, form-factor from the intersection test result so as to interpolate the interior of the interpolation region. The problem is in that the calculation representative points are required to become lattice points for easier interpolation with a producing method of the patch and element for easy interpolation.

Accordingly, the present invention has been developed with a view to substantially eliminating the above discussed drawbacks inherent in the prior art, and has for its essential object to provide an image producing apparatus.

Another important object of the present invention is to provide an image producing apparatus for effecting illumination calculation with a step of effecting an intersection test with the element of sampled one portion within the polygon, obtaining the interpolation region of the illumination and the form-factor from the intersection test result, interpolating the interior of the interpolation region with a ray-casting method where the calculation accuracy is better even with the general square and the triangle, the struggling of the precision is less within polygon, the production of the patch and element so that the calculation representative pint may become lattice points, the parallel is easier, the efficiency of the parallel effect is higher. Still another object is to provide a triangle illumination mapping apparatus and a square illumination mapping apparatus where the illumination napping is effected with better precision and the higher speed even with the general square and the triangle with the suc of the obtained illumination distribution.

The image producing apparatus of the present invention is composed of a patch producing apparatus, a patch information storing apparatus, an element producing apparatus, an element information storing apparatus, a direct illuminance calculation apparatus, a patch illumination intensity calculating apparatus, a direct illuminance calculation apparatus, an illumination intensity distribution storing apparatus, an illumination intensity distribution output apparatus, an illumination intensity distribution input apparatus, a control apparatus external input, output interface apparatus, a data bus, a control signal line. The patch producing apparatus, the patch information storing apparatus, the element producing apparatus, the element information storing apparatus, the direct illuminance calculation control apparatus, the patch illumination intensity calculating apparatus, the interreflection illuminance calculating apparatus, the illumination intensity distribution storing apparatus, the illumination intensity distribution output apparatus, the illumination intensity distribution input apparatus, the external input, output interface apparatus are connected with the data bus. The patch producing apparatus inputs the polygon information composed of vertex coordinates of polygon for defining a body to be inputted from the external apparatus through the external input, output interface apparatus, and the data bus, a reflectivity, an identifier for giving identification as to whether the polygon is a triangular polygon, a general square polygon, a parallelogram polygon, produces a patch information composed of coordinates of the calculation representative point position of a patch which becomes a unit of radiation at the interpolation calculation and the interreflection illuminance calculation, the vertex coordinates of the patch, the area of the patch, the normal vector, the reflectivity, the identification number. The above described patch information storing apparatus stores the patch information produced by the above described patch producing apparatus to be transferred through the above described data bus. The element producing apparatus reads through the above described data bus the patch information stored in the above described patch information storing apparatus so as to produce the element information composed of the coordinates of the calculation representative point position of the element which is a calculation unit at the direct illuminance calculation time and the interreflection illuminance calculation time, the area of the element, the normal vector, the reflectivity and the identification number. The above described element information storing apparatus stores the element information produced by the above described element producing apparatus to be transferred through the above described data bus. The above described direct illuminance calculation apparatuses is composed of an illumination intensity interpolation domain deciding apparatus, an intersection test apparatus, an illumination intensity calculating apparatus, an illumination intensity interpolation calculating apparatus, a patch internal illumination intensity distribution storing apparatus, a direct illuminance outputting apparatus, a direct illuminance calculation controlling apparatus, an internal data bus, an internal control signal line. The above described internal data bus is connected with the above described data bus. The above described illumination intensity interpolation domain deciding apparatus connected with the internal data bus reads the patch information from the above described patch information storing apparatus through the above described internal data bus, reads out from the above described element information storing apparatus the element information of the element to be included in the patch interior, selects the sample element from within the element, effects the intersection test by checking the presence of the screening body between the light source and the sample element calculation representative point by the above described intersection test apparatus connected with the internal data bus with the use of the light source information inputted from the external apparatus through the above described external input, output interface apparatus and the above described data bus the external apparatus composed of additional information of the light source intensity, the coordinates of the position of the light source, the type of the light source and the direction dependence and so on with respect to the sample element, refers the boundary of the interpolation domain of the illumination intensity and the shadow domain of the shadow by the intersection test result so as to decide the interpolation domain of the illumination intensity and the shadow domain. The illumination intensity calculating apparatus connected with the internal data bus calculates the illumination intensity value in the calculation representative point of the element which becomes a basic point of the interpolation in the element to be included in the illumination intensity interpolation domain with the use of the element information and the light source information, transfers the obtained illumination intensity value to the above described patch internal illumination intensity distribution storing apparatus connected with the above described illumination intensity calculation apparatus and the above described illumination intensity interpolation calculating apparatus in a condition where the illumination intensity value in the calculation representative point of the element within the above described patch is initialized to 0 so as to renew, store to a value for obtaining the illumination intensity value in the calculation representative point of the element. The above described illumination intensity interpolation calculating apparatus connected with the above described internal data bus calculates by an interpolation calculation of the illumination intensity value in the representative point of the remaining element within the representative intensity interpolation domain, transfers the obtained value to the above described patch internal illumination intensity distribution storing apparatus so as to renew, store to a value for obtaining the illumination intensity value in the calculation representative point of the element. The above described patch internal illumination intensity distribution storing apparatus and the above described direct light illumination intensity output apparatus connected with the internal data bus completes the calculation of the illumination intensity value in the calculation representative point of all the elements within the illumination intensity interpolation domain by the above described illumination intensity interpolation calculating apparatus, thereafter transfers, stores through the above described internal data bus and the above described data bus the data stored in the above described patch internal illumination intensity distribution storing apparatus to the illumination intensity distribution storing apparatus as the illumination intensity value and the non-radiation energy value (unshot value). After the transferring operation, the above described patch internal illumination intensity distribution storing apparatus effects the above described direct illuminance calculation with respect to all the patches with the illumination intensity value being initialized to the condition of 0, and repeats the direct illuminance calculation with respect to all the patches by the number of the light sources when the number of the light sources is plural. The above described direct light calculation controlling apparatus is connected with the above described illumination intensity interpolation domain deciding apparatus, the above described intersection testing apparatus, the above described illumination intensity calculating apparatus, the above described patch internal illumination intensity distribution storing apparatus, the above described illumination intensity interpolation calculating apparatus, the above described direct light illumination intensity calculating apparatus, the above described internal signal line, and effects the scheduling management and the operation controlling through the internal signal line. The above described patch illumination intensity calculating apparatus calculates the illumination intensity value in the calculation representative point of the patch from the illumination intensity value in the calculation representative point of the element stored in the above described illumination intensity distribution storing apparatus, and calculated in the above described direct light calculating apparatus so as to transfer, store it to the above described illumination intensity distribution storing apparatus. The above described indirect light calculating apparatus refers a patch for retaining the maximum non-radiation energies with the illumination intensity value in the calculation representative point of the element stored in the above described illumination intensity distribution storing apparatus being provided as the initial value of the non-radiation energies (unshot value) in the calculation representative point of the element, the illumination intensity value in the calculation representative point of the patch being provided as the initial value of the non-radiation energies in the calculation representative point of the patch so as to effect the threshold decision with the square of the interval between the calculation representative point of the patch for retaining the maximum non-radiation energies and the calculation representative point of the element which becomes an object of the radiation, and the area radio of a patch for retaining the maximum non-radiation energies. The indirect light calculating apparatus effects the intersection test between the calculation representative point of the patch for retaining the maximum non-radiation energy and the calculation representative point of the element which becomes an object of the radiation if the ratio is a threshold value or lower. Only when the intersection is not effected, a form-factor value showing a proportion as to how much radiosity reaches to the element which becomes the object of the radiation from the patch for retaining the maximum non-radiation energies. A renewing calculating operation is effected of adding the reflectivity of an element which becomes an object of the radiation, the non-radiation energies of the patch for retaining the maximum non-radiation energies, and the form-factor value, a value multiplied by a ratio in area between an element which becomes an object of radiation and a patch for retaining the maximum non-radiation energies to an illumination intensity value in the calculation representative point of the element which becomes an object of the radiation and the non-radiation energy value so as to transfer, store the calculated value in renewal to the above described illumination intensity distribution storing apparatus. When the ratio is larger than the threshold value, the patch for retaining the maximum non-radiation energies is decomposed into composing elements, a series of operations for transferring, storing to the above described illumination intensity distribution storing apparatus after the renewal calculation from the intersection test for each element, a series of operations for transferring, storing into the above described illumination intention distribution storing apparatus are effected to all the radiation object elements after the renewal calculating operation from the above described threshold value judgment, thereafter the non-radiation energy value of the patch for retaining the maximum non-radiation energies is made 0, the patch illumination intensity is calculated from the element illumination value, a patch operation for newly retaining the maximum non-radiation energies is referred to, a series of processing operation for effecting the radiation is repeated by a specified time or until the total value of the non-radiation energies becomes a specified value or less. The above described illumination intensity distribution outputting apparatus outputs to the external portion apparatus through the above described eternal input, output interface apparatus and the above described bus the illumination intensity distribution stored in the above described illumination intensity distribution storing apparatus, at an optional time point specified by the above described controlling apparatus. The above described controlling apparatus converts into the internal data form the illumination intensity distribution to be inputted from the external apparatus through the above described external input, output interface apparatus and the above described bus to transfer, store the converted data into the above described illumination intensity distribution storing apparatus. The above described controlling apparatus is connected with the above described patch producing apparatus, the above described patch information storing apparatus, the above described element producing apparatus, the above described element information restoring apparatus, the above described direct light calculation controlling apparatus, the above described patch illumination intensity calculating apparatus, the indirect light calculating apparatus, the above described illumination intensity distribution storing apparatus, the above described illumination intensity distribution outputting apparatus, the above described illumination intensity distribution inputting apparatus, the above described controlling signal line. The scheduling management and the operation controlling are effected through the above described controlling signal line.

In order to solve the above described problem points, in the patch producing apparatus of the present invention, the patch decomposition number $n_p$ is obtained with $$n_p=[(\text{maximum side})/(\text{decomposition width})] \quad (1)$$

$$(\text{where } [\times]) \quad (2)$$

is a minimum of integer x or larger) with the use of the patch decomposition width given from the external portion when the positional vectors of the vertex are a, b, c with respect to the triangular polygon ABC, each side is equally divided, the equally dividing point corresponding between the adjacent locations are connected with the line segment, the triangular patch is divided into a normal direction triangular patch congruent to each other similar to the former triangular polygon ABC of the $n_p(n_p-1)/2$ directed in a direction opposite to the same direction as the former triangular polygon ABC, an inverse triangular patch congruent to each other similar to the former triangular polygon ABC of the $n_p(n_p-1)/2$ directed in the direction opposite to the former triangular polygon ABC, an ij integer coordinate system is composed with i axis being provided in parallel to a side AB, a j axis parallel to a side BC with a normal direction triangular patch including a vertex A being provided as a base with respect to the normal direction triangular patch, identification numbers are attached in accordance with $$a_m' = m - \quad (3)$$

$$\frac{k^2}{2} + \frac{2n_p+1}{2} \quad i - n_p; m = 1,2,\ldots,n_p; i = 1,2,\ldots,n_p$$

a k axis parallel to a side AB, a l axis parallel to a side BC with an inverse direction triangular patch closest to a vertex A being provided as a base with respect to the inverse triangular patch so as to constitute a kl integer coordinate system, identification numbers are attached in accordance with $$\beta_m{}^j = m - \frac{j^2}{2} + \frac{2n_p - 1}{2} j + \frac{n_p(n_p - 1)}{2} \cdot m = \quad (4)$$

$$2, 3, \ldots, n_p; j = 1, 2, \ldots, n_p - 1$$

a positional vector x of the representative point of the normal direction triangular patch of (i,j) in the ij coordinate system is obtained $$x = \frac{(3n_p - 3m + 1)a + (3m - 3i + 1)b + (3i - 2)c}{3n_p} \cdot m = \quad (5)$$

$$1, 2, \ldots, n_p; i = 1, 2, \ldots, m$$

is obtained, the positional vectors p, q, r of the normal direction triangular patch vertex in the (i,j) is obtained, $$p = \frac{(n_p - m + 1)a + (m - i)b + (i - 1)c}{n_p} \; ; m = \quad (6)$$

$$1, 2, \ldots, n_p, i = 1, 2, \ldots, m$$

$$q = \frac{(n_p - m)a + (m - i + 1)b + (i - 1)c}{n_p} \; ; m = \quad (7)$$

$$1, 2, \ldots, n_p, i = 1, 2, \ldots, m$$

$$r = \frac{(n_p - m)a + (m - i)b + ic}{n_p} \quad 1, 2, \ldots, n_p, i = 1, 2, \ldots, m \quad (8)$$

the positional vertex x of the calculation representative point of the inverse direction triangular patch in the kl coordinates system is obtained by $$x = \frac{(3n_p - 3m + 2)a + (3m - 3j - 1)b + (3j - 1)c}{3n_p} \; ; m = \quad (9)$$

$$2, \ldots, n_p; j = 1, 2, \ldots, m - 1$$

the positional vectors p, q, r of vertex of the inverse direction triangular patch in the (k, l) are obtained by $$p = \frac{(n_p - m)a + (m - j)b + jc}{n_p} \; ; m = \quad (10)$$

$$1, 2, \ldots, n_p, i = 1, 2, \ldots, m - 1$$

$$q = \frac{(n_p - m + 1)n + (m - j - 1)b + jc}{n_p} \; ; m = \quad (11)$$

$$1, 2, \ldots, n_p, i = 1, 2, \ldots, m - 1$$

$$r = \frac{(n_p - m + 1)a + (m - j)b + (j - 1)c}{n_p} \; ; m = \quad (12)$$

$$1, 2, \ldots, n_p, i = 1, 2, \ldots, m - 1$$

the normal vector of the normal direction triangular patch, the inverse direction triangular patch are obtained when the former coordinate system is the right-hand coordinate system is obtained by $$(\text{Normal vector}) = \frac{\overline{AB} \times \overline{AC}}{\|\overline{AB} \times \overline{AC}\|} \quad (13)$$

the normal vector of the normal direction triangular patch, the inverse direction triangular patch are obtained by, in the case of the left-hand coordinate system, $$(\text{Normal vector}) = \frac{\overline{AC} \times \overline{AB}}{\|\overline{AC} \times \overline{AB}\|} \quad (14)$$

the area of the normal direction triangular patch, the inverse direction triangular patch are obtained by $$(\text{area of decomposition triangle}) = \frac{1/2\|\overline{AB} \times \overline{AC}\|}{n^2} \quad (15)$$

the reflectivity is adapted to produce the patch information by the use of the value the same as the former triangular polygon ABC.

In order to solve the above described problem points, the patch reproducing apparatus of the present invention obtains by the patch decomposition number $n_p$ by an equation (1) with the use of the patch decomposition width given from the outside when the positional vectors of the vertex are provided a, b, c, d with respect to the general square polygon ABCD. Each side ad the diagonal line AC are equally divided into $n_p$, the real dividing point of each side and the equal dividing point corresponding of the diagonal line are connected with line segments, square patch is divided into the parallel square patch congruent to each other of two types of $n_p(n_p-1)/2$ and a general square patch congruent to each other similar to the former general square polygon ABCD of the $n_p$ number, an i axis is provided along a side AB and a j axis along the side AID are provided with the general square patch including the vertex A being provided as a base so as to compose an ij integer coordinate system. Identification numbers are attached in accordance with $$\alpha_i{}^j = n_p(j-1)+i \quad (16)$$

It is obtained by $$x = \frac{(2n_p - 2i + 1)a + (2i - j)b + (2j - 1)c}{2n_p} \; ; i,j = 1, 2, \ldots, n_p \quad (17)$$

when the positional vector x of the calculation representative point of the general square, the parallel square of the (i,j) in the ij coordinate system is i>j. It is obtained by $$x = \frac{(4n_p - 4i + 1)a + b + (4j - 3)c + d}{4n_p} \; ; i,j = 1, 2, \ldots, n_p \quad (18)$$

when i=j, $$x = \frac{(2n_p - 2j + 1)a + (2j - i)d + (2i - 1)c}{2n_p} \; ; i,j = 1, 2, \ldots, n_p \quad (19)$$

when j<j, It is obtained by $$p = \frac{(n_p - i + 1)a + (i - j)b + (j - 1)c}{n_p} \; ; i,j = 1, 2, \ldots n_p \quad (20)$$

$$q = \frac{(n_p - i)a + (i - j + 1)b + (j - 1)c}{n_p} \; ; i,j = 1, 2, \ldots n_p \quad (21)$$

$$r = \frac{(n_p - i)a + (i - j)b + jc}{n_p} \; ; i,j = 1, 2, \ldots n_p \quad (22)$$

$$s = \frac{(n_p - i + 1)a + (i - j - 1)b + jc}{n_p} \; ; i,j = 1, 2, \ldots n_p \quad (23)$$

when the positional vectors p, q, r, s of the vertex of the general square, the parallel square patch in the (i, j) is i >j. It is obtained by $$p = \frac{(n_p - i + 1)a + (i - 1)c}{n_p} \; ; i,j = 1, 2, \ldots n_p \quad (24)$$

$$q = \frac{(n_p - i)a + b + (i - 1)c}{n_p} \; ; i,j = 1, 2, \ldots n_p \quad (25)$$

$$r = \frac{(n_p - i)a + ic}{n_p} \; ; i,j = 1, 2, \ldots n_p \quad (26)$$

-continued $$s = \frac{(n_p - i)a + d + (i - 1)c}{n_p} \quad ; i,j = 1,2, \ldots n_p \quad (27)$$

when i=j. It is obtained by $$p = \frac{(n_p - j + 1)a + (j - i)d + (i - 1)c}{n_p} \quad ; i,j = 1,2, \ldots n_p \quad (28)$$

$$q = \frac{(n_p - j + i)q + (j - i - 1)d + ic}{n_p} \quad ; i,j = 1,2, \ldots n_p \quad (29)$$

$$r = \frac{(n_p - j)a + (j - i)d + ic}{n_p} \quad ; i,j = 1,2, \ldots n_p \quad (30)$$

$$s = \frac{(n_p - j)a + (j - i + 1)d + (i - 1)c}{n_p} \quad ; i,j = 1,2, \ldots n_p \quad (31)$$

when i<j. The normal vector of the general square, the parallel square patch is obtained, when the former coordinate system is the right-hand coordinate system, by $$(\text{Normal vector}) = \frac{\overline{AB} \times \overline{AD}}{\|\overline{AB} \times \overline{AD}\|} \quad (32)$$

the normal vector of the general square, the parallel square patch is obtained by, in the case the left-hand coordinate system, $$(\text{normal vector}) = \frac{\overline{AD} \times \overline{AB}}{\|\overline{AD} \times \overline{AB}\|} \quad (33)$$

The area of the general square, the parallel square patch in the (i,j) is obtained by $$(\text{patch area}) = \frac{\|\overline{AB} \times \overline{AC}\|}{n_p^2} \quad (34)$$

when i>j. It is obtained by $$(\text{patch area}) = \frac{1/2\|\overline{AB} \times \overline{AC}\|}{n_p^2} + \frac{1/2\|\overline{AD} \times \overline{AC}\|}{n_p^2} \quad (35)$$

when i=j. It is obtained by $$(\text{patch area}) = \frac{\|\overline{AD} \times \overline{AC}\|}{n_p^2} \quad (36)$$

reflectivity is adapted to produce the patch information by the use of the same value as the former triangular polygon ABCD.

In order to solve the above described problems, the patch producing apparatus of the present invention obtains the patch decomposition numbers $m_p$, $n_p$ by $$n_p = \left[ \frac{AB}{(\text{decomposition width})} \right] \quad (37)$$

$$m_p = \left[ \frac{AD}{(\text{decomposition width})} \right] \quad (38)$$

with the use of the patch decomposition width given from outside when the positional vectors of the vertex are made a, b, c, d a with respect to the parallel square polygon ABCD. The sides AB, CD are equally divided into $n_p$, the sides BC, DA are equally divided into $m_p$, equal dividing points corresponding to the opposite sides are connected with line segments, are divided into parallel square patch congruent to each other similar to the former parallel square polygon ABCD of $m_p \times n_p$ number, an ij integer coordinate system is composed with an i axis being provided along a side AB, a j axis along a side AD with the parallel quadrilateral polygon patch including the vertex A being provided as a reference. The positional vertex x of the calculation representative point of the parallel quadrilateral patch of the (i,j) with the ij coordinate system with identification numbers being attached in accordance with the equation (17). The positional vector x of the calculation representative point of the (i,j) in the ij coordinates system is by $$x = \frac{(2m_p - 2j + 1)\{(2n_p - 2i + 1)a + (2i - 1)b\} +}{4m_p n_p} \quad (39)$$
$$\frac{(2j - 1)\{(2n_p - 2i + 1)d + (2i - 1)c\}}{4m_p n_p}$$

The positional vectors p, q, r, s of the vertex of the parallel quadrilateral patch in the (i, j) is obtained by $$p = \frac{(m_p - j + 1)\{(n_p - i + 1)a + (i - 1)b\} +}{m_p n_p} \quad (40)$$
$$\frac{(j - 1)\{(n_p - i + 1)d + (i - 1)c\}}{m_p n_p} \quad ;$$
$$i = 1, 2, \ldots, n_p; j = 1, 2, \ldots, m_p$$

$$q = \frac{(m_p - j + 1)\{(n_p - i)a + ib\} + (j - 1)\{(n_p - i)d + ic\}}{m_p n_p} \quad ; \quad (41)$$
$$i = 1, 2, \ldots, n_p; j = 1, 2, \ldots, m_p$$

$$r = \frac{(m_p - j)\{(n_p - i)a + ib\} + j\{(n_p - i)d + ic\}}{m_p n_p} \quad ; \quad (42)$$
$$i = 1, 2, \ldots, n_p; j = 1, 2, \ldots, m_p$$

$$s = \frac{(m_p - j)\{(n_p - i + 1)a + (i - 1)b\} +}{m_p n_p} \quad (43)$$
$$\frac{j\{(n_p - i + 1)d + (i - 1)c\}}{m_p n_p} \quad ;$$
$$i = 1, 2, \ldots, n_p; j = 1, 2, \ldots, m_p$$

When the former coordinate system is the right-hand coordinate system, the normal vector of the parallel quadrilateral patch is obtained by the equation (32). When the former coordinate system is the left-hand coordinate, the normal vector of the parallel quadrilateral patch is obtained by the equation (33), the area of the parallel quadrilateral patch is obtained by $$(\text{area of decompositional quadrilateral}) = \frac{\|\overline{PQ} \times \overline{PS}\|}{m_p n_p} \quad (44)$$

The reflectivity produced the patch information with the use of the same value as the former parallel quadrilateral polygon ABCD.

In order to solve the above described problem, the element producing apparatus of the present invention decides the element decomposition width from the distance between the light source and the patch for effecting the radiation, the radio of the maximum side of the triangle patch ABC, and the inclination of the shadow boundary with respect to the triangle patch ABC so as to obtain the element decomposition number Ne $$n_e = [(\text{patch maximum}) / (\text{decomposition width})] \quad (45)$$

when the positional vectors of the vertex are made a, b, c with respect to the triangle patch ABC. The respective sides are equally divided with the equal dividing points corresponding to the side BC from the equal dividing point of the side AB, CA being connected with line segments, are divided into a parallel quadrilateral segment congruent to each other of ne (ne−1)/2 number and a triangular element congruent to each other similar to the former triangular patch ABC of ne number, an ij integer coordinate system is provided with an i axis parallel to the side AB, a j axis parallel to the side BC with the parallel quadrilateral element including vertex A as a reference with respect to the quadrilateral element, identification numbers are attached in accordance with $$a_m{}^i = m - \frac{i^2}{2} + \frac{2n_e - 1}{2} i - n_e + 1; \quad (46)$$

$$m = 1, 2, \ldots, n_e - 1; \; i = 1, 2, \ldots, m$$

A k integer coordinate system is provided with a k axis being provided parallel to the side BC with a triangular element including a vertex B being provided as a base with respect to the triangular element, the identification numbers are attached in accordance with $$\beta_i = \frac{n_e(n_e - 1)}{2} + i; \; i = 1, 2, \ldots, n_e \quad (47)$$

The positional vector x of the calculation representative point of the parallel quadrilateral element of the (i,j) in the ij coordinate system is obtained by $$x = \frac{(2(n_e - m)a + (2m - 2i + 1)b + (2i - 1)e}{2n_e}; \quad (48)$$
$$m = 1, 2, \ldots, n_e - 1; \; i = 1, 2, \ldots, m$$

The positional Vector x of the calculation representative point of the triangular element of the (k) in k coordinate system is obtained by $$x = \frac{a + (3n_e - 3i + 1)b + (3i - 2)c}{3n_e}; \quad (49)$$
$$i = 1, 2, \ldots, n_e$$

with the normal vector of the parallel quadrilateral element, the triangular element being made the same as the normal vector of the former triangular patch, the area of the parallel quadrilateral element is obtained by $$2 \frac{\text{(patch area)}}{n_e{}^2} \quad (50)$$

the area of the triangular element is obtained by $$\frac{\text{(patch area)}}{n_e{}^2} \quad (51)$$

the reflectivity produces the element information with the use of the same value as the former triangular patch ABC.

In order to solve the above described problems, the element producing apparatus of the present invention decides the element decomposition width from the distance between the light source and the patch for effecting radiation, the radio of the maximum of the general square patch ABCD and the inclination of the shadow boundary, when the positional vectors of the vertex are made a,b,c,d with respect to the general square patch ABCD. The element decomposition number ne is obtained by the equation (45), the respective sides and the diagonal lines AC are equally divided into ne, the equal dividing position of the respective sides and the equal dividing point corresponding to the diagonal line are connected with line segments, divided into the parallel quadrilateral element congruent to each other of two types of ne(ne–1)/2 number and into the general quadrilateral element congruent to each other similar to the former general square patch ABCD of ne number, an ij integer coordinate system is composed with an i axis being provided along a side AB, a j axis along the side AD with the general square element including the vertex A being provided as a reference, the identification numbers are attached in accordance with the $$\alpha_j{}^i = n_e(j-1)+i \quad (52)$$

it is obtained by $$x = \frac{(2n_e - 2i + 1)a + 2(i - j)b + (2j - 1)c}{2n_e}; \quad (53)$$
$$i, j = 1, 2, \ldots, n_e$$

when the positional vector x of the calculation representative point of the general square, parallel quadrilateral element of the (i, j) in the ij coordinate system is i>j, It is obtained by $$x = \frac{(4n_e - 4i + 1)a + b + (4j - 3)c + d}{4n_e}; \quad (54)$$
$$i, j = 1, 2, \ldots, n_e$$

when i=j. It is obtained by $$x = \frac{(2n_e - 2j + 1)a + 2(j - i)d + (2i - 1)c}{2n_e}; \quad (55)$$
$$i, j = 1, 2, \ldots, n_e$$

when i<j. It is obtained by $$(\text{area of element}) = \frac{\|\overrightarrow{AB} \times \overrightarrow{AC}\|}{n_e{}^2} \quad (56)$$

when the normal vector of the general square, the parallel quadrilateral element is made the normal vector the same as the former general square patch ABCD, the area of the general square, the parallel quadrilateral element is i>j. It is obtained by $$(\text{area of element}) = \frac{1/2\|\overrightarrow{AB} \times \overrightarrow{AC}\|}{n_e{}^2} + \frac{1/2\|\overrightarrow{AD} \times \overrightarrow{AC}\|}{n_p{}^2} \quad (57)$$

when $i = j$, $$(\text{area of element}) = \frac{\|\overrightarrow{AD} \times \overrightarrow{AC}\|}{n_e{}^2} \quad (58)$$

when i<j, the reflectivity produces the element information with the use of the same value as the former general square patch ABCD.

In order to solve the above described problems, the element producing apparatus of the present invention decides the element decomposition width from the distance between the light source and the patch for effecting radiation, the radio of the maximum side of the parallel quadrilateral patch ABCD and the inclination of the shadow boundary, when the positional vectors of the vertex are made a,b,c,d with respect to the parallel quadrilateral patch ABCD. The element decomposition number $n_e$ is obtained by the equation (45), the respective sides are equally divided into $n_e$, the equal dividing points corresponding to the opposite sides are connected with line segments so as to divide into the parallel quadrilateral element congruent to each other similar to the former parallel quadrilateral patch ABCD of $n_e{}^2$ number to compose the ij integer coordinate system with the i axis being provided along the side AB, the j axis being provided along the side AD with the parallel quadrilateral element including the vertex A being provided as a reference. The identification numbers are attached in accordance with the equation (52). The positional vector x of the calculation representative point of the parallel quadrilateral element of the (i,j) in the ij coordinate system is obtained by $$x = \frac{(2n_e - 2j + 1)\{(2n_e - 2i + 1)a + (2i - 1)b\} + (2j - 1)\{(2n_e - 2i + 1)d + (2i - 1)c\}}{4n_e{}^2}; \quad (59)$$

13
-continued $$i, j = 1, 2, \ldots, n_e$$

The normal vector of the parallel quadrilateral element is made the same as the normal vector of the former quadrilateral patch. The area of the parallel quadrilateral patch is obtained by $$(\text{areaoftheelement}) = (\text{patcharea})/n_e^2 \tag{60}$$

The reflectivity produces the element information with the use of the same value as the former parallel quadrilateral patch ABCD.

In order to solve the above described problems, the interreflection illuminance calculating apparatus of the present invention is composed of a maximum non-radiation energy retaining patch referring apparatus, a radiation method deciding apparatus, a patch internal form-factor interpolation domain deciding apparatus on the radiation side, a patch internal form-factor interpolation domain deciding apparatus on the passive side, an intersection testing apparatus, a form-factor computing apparatus, a form-factor interpolation calculating apparatus, a patch internal form-factor storing apparatus on the radiation side, a patch internal form-factor storing apparatus on the passive side, a renewal calculating apparatus, a focus deciding apparatus, an interreflection illuminance calculation controlling apparatus, an internal data bus, an internal control signal line. The above described internal data bus is connected with the external data bus.

The maximum non-radiation energy retaining patch referring apparatus, a radiation method deciding apparatus, a patch internal form-factor interpolation domain dividing apparatus on the radiation side, a patch internal form-factor interpolation domain deciding apparatus on the passive side, an intersection testing apparatus, a form-factor calculating apparatus, a form-factor interpolation calculating apparatus, a renewal calculating apparatus are connected with the above described internal data bus. The above described maximum non-radiation energy retaining patch referring apparatus refers to a patch for retaining the maximum non-radiation energies. The above described radiation method deciding apparatus compares the distance between the calculation representative point between the calculation representative point of the patch for retaining the maximum non-radiation energies and the calculation representative point of the patch which becomes an object of the radiation, the area for the patch for retaining the maximum non-radiation energies with the area of the patch which becomes an object of the radiation so as to obtain a ratio with respect to the larger area value for deciding whether or not the ratio is a threshold value or lower. When the deciding result of the above described radiation method deciding apparatus is decided to be a threshold value or lower, the above described patch interval form-factor interpolation domain deciding apparatus on the passive side selects the sample element from the element of the patch interior of the radiation object, decides whether or not the radiation energies reach from the inner product between a vector where the calculation representative point of the patch for retaining the maximum non-radiation energies is made a start with resect to the sample element, the calculation representative point of the sample element is made an end, and the normal vector of the patch for retaining the maximum non-radiation energies, and the internal product with respect to the normal vector of the patch of the radiation object. An intersection test for checking whether or not a screening body exists between the

14 calculation representative point of the patch for retaining the maximum non-radiation energies and the calculation representative point of the sample element is effected by the above described intersection testing apparatus. The boundary between the interpolation domain of the form-factor and the shadow domain is referred to by the result as to whether or not the radiation energies reach, and the intersection deciding result. The above described form-factor calculating apparatus calculates the form-factor value to the element which becomes a base point of the interpolation from the patch for retaining the maximum non-radiation energies in the calculation representative point of the element which becomes the base point of the interpolation in the element to be included in the form-factor interpolation domain, transfers the form-factor value obtained in the above described passive side patch internal form-factor storing apparatus in a condition where the form-factor value in the calculation representative point of the element within the above described patch is initialized to 0, renews into an obtained value a form-factor value in the calculation representative point of the element. The above described form-factor interpolation calculating apparatus calculates with the interpolation calculation a form-factor value in the calculation representative point of the remaining element within the form-factor interpolation region, transfers a form-factor value obtained in the form-factor storing apparatus within the above described passive side patch, renews, stores a form-factor value in the calculation representative point of the element into the obtained value, obtains the form-factor value with respect to all the elements of the patch interior which is an object of the radiation. If it is stored in the form-factor storing apparatus within the patch on the passive side, the above described renewal calculating apparatus connected with the form-factor storing apparatus within the above described form-factor apparatus within the patch on the passive side effects a renewal calculation of adding to the illumination intensity value in the calculation representative point of the element which becomes an object of the radiation and the non-radiation energy value a value multiplied by a ratio among the reflectivity of the element which becomes an object of the radiation, the non-radiation energy of the patch for retaining the maximum non-radiation energies, a form-factor value, an area of the element which becomes an object of the radiation, the area of the patch for retaining the maximum non-radiation energies, outputs the renewal-calculated value into the internal data bus. When the decision result of the above described radiation method deciding apparatus has been decided larger than the threshold value, the above described radiation side patch internal form-factor interpolation domain deciding apparatus selects the sample element from the element for constituting a patch for retaining the maximum non-radiation energy with respect to the element for composing the patch for retaining the maximum non-radiation energies, decides whether or not the radiation energies reach from the internal product between a vector where the calculation representative point of the sample element within the patch for retaining the maximum non-radiation energies is made a start, the calculation representative point of the sample element within the patch element of the fixed radiation object is made an end and the normal vector of the patch for retaining the maximum non-radiation energies, and the internal product with respect to the normal vector of the patch of the radiation object. An intersection test for checking whether or not a screening body exists between the calculation representative point of the sample element within the patch for retaining the maximum non-radiation energies and the calculation representative point of the sample element within the patch of the fixed radiation object is effected by the above described intersection testing apparatus. The boundary between the interpolation domain of the form-factor within the patch for retaining the maximum non-radiation energy and the shadow domain is referred to by the decision result as to whether or not the radiation energies reach and the intersection deciding result so as to decide the interpolation domain of the form-factor and the shadow domain. The above described form-factor calculating apparatus calculates the form-factor value to the element which becomes a base point of the interpolation from the patch interior for retaining the maximum non-radiation energies from the sample element of the patch interior of the fixed radiation object in the calculation representative point of the element which becomes the base point of the interpolation into the element to be included in the form-factor interpolation domain of the interior of the patch for retaining the maximum non-radiation energies, transfers the form-factor value obtained in the above described passive side patch internal form-factor storing apparatus in a condition where the form-factor value in the calculation representative point of the element within the above described patch for retaining the maximum non-radiation energy is initialized to 0, renews to an obtained value a form-factor value in the calculation representative point of the element so as to store it. The above described form-factor interpolation calculating apparatus calculates with the interpolation calculation a form-factor value in the calculation representative point of the remaining element within the form-factor interpolation domain of the interior portion of the patch for retaining the maximum non-radiation energies, transfers a form-factor value obtained in the form-factor storing apparatus within the above described passive side patch, renews a form-factor value in the calculation representative point of the element into an obtained value so as to store it, obtains the form-factor value with respect to the sample element of the patch interior portion which becomes an object of the radiation. When a series of processing operations for storing it in the above described radiation passive side patch internal form-factor storing apparatus is effected with respect to all the sample segments in the element of the patch interior portion of the radiation object, the above described passive side patch internal form-factor interpolation domain deciding apparatus refers to the boundary of the interpolation domain of the form-factor of the patch interior which becomes an object of the radiation and the shadow domain by the result as to whether or not the radiation energies reach and the intersection decision results so as to decide the interpolation domain of the form-factor and the shadow domain in accordance with the form-factor value stored in the above described radiation side patch internal form-factor storing apparatus each time the element of the patch interior for retaining the maximum non-radiation energies is fixed by one. The above described form-factor calculating apparatus calculates the form-factor value to the element fixed by one in the patch interior portion for retaining the maximum non-radiation energies from the element which becomes the base point of the interpolation of the patch interior portion of the radiation object in the calculation representative point of the element which becomes the base point of the interpolation of the above describe element to be included in the form-fact interpolation domain of the patch interior which becomes the radiation object, transfers to the form-factor value obtained in the form-factor storing apparatus within the above described passive side in a condition where the form-factor value in the calculation representative point of the element of the patch interior portion which becomes an object of the radiation is initialized to 0, renews it to an obtained value the form-factor value in the calculation representative portion of the element so as to store it. The above described form-factor interpolation calculating apparatus calculates by the interpolation calculation the form-factor value in the calculation representative point of the remaining element within the form-factor interpolation domain of the patch interior portion which becomes the object of the radiation, transfers the form-factor value obtained in the form-factor storing apparatus within the patch on the passive side, renewals to an obtained value the form-factor value in the calculation representative point of the element so as to store it, obtains the form-factor value with respect to all the elements within the patch interior portion which becomes and object of the radiation. When it has been stored in the above described passive side patch internal form-factor storing apparatus, the above described renewal calculating apparatus connected with the above described passive side patch internal form-factor storing apparatus effects the renewal calculating operation of adding to the illumination intensity value in the calculation representative point of the element which becomes an object of the radiation and the non-radiation energy value a value with a form-factor value stored in the above described passive side patch internal form-factor storing apparatus being multiplied with the relativity of the element which becomes an object of the radiation and the non-radiation energies of the fixed composed element in the patch for retaining the maximum non-radiation energies in accordance with the form-factor value stored corresponding to all the elements of the patch interior portion which becomes an object of the radiation in the above described passive side patch internal form-factor storing apparatus, outputs to the above described internal data bus a value renewed in calculation, turns the non-radiation energy value of the patch for retaining the maximum non-radiation energies radiated to 0 if the processing to the above described renewal calculating apparatus from the above described radiation method deciding apparatus with respect to all the patches which become the objects of the radiation, calculates the patch illumination intensity from the illumination value of the obtained element, selects by the above described maximum non-radiation energies retaining patch referring apparatus the patch for retaining the newly maximum non-radiation energies, processes to the above described renewal calculating apparatus from the above described radiation method deciding apparatus. The above described focus deciding apparatus connected with the above described renewal calculating apparatus decides whether or not a series of processing to the above described renewal calculating apparatus from the above described radiation method deciding apparatus with respect to all the patches after the selection of the patch for retaining the maximum non-radiation energies has been repeated by a specified number or the total value of the non-radiation energies has been repeated to a specified value or lower. When it has become a specified value or lower, the completion signal is fed to the above described indirect light calculation controlling apparatus through the above described internal signal line. The above described indirect light calculation controlling apparatus is connected with the maximum non-radiation energy retaining patch referring apparatus, a radiation method deciding apparatus, a radiation side patch internal form-factor interpolation domain deciding apparatus, a passive side patch internal form-factor interpolation domain deciding apparatus, an intersection testing apparatus, a form-factor calculating apparatus, a form-factor interpolation calculating apparatus, a passive side patch internal form-factor storing apparatus, a passive side patch internal form-factor storing apparatus, a renewal calculating apparatus, a focus deciding apparatus with the above described internal signal lines. The scheduling management and the operation control are effected through the above described control signal lines. The processing operations are completed with the completion signal of the above described focusing deciding apparatus.

In order to solve the above described problems, the illumination intensity interpolation calculating apparatus of the present invention decides whether or not $$(\text{Min-threshold}) \leq \frac{\min(\|r_1\| \cdot \|r_3\|)}{R_1 R_3} \tag{61}$$

is satisfied by the illumination intensity interpolation equation selecting apparatus when the illumination intensity values B1, B3 are known in the case of the relation of $r2=tr1+(1-t)r3$, wherein the position of the point light source is L, the light intensity is G, points R1, R2, R3 are positions of the calculation representative points of the elements, illumination intensity values (radiosity values) in the points R1, R2, R3 are B1, B2, B3, the normal vector of the element is N, the reflectivity of the element is $\epsilon$, the vector (R1L) is r1, the vector (R2L) is r2, the vector (R3L) is r3. The interpolating calculation is effected in accordance with $$B_2 = tB_1 + (1-t)B_3 \tag{62}$$

by the interpolating calculating apparatus when satisfied. When not satisfied, the interpolating calculating operation is effected in accordance with $$B_2 = t \frac{\|r_1\|(c_0 + c_1\|r_1\| + c_2\|r_1\|^2)}{\|r_2\|(c_0 + c_1\|r_2\| + c_2\|r_2\|^2)} B_1 + \tag{63}$$

$$(1-t) \frac{\|r_3\|(c_0 + c_1\|r_3\| + c_2\|r_3\|^2)}{\|r_2\|(c_0 + c_1\|r_2\| + c_2\|r_2\|^2)} B_3$$

by the above described interpolation calculating apparatus.

In order to solve the above described problems, the illumination intensity interpolation calculating apparatus of the present invention decides whether or not $$(\text{Min-threshold}) \leq \frac{\min(\|r_1\| \cdot \|r_3\|)}{R_1 R_3} \tag{64}$$

is satisfied by the illumination intensity interpolation equation selecting apparatus when the illumination intensity values B1, B3 are already known in the case of the relation of $r2=tr1+(1-t)$, wherein a point L is a position of a direction dependent point light source, points R1, R2, R3 are positions of the calculation representative points of the elements, the illumination intensity values (radiosity values) in the points R1, F2, R3 are B1, B2, B3, the light intensity in the points R1, R2, R3 direction are G1, G2, G3, the normal vector of the element is N, the reflectivity of the element is $\epsilon$, the vector (R1L) is r1, the vector (R2L) is r2, the vector (R3L) is r3. The interpolation calculating operation is effected in accordance with $$B_2 = t \frac{G_2 \|r_1\|(c_0 + c_1\|r_1\| + c_2\|r_1\|^2)}{G_1 \|r_2\|(c_0 + c_1\|r_2\| + c_2\|r_2\|^2)} B_1 + \tag{65}$$

$$(1-t) \frac{G_2 \|r_3\|(c_0 + c_1\|r_3\| + c_2\|r_3\|^2)}{G_3 \|r_2\|(c_0 + c_1\|r_2\| + c_2\|r_2\|^2)} B_3$$

if $G1 \neq 0$ and $G3 \neq 0$ by the interpolation calculating apparatus when not satisfied. The interpolation calculating operation is effected in accordance with $$B_2 = \frac{G_2}{\|r_2\|(c_0 + c_1\|r_2\| + c_2\|r_2\|^2)} \left\{ tpr_1 \cdot N + \right. \tag{66}$$

$$\left. (1-t) \frac{\|r_3\|(c_0 + c_1\|r_3\| + c_2\|r_3\|^2)}{G_3} B_3 \right\}$$

if $G1=0$ and $G3 \neq 0$.

The interpolation calculating operation is effected in accordance with $$B_2 = \frac{G_2}{\|r_2\|(c_0 + c_1\|r_2\| + c_2\|r_2\|^2)} \left\{ t \frac{\|r_1\|(c_0 + c_1\|r_1\| + c_2\|r_1\|^2)}{G_1} B_1 + (1-t)pr_3 \cdot N \right\} \tag{67}$$

i $G1 \neq 0$ and $G3=0$. The interpolation calculating operation is effected in accordance with $$B_2 = \frac{G_2}{\|r_2\|(c_0 + c_1\|r_2\| + c_2\|r_2\|^2)} \{tpr_1 \cdot N + (1-t)pr_3 \cdot N\} \tag{68}$$

if $G1=0$ and $G3=0$. The interpolating calculation operation is effected in accordance with the $$B_2 = G_2 \left\{ t \frac{B_1}{G_1} + (1-t) \frac{B_3}{G_3} \right\} \tag{69}$$

if $G1 \neq 0$ and $G3 \neq 0$ by the above described interpolation calculating apparatus when satisfied. The interpolating calculating operation is effected in accordance with $$B_2 = G_2 \left\{ t \frac{pr_1 \cdot N}{\|r_1\|(c_0 + c_1\|r_1\| + c_2\|r_1\|^2)} + (1-t) \frac{B_3}{G_3} \right\} \tag{70}$$

if $G1=0$ and $G3 \neq 0$. The interpolation calculating operation is effected in accordance with $$B_2 = G_2 \left\{ t \frac{B_1}{G_1} + (1-t) \frac{pr_3 \cdot N}{\|r_3\|(c_0 + c_1\|r_3\| + c_2\|r_3\|^2)} \right\} \tag{71}$$

if $G1 \neq 0$ and $G3=0$. The interpolation calculating operation is effected in accordance with $$B_2 = G_2 \left\{ t \frac{pr_1 \cdot N}{\|r_1\|(c_0 + c_1\|r_1\| + c_2\|r_1\|^2)} + \right. \tag{72}$$

$$\left. (1-t) \frac{pr_3 \cdot N}{\|r_3\|(c_0 + c_1\|r_3\| + c_2\|r_3\|^2)} \right\}$$

if $G1=0$ and $G3=0$.

In order to solve the above described problems, the form-factor interpolation calculating apparatus of the present invention decides whether or not $$(\text{Min-threshold}) \leq \frac{N_i \cdot r_3}{N_i \cdot r_1} \leq (\text{Max-threshold}) \tag{73}$$

$$\text{(Min-threshold)} \leq \frac{\min(\|r_1\|, \|r_3\|)}{R_1 R_3} \quad (74)$$

are satisfied by the form-factor interpolation equation selecting apparatus when the form-factors Fij1, Fij3 are already known if the relation of r2=tr1+(1−t)r3, wherein a point S is a position of the representative point of a patch (element) i, the normal vector of the patch (element) is Ni, the points R1, R2, R3 are the positions of the calculation representative points of the elements j1, j2, j3, the normal vector of the elements j1, j2, j3 is Nj, the area of patch (element) i is Ai, the area of the elements j1, j2, j3 is Aj, the form-factor to the element j from the patch (element) i is Fij, the vector (R1L) is r1, the vector (R2L) is r2, the vector (R3L) is r3. The interpolation calculating operation is effected in accordance with $$F_{ij2} = \frac{\|r_1\|^4}{\|r_2\|^4} \left\{ t^2 + t(1-t) \frac{N_i \cdot r_3}{N_i \cdot r_1} \right\} F_{ij1} + \quad (75)$$

$$\frac{\|r_3\|^4}{\|r_2\|^4} \left\{ (1-t)^2 + t(1-t) \frac{N_i \cdot r_1}{N_i \cdot r_3} \right\} F_{ij3}$$

by the interpolation calculating apparatus when the neither the equation (73) nor the equation (74) is filled. The interpolation calculating operation is effected in accordance with $$F_{ij2} = \frac{\|r_1\|^4}{\|r_2\|^4} t F_{ij1} + \frac{\|r_3\|^4}{\|r_2\|^4} (1-t) F_{ij3} \quad (76)$$

by the above described interpolation calculating apparatus when the equation (73) is satisfied, but the equation (74) is not satisfied. The interpolation calculating operation is effected in accordance with $$F_{ij2} = \left\{ t^2 + t(1-t) \frac{N_i \cdot r_3}{N_i \cdot r_1} \right\} F_{ij1} + \quad (77)$$

$$\left\{ (1-t)^2 + t(1-t) \frac{N_i \cdot r_1}{N_i \cdot r_3} \right\} F_{ij3}$$

by the above described interpolation calculating apparatus when the equation (73) is not satisfied, but the equation (74) is satisfied. The interpolation calculating operation is effected in accordance with $$F_{ij2} = t F_{ij1} + (1-t) F_{ij3} \quad (78)$$

by the above described interpolation calculating apparatus when both the equation (73) and the equation (74) are satisfied.

In order to the above described problems, the illumination intensity interpolation domain deciding apparatus of the present invention selects as a sample element three parallel quadrilateral element corresponding to the vertex with respect to the group of the parallel quadrilateral element arranged in a triangular shape which can be made when the triangular patch is element-divided by the above described element producing apparatus, selects as the sample element two triangular elements corresponding to the end point with respect to the group of the triangular element similar to the former triangular patch arranged in a linear shape, effects an intersection test for checking the presence of the screening body between the calculation representative points of the light source and the sample element in three sample elements with respect to the group of the parallel quadrilateral element arranged in the triangular shape. When even three sample elements are not intersected in the result of the intersection test, all the parallel quadrilateral elements of the group of the parallel quadrilateral elements arranged in the triangular shape is decided to belong to the interpolation domain of the illumination intensity. When three sample elements are intersected in the result of the intersection test, all the parallel quadrilateral elements of the group of the parallel quadrilateral elements arranged in a triangular shape is decided to belong to the shadow domain. When one sample element within three sample elements are intersected, but two sample elements are not intersected in the result of the intersection test, the intersection test is repeated until the intersecting operation is not effected with respect to the respective parallel quadrilateral elements arranged along the two sides of the triangle with the intersected sample element as a basic point. The parallel quadrilateral elements including the calculation representative point is decided to belong to the interpolation domain of the illumination intensity in a domain surrounded by the calculation representative point of the parallel quadrilateral element which is intersected no loner for the first time and the calculation representative point of two sample elements decided that the intersecting operation is not effected at the first intersection test. When it is decided that the parallel quadrilateral element except for it belongs to the shadow domain, two sample elements of three sample elements are intersected in the result of the intersection test, and one sample element is not intersected, the intersection test is repeated till the intersection operation is effected no longer with respect to the respective parallel quadrilateral elements arranged along two sides of the triangle facing the element not intersected with the intersected two sample elements being provided as basic plates. The parallel quadrilateral elements including the calculation representative point is decided to belong to the interpolation domain of the illumination intensity in a domain surrounded by the calculation representative point of the parallel quadrilateral element which is intersected no longer for the first time and the calculation representative point of one sample element decided that the intersecting operation is not effected at the first intersection test. When it is decided that the parallel quadrilateral element except for it belongs to the shadow domain. The intersection test is effected to two sample elements with respect to the group of the triangular element similar to the former triangular patch arranged in a linear shape. When two sample elements are not intersected in the result of the intersection test, it is decided that all the triangular elements of the group of the triangular element arranged in a linear shape belong to the interpolation domain of the illumination intensity. When two sample elements are intersected in the result of the intersection test, it is decided that all the triangular elements of the group of the triangular element arranged in a linear shape belong to the shadow domain. One of two sample elements is intersected in the result of the intersection test. When one sample element is not intersected, the intersection test is repeated until the intersecting operation is effected no longer with respect to the respective triangular elements in an order toward the sample element not intersected with the intersected sample element being provided as a basic point. It is decided that the triangular element between the calculation representative point of the element which has been intersected no longer for the first time and the sample element decided that the intersecting operation is not effected with the first intersection test belongs to the interpolation domain of the illumination intensity, and it is decided that the triangular element except for it belongs to the shadow domain.

In order to solve the above described problem, the illumination intensity interpolation domain deciding apparatus of the present invention selects as the sample element two general square elements corresponding to the end point with respect to the group of the general square element similar to the former general square patch arranged on diagonal lines which can be made when the general square patch is element-divided with the above described element producing apparatus, selects as the sample element three elements corresponding to the vertex respectively with respect to each group with respect to the group of the parallel quadrilateral element arranged in two triangular shapes which can be made when the group of the general square element similar to the former general square patch arranged on the diagonal lines is removed, effects the intersection test to check the presence of the screening body between the calculation representative points of the light source and the sample element on three sample elements respectively with respect to the group of the parallel quadrilateral element arranged in two triangular shape. When three sample elements are not intersected in the result of the intersection test, it is decided that all the parallel quadrilateral elements of the group of the parallel quadrilateral element arranged in a triangular shape belong to the interpolation domain of the illumination intensity. When three sample elements are intersected in the result of the intersection test, it is decided that all the parallel quadrilateral elements of the group of the parallel quadrilateral elements arranged in a triangular shape belong to the domain of the shadow. One sample element of three sample elements are intersected in the result of the intersection test. When two sample elements are intersected, the intersection test is repeated until the intersecting test is effected no longer with respect to the respective parallel quadrilateral elements arranged along two sides of the triangle. It is decided that the parallel quadrilateral element including the calculation representative point belongs to the interpolation domain of the illumination intensity in a domain surrounded by the calculation representative point of the parallel quadrilateral element which are intersected no longer for the first time and the calculation representative point of the two sample elements decided that the intersecting operation is not effected in the first intersection test. It is decided that the parallel quadrilateral element except for it belongs to the shadow domain. Two sample elements of three same elements are intersected in the result of the intersection test. When one sample element is not intersected, the intersection test is repeated till the intersecting operation is effected no longer with respect to the respective parallel quadrilateral elements arranged along two sides of the triangle facing the element not intersected with two sample elements intersected being provided as the basic points. It is decided that the parallel quadrilateral element including the calculation representative point belongs to the interpolation domain of the illumination intensity in a domain surrounded by the calculation representative point of the parallel quadrilateral element which is intersected no longer for the first time and the calculation representative point of one sample element judged that the intersection is not effected at the first intersection test. The intersection test is effected upon the two sample elements with respect to the group of the general square element arranged on diagonal lines. When two sample elements are not intersected in the result of the intersection test, it is decided that all the general square elements of the group of the general square element arranged on the diagonal lines belong to interpolation domain of the illumination intensity. When two sample elements are intersected in the result of the intersection test, it is decided that all the general square elements of the group of the general square element arranged on the diagonal lines belong to the domain of the shadow. One of two sample elements is intersected in the result of the intersection test. When one sample element is not intersected, the intersection test is repeated until the intersection operation is effected no longer with respect to the respective general square elements in an order towards the sample element not intersected with the intersected sample element being provided as a basic point. It is decided that the general square element between the calculation representative point of the element which is intersected for the first time and the sample element decided that the intersecting operation is not effected at the first intersection test belongs to the interpolation domain of the illumination intensity. The general square element except for it belongs to the domain of the shadow.

In order to solve the above described problems, the illumination intensity interpolation domain deciding apparatus of the present invention selects as the sample element two parallel quadrilateral elements corresponding to the end point with respect to the group of the parallel quadrilateral element similar to the former parallel quadrilateral patch arranged on the diagonal lines which can be made when the parallel quadrilateral patch is element-divided by the above described element producing apparatus, selects as the sample element three elements corresponding to the vertex respectively with respect to each group with respect to the group of the parallel quadrilateral element similar to the former parallel quadrilateral patch arranged in two triangle shape which can be made when the group of the parallel quadrilateral element similar to the former parallel quadrilateral patch arranged on the diagonal line are removed, effects the intersecting test for checking the presence of the screening body between the calculation representative points of the light source and the sample element on three sample elements respectively respect to the group of the parallel quadrilateral element arranged in two triangle shape. When three sample elements are not intersected in the result of the intersecting test, it is decided that all the parallel quadrilateral elements of the group of the parallel quadrilateral element arranged in a triangular shape belong to the interpolation domain of the illumination. When three sample elements are intersected in the result of the intersection test, it is decided that all the parallel quadrilateral elements of the group of the parallel quadrilateral element arranged in a triangular shape belong to the domain of the shadow. One of three sample elements in the result of the intersection test is intersected. When two sample elements are not intersected, the intersection test is repeated until the intersecting operation is effected no longer with respect to the respective parallel quadrilateral elements arranged along the two sides of the triangle with the intersected sample element being provided as a basic point. It is decided that the parallel quadrilateral element including the calculation representative point belongs to the interpolation domain of the illumination intensity in a domain surrounded by the calculation representative point of the parallel quadrilateral element intersected no longer for the first time and the calculation representative point of two sample elements decided that the intersecting operation is not effected in the first intersection test. Two of three sample elements in the result of the intersection test are intersected. When one sample element is not intersected, the intersecting test is repeated until the intersecting operation is effected no longer with respect to the respective parallel quadrilateral elements arranged along two sides of the triangle facing the element not intersected with the intersected two sample elements being provided as a basic point. It is decided that the parallel quadrilateral elements including the calculation representative point belong to the interpolation domain of the illumination intensity in a domain surrounded by the calculation representative point of the parallel quadrilateral element not intersected for the first time and the calculation representative point of the one sample element decided that the intersection operation is not effected in the first intersection test. It is decided that the parallel quadrilateral element except for it belongs to the shadow domain. The intersection test is effected upon the two sample elements with respect to the group of the parallel quadrilateral element arranged in the diagonal lines. When two sample elements are intersected no longer in the result of the intersection test, it is decided that all the parallel quadrilateral elements of the group of the parallel quadrilateral element arranged on the diagonal line belong to the interpolation domain of the illumination intensity. When two sample elements, in the result of the intersection test are intersected, it is decided that all the parallel quadrilateral elements of the group of the parallel quadrilateral element arranged on the diagonal line belong to the shadow domain. When one of two sample elements is intersected in the result of the intersection test, and one sample element is not intersected, the intersection test is repeated until the intersecting operation is effected no longer with respect to the respective parallel quadrilateral elements in an order towards the ample element not intersected with the intersected sample element being provided as a basic point. It is decided that the parallel quadrilateral element between the calculation representative point of the element which is intersected no longer for the first time and the sample element decided that the intersecting operation is not effected in the first intersection test belongs to the intersection domain of the illumination intensity and the parallel quadrilateral element except for it belongs to the domain of the shadow.

In order to solve the above decried problems, the form-factor interpolation domain deciding apparatus, a radiation side patch internal form-factor interpolation domain deciding apparatus and a passive side patch internal form-factor interpolation domain deciding apparatus of the present invention selects as a sample element three parallel quadrilateral elements corresponding to the vertex with respect to the group of the parallel quadrilateral element arranged in a triangle shape which can be made when the triangle patch is element-divided with the above described element producing apparatus, selects as the sample element two triangle elements corresponding to the end point with respect to the group of the triangle element similar to the former triangle patch arranged in a linear shape. The decision as to whether or not radiation energies reach from an internal product between a vector where the calculation representative point of the patch internal element having the maximum non-radiation energies or the calculation representative point of the element of the patch interior having the maximum non-radiation energies is made a start, the calculation representative pint of the sample element is made an end, and a normal vector of the patch having the maximum-radiation energies, and an internal product with respect to the normal vector of the triangle patch on three sample elements with respect to the group of the parallel quadrilateral element arranged in a triangle shape. An intersection decision for checking the presence of the screening body between the calculation representative point of the patch having the maximum non-radiation energies or the calculation representative point of the element of the patch interior having the maximum non-radiation energies and the calculation representative point of the sample element is effected. Radiation energies are reached in three sample elements. When the intersection operation is not effected in the result of the intersection test, it is decided that all the parallel quadrilateral elements of the group of the parallel quadrilateral element arranged in a triangle shape belong to the interpolation domain of the form-factor. When the radiation energies are reached in three sample elements or the intersecting operation is effected in the result of the intersecting test, it is decided that all the parallel quadrilateral elements of the group of the parallel quadrilateral element arranged in a triangle shape belong to the shadow domain. When radiation energies do not reach in one of three sample elements, or the intersecting operation is effected in the result of the intersecting test, the radiation energies are reached in two sample elements and the intersecting operation is not effected, the radiation energies are not reached or a decision as to whether the radiation energies are reached with respect to the respective parallel square elements arranged along two sides of the triangle shape, and the intersection test are repeated until the radiation energies are reached, and the intersecting operation is effected no longer with respect to the respective parallel quadrilateral element arranged along two sides of the triangle with respect to the intersected sample element as a basic point. It is decided that the parallel quadrilateral element including the calculation representative point belongs to the interpolation domain of the form-factor in a domain surrounded by the calculation representative point of the parallel quadrilateral element where the radiation energies are reached for the first time and the intersecting operation is effected no longer and by the calculation representative point of the two sample elements where the radiation energies are reached at first and the intersection is decided to be effected no longer. It is decided that the parallel quadrilateral element except for it belongs to the shadow domain. When the radiation energies are not reached in two sample elements of three sample elements or the intersecting operation is effected in the result of the intersection test, the radiation energies are reached in one sample element, and the intersecting portion is not effected, a decision as to where or not the radiation energies are reached with respect to the respective parallel quadrilateral element arranged along two sides in a triangle shape towards the element not intersected with intersected two sample elements as a basic point, and an intersection test are repeated until the radiation energies are reached and the intersecting operation is effected no longer. It is decided that the parallel quadrilateral element including the calculation representative point belongs to the interpolation domain of the form-factor in a domain surrounded by the calculation representative point of the parallel quadrilateral element where the radiation energies are reached for the first time and the intersecting operation is effected no longer and the calculation representative point of one sample element decided that the radiation energies are reached at first and the intersecting operation is not effected in the intersection test. It is decided that the parallel quadrilateral element except for it belongs to the domain of the shadow. A decision as to whether or not the radiation energies are reached to two sample elements with respect of the group of the triangle element similar to the former triangle patch arranged in a linear shape, and an intersection test are effected. When the radiation energies are reached in two sample elements, and the intersecting operation is not effected in the result of the intersecting test, it is decided that all the triangle elements of the group of the triangular element arranged in a linear shape belong to the interpolation domain of the form-factor. When the radiation energies are reached in two small elements or the intersecting operation is effected in the result of the intersection test, it is decided that all the triangular elements of the group of the triangular elements arranged in a linear shape belong to the domain of the shadow. The radiation energies are not reached in one of the two sample elements or the intersecting operation is effected in the result of the intersecting test. When the radiation energies are reached in one sample element, and the intersecting operation is not effected, the radiation energies are not reached or a decision as to whether or not the radiation energies are reached with respect to the respective triangle elements in an order towards to the sample element where the radiation energies are reached and an intersecting operation is not effected with the intersecting sample element as a basic point, and a intersection test are repeated until the radiation energies are reached and intersecting operation is effected no longer. It is decided that the triangular element between the calculation representative point of the element where the radiation energies are reached for the first time and the intersecting operation is not effected and the sample element decided that the radiation energies are reached at first and the intersecting operation is not effected in the intersection test belongs to the interpolation domain of the form-factor. It is decided that the triangular element except for it belongs to the domain of the shadow.

In order to solve the above described problems, the form-factor interpolation domain deciding apparatus, the radiation side patch internal form-factor interpolation domain deciding apparatus and the passive side patch internal form-factor interpolation domain deciding apparatus of the present invention select as the sample element two general square elements corresponding to the end with respect to the group of the general square element similar to the former square patch arranged on the diagonal lines which can be made when the general square patch is element-divided with the above described element producing apparatus, selects as the small element three elements corresponding to the vertex respectively with respect the respective groups with respect to the group of the parallel quadrilateral arranged in two triangular shape which can be made when the group of the general square element similar to the former general square patch arranged on the diagonal lines are removed. A decision as to whether or not the energies are reached from an internal product between a vector where the calculation representative point of the patch having the maximum non-radiation energies or the calculation representative point of the element of the patch interior having the maximum non-radiation energies is made a start, the calculation representative point of the sample element is made an end, and a normal vector of the patch having the maximum non-radiation energies, and the internal product of normal vector of the general square patch is effected upon the three sample elements respectively with respect to the group of the parallel quadrilateral element arranged in two triangular shape. An intersection test to check the presence of the screening body between the calculation representative point of the patch having the maximum non-radiation energies or the calculation respective point of the element of the patch interior having the maximum non-radiation energies and the calculation respective point of the sample element is effected. When the radiation energies are reached in three sample elements, and the intersecting test is not effected in the result of the intersecting test, it is decided that all the parallel quadrilateral elements of the group of the parallel quadrilateral element arranged in a triangle shape belong to the interpolation domain of the form-factor. When the radiation energies are not reached in three small elements or the intersecting operation is effected in the result of the intersection test, it is decided that all the parallel quadrilateral elements of the group of the parallel quadrilateral element arranged in triangle shape belong to the domain of the shadow. When the radiation energies are not reached in one of three sample elements or the intersecting operation is effected in the result of the intersection test, the radiation energies are reached in two sample elements, the intersecting operation is not effected, a decision as to whether or not the radiation energies are reached with respect to the respective parallel quadrilateral elements arranged along two sides of the triangle shape and the intersection test are repeated until the radiation energies are reached and the intersecting operation is not effected with the intersected sample element being provided as the basic point. It is decided that the parallel quadrilateral element including the calculation representative point belongs to the interpolation domain of the form-factor in a domain surrounded by the calculation representative point of the parallel quadrilateral element with the radiation energies are reached for the first time and the intersecting operation is not effected and the calculation representative point of two sample elements decided that the radiation energies are reached at first and the intersecting operation is not effected at the intersection test. The parallel quadrilateral element except for it is decided to belong to the domain of the shadow. When the radiation energies are not reached in two of three sample elements, or the intersecting operation is effected in the result of the intersection test, the radiation energies are reached in one sample element, and an intersection operation is not effected, a decision whether or not the radiation energies are reached with respect to the respective parallel quadrilateral element arranged along two sides of the triangle shape towards the element where the radiation energies are reached and the intersecting operation is not effected with two sample elements intersected being provided as a basic plate, and the intersection test are repeated until the radiation energies are reached and the intersection operation is not effected. It is decided that the parallel quadrilateral element including the calculation representative point belongs to the interpolation domain of the form-factor in a domain surrounded by the calculation representative point of the parallel quadrilateral element where the radiation energies are repeated for the first time and the intersecting operation is not effected in the intersection test, and the calculation representative point of one sample element decided that the radiation energies are reached at first and the intersecting operation is not effected at the intersecting test. It is decided that the parallel quadrilateral element except for it belongs to the domain of the shadow. A decision as to whether or not the radiation energies are reached to two sample elements and the intersection test are effected with respect to the group of the signal square element arranged on the diagonal line. When the radiation energies are reached in two sample elements and the intersecting operation is not effected in the result of the intersecting test, it is decided that all the general square elements of the group of the general square element arranged on the diagonal lines belong to the interpolation domain of the form-factor. When the radiation energies are not reached in two sample elements or the intersecting operation is effected in the result of the intersecting test, it is decided that all the general square elements of the group of the general square element arranged on the diagonal lines belong to the domain of the shadow. When the radiation energies are reached in the one of two sample elements or the intersecting operation is effected in the result of the intersecting test, the radiation energies are reached in one sample element and the intersecting operation is not effected, a decision as to whether or not the radiation energies are reached with respect to the respective general square element in an order towards the sample element where the radiation energies are reached and the intersecting operation is not effected with the intersected sample element as a basic point, and an intersection test are repeated until the radiation energies are reached and the intersecting operation is effected no loner. The general square element between the calculation representative point of the element where the radiation energies are reached for the first time and the intersecting operation is effected no longer and the sample element decided that the radiation energies are reached at first and the intersecting operation is not effected in the intersecting test belongs to the interpolation domain of the form-factor. It is decided that the general square element except for it belong to the domain of the shadow.

In order to solve the above described problems, the form-factor interpolation domain deciding apparatus, the radiation side patch internal form-factor interpolation domain deciding apparatus and the passive side patch internal form-factor interpolation domain deciding apparatus of the present invention select as the sample element two parallel quadrilateral elements corresponding to the end with respect to the group of the parallel quadrilateral element similar to the former quadrilateral patch arranged on the diagonal lines which can be made when the parallel quadrilateral patch is element-divided with the above described element producing apparatus, selects as the small element three elements correspond to the vertex respectively with respect to each group, with respect to the group of the parallel quadrilateral element similar to the former parallel quadrilateral patch arranged in two triangular shape which can be made when the group of the parallel quadrilateral element similar to the former parallel quadrilateral patch arranged on the diagonal lines are removed. A decision as to whether or not the energies are reached from an internal product between a vector where the calculation representative point of the patch having the maximum non-radiation energies or the calculation representative point of the element of the patch interior having the maximum non-radiation energies is made start, the calculation representative point of the sample element is made an end and a normal vector of the patch having the maximum non-radiation energies, and an internal product of the normal vector of the parallel quadrilateral patch is effected upon the three sample elements respectively with respect to the group of the parallel quadrilateral element arranged in two triangular shape. An intersection test to check the presence of the screening body between the calculation respective point of the patch having the maximum non-radiation energies or the calculation representative point of the element of the patch interior having the maximum non-radiation energies and the calculation representative point of the sample element is effected. When the radiation energies are reached in three sample elements, and the intersecting operation is not effected in the result of the intersection test, it is decided that all the parallel quadrilateral elements of the group of the parallel quadrilateral element arranged in a triangle shape belong to the interpolation domain of the form-factor. When the radiation energies are not reached in three small elements or the intersecting operation is effected in the result of the intersection test, it is decided that all the parallel quadrilateral elements of the group of the parallel quadrilateral element arranged in a triangle shape belong to the domain of the shadow. When the radiation energies are not reached in one of three sample elements or the intersecting operation is effected in the result of the intersection test, the radiation energies are reached in two sample elements, the intersecting operation is not effected, a decision as to whether or not the radiation energies are reached with respect to the respective parallel quadrilateral elements arranged along two sides of the triangle shape and the intersection test are repeated until the radiation energies are reached and the intersecting operation is not effected with the intersected sample element being provided as the basic point. It is decided that the parallel quadrilateral element including the calculation representative point belongs to the interpolation domain of the form-factor in a domain surrounded by the calculation representative point of the parallel quadrilateral element where the radiation energies are reached for the first time and the intersecting operation is not effected and the calculation representative point of two sample elements decided that the radiation energies are reached at first and the intersecting operation is not effected at the intersection test. The parallel quadrilateral element except for it is decided to belong to the domain of the shadow. When the radiation energies are not reached two of three sample elements, or the intersecting operation is effected in the result of the intersection test, the radiation energies are reached in one sample element, and an intersection operation is not effected, a decision whether or not the radiation energies are reached with respect to the respective parallel quadrilateral element arranged along two sides of the triangle shape towards the element where the radiation energies are reached and the intersecting operation is not effected with two sample elements intersected being provided as a basic plate, and the intersection test are repeated until the radiation energies are reached and the intersection operation is not effected. It is decided that the parallel quadrilateral element including the calculation representative point belongs to the interpolation domain of the form-factor in a domain surrounded by the calculation representative point of the parallel quadrilateral element where the radiation energies are reached for the first time and the intersecting operation is not effected in the intersection test and the calculation representative point of one sample element decided that the radiation energies are reached at first and the intersecting operation is not effected at the intersecting test. It is decided that the parallel quadrilateral element except for it belongs to the domain of the shadow. A decision as to whether or not the radiation energies are reached to two sample elements and the intersection test are effected with respect to the group of the parallel quadrilateral element arranged on the diagonal line. When the radiation energies are reached in two sample means and the intersecting operation is not effected in the result of the intersecting test, it is decided that all the parallel quadrilateral elements of the group of the parallel quadrilateral element arranged on the diagonal lines belong to the interpolation domain of the form-factor. When the radiation energies are not reached in two sample elements or the intersecting operation is effected in the result of the intersecting test, it is decided that all the parallel quadrilateral elements of the group of the parallel quadrilateral element arranged on the diagonal lines belong to the domain of the shadow. When the radiation energies are not reached in one of two sample elements or the intersecting operation is effected in the result of the intersecting test, the radiation energies are reached in one sample element and the intersecting operation is not effected, a decision as to whether or not the radiation energies are reached with respect to the respective parallel quadrilateral element in an order towards the sample element not intersected with the intersected sample elements being provided as a basic point, and an intersection test are repeated until the radiation energies are reached and the intersecting operation is effected no loner. The parallel quadrilateral element between the calculation representative point of the element where the radiation energies are reached for the first time and the intersecting operation is effected no longer and the sample element decided that the radiation energies are reached at first and the intersecting operation is not effected in the intersecting test. It is decided that the parallel quadrilateral element except for it belongs to the domain of the shadow.

In order to solve the above described problems, a triangular brilliance intensity mapping apparatus of the present invention is composed of an illumination intensity distribution space coordinates calculating apparatus, an interpolating apparatus and an outputting apparatus where the coordinates of the vertex A of the triangular polygon ABC are (a1, a2, a3), the coordinates of the vertex B are (b1, b2, b3), the coordinates of the vertex C are (c1, c2, c3), the optional internal point of the triangular polygon ABC is P (p1, p2, p3), the coordinates of a point P' in the illumination intensity distribution space corresponding to a point P are made (s, t). The above described illumination intensity distribution space coordinate calculating apparatus obtains (s, t) by $$\binom{s}{t} = \frac{1}{(b_1 - a_1)(c_2 - a_2) - (c_1 - a_1)(b_2 - a_2)} \begin{pmatrix} c_2 - a_2 & a_1 - c_1 \\ a_2 - b_2 & b_1 - a_1 \end{pmatrix} \binom{p_1 - a_1}{p_2 - a_2} \quad (79)$$

so as to transfer the value to the above described interpolating apparatus at the $(b1-a1)(c2-a2)-(c1-a1)(b2-a2) = 0$ where the internal points P (p1, p2, p3) of the triangular polygon ABC to be displayed with the coordinates (a1, a2, a3) of the vertex A of the triangular polygon ABC, the coordinates (b1, b2, b3) of the vertex B, the coordinates (c1, c2, c3) of the vertex C are inputted,
It obtains the (s, t) by $$\binom{s}{t} = \frac{1}{(b_1 - a_1)(c_3 - a_3) - (c_1 - a_1)(b_3 - a_3)} \begin{pmatrix} c_3 - a_3 & a_1 - c_1 \\ a_3 - b_3 & b_1 - a_1 \end{pmatrix} \binom{p_1 - a_1}{p_3 - a_3} \quad (80)$$

so as to transfer the value to the above described interpolating apparatus at $(b1-a1)(c3-a3)-(c1-a1)(b3-a3) \neq 0$. The (s, t) is obtained by $$\binom{s}{t} = \frac{1}{(b_2 - a_2)(c_3 - a_3) - (c_2 - a_2)(b_3 - a_3)} \begin{pmatrix} c_3 - a_3 & a_2 - c_2 \\ a_3 - b_3 & b_2 - a_2 \end{pmatrix} \binom{p_2 - a_2}{p_3 - a_3} \quad (81)$$

at the $(b2-a2)(c3-a3)-(c2-a2)(b3-a3) \neq 0$ so as to transfer the value to the above described interpolating apparatus. At time except for it, error signal is returned to complete the processing operation, because there is no solution. The above described interpolating apparatus makes an illumination intensity value in the (s,t) an illumination intensity value which is closest to the (s,t), in a point where the illumination intensity value is given or is obtained by the interpolation of the illumination intensity value close to the (s, t), in a pint where the illumination intensity value is given so as to transfer to the about described output apparatus. The outputting apparatus outputs to a displaying apparatus as an illumination intensity value of the internal point P of a triangular polygon ABC an illumination intensity value calculated by the above described interpolating apparatus.

In order to solve the above described problems, the square illumination intensity mapping apparatus of the present invention is composed of am existence domain deciding apparatus, an illumination intensity distribution space coordinate calculating apparatus, an interpolating apparatus and an outputting apparatus where the coordinates of the vertex A of the general square polygon ABCD are (a1, a2, a3), the coordinates of the vertex B are (b1, b2, b3), the coordinates of the vertex C are (c1, c2, c3), the coordinates of the vertex D are (d1, d2, d3), the normal vector of the general square polygon ABCD is N(Nx, Ny, Nz), the optional internal point of the general square polygon ABCD is X(x1, x2, x3), the coordinates of a point in the illumination intensity distribution space corresponding to the internal point X when the internal point X exists in the triangular ABC are (s+t,s), the coordinates at a point in the illumination intensity distribution space corresponding to the internal point X when the internal point X exists on the diagonal line AC are (s, s), the coordinates at a point in the illumination intensity distribution space corresponding to the internal point X when the internal X exists on the triangle ACD are (s,s+r). The above described existence domain deciding apparatus inputs the internal point X(x1, x2, x3) of the general square polygon ABCD to be displayed with the coordinates (a1, a2, a3) of the vertex A of the general square polygon ABCD are (a1, a2, a3), the coordinates of the vertex B are (b1, b2, b3), the coordinates of the vertex C are (c1, c2, c3), the coordinates of the vertex D are (d1, d2, d3), the normal vector of the general square polygon ABCD are (Nx, Ny, Nz), refers to the maximum absolute value among the Nx, Ny, Nz. A point X is decided to be a triangle ABC interior if $(x2-a2)(b2-a2) > 0$ at $c2-a2=0$ when Nx is maximum. A point X is decided on the diagonal line AC if $x2-a3=0$. A point X is decided to be an triangle ACD interior if $(x2-a2)(d2-a2) > 0$. A point X is decided to be a triangle ABC interior if $$\left\{ \frac{c_3 - a_3}{c_2 - a_2}(x_2 - a_2) - (x_3 - a_3) \right\} \left\{ \frac{c_3 - a_3}{c_2 - a_2}(b_2 - a_2) - (b_3 - a_3) \right\} > 0 \quad (82)$$

at $c2-a2 \neq 0$. A point X is decided to be on a diagonal line AC if $$\frac{c_3 - a_3}{c_2 - a_2}(x_2 - a_2) - (x_3 - a_3) = 0 \quad (83)$$

A point X is decided to be a triangle ACD interior if $$\left\{ \frac{c_3 - a_3}{c_2 - a_2}(x_2 - a_2) - \right. \quad (84)$$

$$(x_3 - a_3) \} \left\{ \frac{c_3 - a_3}{c_2 - a_2} (d_2 - a_2) - (d_3 - a_3) \right\} > 0$$

A point X is decided to be a triangle ABC interior if $(x_1-a_1)(b_1-a_1)>0$ at $c_1-a_1=0$ when Ny is maximum. A point X is decided on the diagonal line AC. A point X is decided to be a triangle ACD interior if $(x_1-a_1)(b_1-a_1)>0$ at $c_1-a_1=0$ if Ny is maximum. A point X is decided to be on a diagonal line AC, a point X is decided to be a triangle ABC interior if $(x_1-a_1)(d_1-a_1)>0$. If $$\left\{ \frac{c_3 - a_3}{c_1 - a_1} (x_1 - a_1) - \right. \tag{85}$$

$$(x_3 - a_3) \} \left\{ \frac{c_3 - a_3}{c_1 - a_1} (b_1 - a_1) - (b_3 - a_3) \right\} > 0$$

at $c_1-a_1 \neq 0$, a point X is decided to be a triangle ABC interior. If $$\frac{c_3 - a_3}{c_1 - a_1} (x_1 - a_1) - (x_3 - a_3) = 0 \tag{86}$$

a point X is decided to be a diagonal line AC. If $$\left\{ \frac{c_3 - a_3}{c_1 - a_1} (x_1 - a_1) - \right. \tag{87}$$

$$(x_3 - a_3) \} \left\{ \frac{c_3 - a_3}{c_1 - a_1} (d_1 - a_1) - (d_3 - a_3) \right\} > 0$$

a point X is decided to be a triangle ABC interior. A X is decided to be a triangle ABC interior if $(x_1-a_1)(b_1-a_1) >0$ at $c_1-a_1=0$ when Nz is maximum. A point x is decided to be on a diagonal line AC if $x_1-a_1$. A point X is decided to be a triangle ACD interior if $(x_1-a_1)(d_1-a_1)$. A point X is decided to be a triangle ABC interior if $$\left\{ \frac{c_2 - a_2}{c_1 - a_1} (x_1 - a_1) - \right. \tag{88}$$

$$(x_2 - a_2) \} \left\{ \frac{c_2 - a_2}{c_1 - a_1} (b_1 - a_1) - (b_2 - a_2) \right\} > 0$$

at $c_1-a_1 \neq 0$. A point X is decided on a diagonal line AC if $$\frac{c_2 - a_2}{c_1 - a_1} (x_1 - a_1) - (x_2 - a_2) = 0 \tag{89}$$

A point X is decided to be a triangle ACD interior if $$\left\{ \frac{c_2 - a_2}{c_1 - a_1} (x_1 - a_1) - \right. \tag{90}$$

$$(x_2 - a_2) \} \left\{ \frac{c_2 - a_2}{c_1 - a_1} (d_1 - a_1) - (d_2 - a_2) \right\} > 0$$

so as to transfer the result to the above described illumination intensity distribution space coordinate calculating apparatus. The illumination intensity distribution space coordinate calculating apparatus inputs the internal point $X(x_1, x_2, x_3)$ of the general square polygon ABCD and the result to be decided by the above described existence domain deciding apparatus to be displayed with the coordinates $(a_1, a_2, a_3)$ of the vertex A of the general square polygon ABCD, the coordinates $(b_1, b_2, b_3)$ of the vertex B, the coordinates $(c_1, c_2, c_3)$ of the vertex C, the coordinates $(d_1, d_2, d_3)$. When the point X is in the triangle ABC interior in the result of the above described existence domain deciding apparatus, the $(s, t)$ are obtained by $$\binom{s}{t} = \frac{1}{(c_1-a_1)(b_2-a_2)-(b_1-a_1)(c_2-a_2)} \binom{b_2-a_2 \quad a_1-b_1}{a_2-c_2 \quad c_1-a_1} \binom{p_1-a_1}{p_2-a_2} \tag{91}$$

at the time of $(c_1-a_1)(b_2-a_2)-(b_1-a_1)(c_2-a_2)=0$ so as to transfer the value to the above described interpolating apparatus. The $(s, t)$ is obtained by $$\binom{s}{t} = \frac{1}{(c_1-a_1)(b_3-a_3)-(b_1-a_1)(c_3-a_3)} \binom{b_3-a_3 \quad a_1-b_1}{a_3-c_3 \quad c_1-a_1} \binom{p_1-a_1}{p_3-a_3} \tag{92}$$

at $(c_1-a_1)(b_3-a_3)-(b_1-a_1)(c_3-a_3) \neq 0$. The $(s, t)$ is obtained by $$\binom{s}{t} = \frac{1}{(c_2-a_2)(b_3-a_3)-(b_2-a_2)(c_3-a_3)} \binom{b_3-a_3 \quad a_2-b_2}{a_3-c_3 \quad c_2-a_2} \binom{p_2-a_2}{p_3-a_3} \tag{93}$$

at $(c_2-a_2)(b_3-a_3)-(b_2-a_2)(c_3-a_3) \neq 0$ so as to transfer the value to the above described interpolating apparatus. At time except for it, the error signal is returned so as to complete the processing operation, because there is no solution. S is obtained by $$s = \frac{\omega_1 - a_1}{c_1 - a_1} \tag{94}$$

at $c_1-a_1 \neq 0$ when the point X is on a diagonal line AC in the result of the above described existence domain deciding apparatus so as to transfer the value to the above described interpolating apparatus. S is obtained by $$s = \frac{\omega_2 - a_2}{c_2 - a_2} \tag{95}$$

at $c_2-a_2 \neq 0$ so as to transfer the value to the above described interpolating apparatus. S is obtained by $$s = \frac{\omega_3 - a_3}{c_3 - a_3} \tag{96}$$

at $c_3-a_3 \neq 0$ so as to transfer the value to the above described interpolating apparatus. At time except for it, the error signal is returned so as to complete the processing operation, because there is no solution. $(s, r)$ is obtained by $$\binom{s}{t} = \frac{1}{(c_1-a_1)(d_2-a_2)-(d_1-a_1)(c_2-a_2)} \binom{d_2-a_2 \quad a_1-d_1}{a_2-c_2 \quad c_1-a_1} \binom{q_1-a_1}{q_2-a_2} \tag{97}$$

so as to transfer the value to the above described interpolating apparatus at $(c_1-a_1)(d_2-a_2)-(d_1-a_1)(c_2-a_2) \neq 0$ when the point X is a triangle ACD interior in the result of the above described existence domain deciding apparatus. The $(s, r)$ is obtained by $$\binom{s}{t} = \frac{1}{(c_1-a_1)(d_3-a_3)-(d_1-a_1)(c_3-a_3)} \binom{d_3-a_3 \quad a_1-d_1}{a_3-c_3 \quad c_1-a_1} \binom{q_1-a_1}{q_3-a_3} \tag{98}$$

so as to transfer the value to the above described interpolating apparatus at $(c_1-a_1)(d_3-a_3)-(d_1-a_1)(c_3-a_3) \neq 0$. The $(s, r)$ is obtained by $$\binom{s}{t} = \frac{1}{(c_2-a_2)(d_3-a_3)-(d_2-a_2)(c_3-a_3)} \binom{d_3-a_3 \quad a_2-d_2}{a_3-c_3 \quad c_2-a_2} \binom{q_2-a_2}{q_3-a_3} \tag{99}$$

so as to transfer the above described interpolating apparatus at $(c_2-a_2)(d_3-a_3)-(d_2-a_2)(c_3-a_3) \neq 0$. At time except for it, the error signal is returned so as to complete the processing operation, because there is no solution. The above described interpolating apparatus makes an illumination intensity value in a point of the coordinates calculated by the above described illumination intensity distributing space coordinate calculating apparatus an illumination intensity value in a point which is closest to the coordinates calculated by the above described illumination intensity distribution space coordinate calculating apparatus and is given an illumination intensity value or obtained the illumination intensity value by the interpolation of it in a point which is close to the coordinate calculated by the above described illumination intensity distribution space coordinate calculating apparatus and is given the illumination intensity value so as to transfer it to the above described output apparatus. The above described output apparatus outputs to the displaying apparatus as the illumination intensity value of the internal point X of the general square polygon ABCD the illumination intensity value calculated by the above described interpolating apparatus.

In order to solve the above described problems, a triangular illumination intensity mapping apparatus of the present invention is composed of an illumination intensity distribution space coordinate calculating apparatus, an interpolating apparatus and an outputting apparatus where the coordinates of the vertex A of the triangular polygon ABC are (uA, vA), the coordinates of the vertex B are (uB, vB), the coordinates of the vertex C are (uC, vC), the optional internal points of the triangular polygon ABC are P(uP, vP), the coordinates of a point P' in the illumination intensity distribution space corresponding to a point P are made (s, t) in the uv coordinates system defined on the plane the same as the triangle polygon ABC. The above described illumination intensity distribution space coordinate calculating apparatus obtains (s, t) by $$\begin{pmatrix} s \\ t \end{pmatrix} = \frac{1}{(u_B - u_A)(v_C - v_A) - (u_C - u_A)(v_B - v_A)} \begin{pmatrix} v_C - v_A & u_A - u_C \\ v_A - v_B & u_B - u_A \end{pmatrix} \begin{pmatrix} u_P - u_A \\ v_P - v_P \end{pmatrix} \quad (100)$$

so as to transfer the value to the above described interpolating apparatus at the (uB−uA)(uC−uA)−(uC−uA)(uC−uA) ≠0 where the internal points P (up, vp) of the triangular polygon ABC to be displayed with the coordinates (uA, vA) of the vertex A of the triangular polygon ABC, the coordinates (uB, vB) of the vertex B, the coordinates (uC, vC) of the vertex C are inputted. At the time of (uB−uA)(vC−vA)−(uC−uA)(vB−vA)=0, the error signals are returned so as to complete the processing operation, because there is no solution. The above described interpolating apparatus makes an illumination intensity value in the (s,t) an illumination intensity value which is closest to the (s,t), in a point where the illumination intensity value is given or is obtained by the interpolation of the illumination intensity value close to the (s, t), in a pint where the illumination intensity value is given so as to transfer to the about described output apparatus. The outputting apparatus outputs to a displaying apparatus as an illumination intensity value of the internal point P of a triangular polygon ABC an illumination intensity value calculated by the above described interpolating apparatus.

In order to solve the above described problems, the square illumination intensity mapping apparatus of the present invention is composed of am existence domain deciding apparatus, an illumination intensity distribution space coordinate calculating apparatus, an interpolating apparatus and an outputting apparatus where the coordinates of the vertex A of the general square polygon ABCD are (uA, vA), the coordinates of the vertex B is (uB, vB), the coordinates of the vertex C are (uC, vC), the coordinates of the vertex D are (uD, vD), the optional internal point of the general square polygon ABCD is X(uX, vX), the coordinates of a point in the illumination intensity distribution space corresponding to the internal point X when the internal point X exists in the triangular ABC are (s+t,s), the coordinates at a point in the illumination intensity distribution space corresponding to the internal point X when the internal point X exists on the diagonal line AC are (s, s), the coordinates at a point in the illumination intensity distribution space corresponding to the internal point X when the internal point X exists on the triangle ACD are (s,s+r) in the uv coordinate system defined on the plane as the general square polygon ABCD. The above described existence domain deciding apparatus inputs the internal point X (uX, vX) of the general square polygon ABCD to be displayed with the coordinates of the vertex A of the general square polygon ABCD are (uA, vA), the coordinates of the vertex B are (uB, vB), the coordinates of the vertex C are (uC, vC), the coordinates of the vertex D are (uD, vD). A point X is decided to be a triangle ABC interior if (uX−uA)(uB−uA)>0 at uC−uA=0. A point X is decided on the diagonal line AC if uX−uA=0. A point X is decided to be a triangle ACD interior if (uX−uA)(uD−uA)>0. A point X is decided to be a triangle ABC interior if $$\left\{ \frac{v_C - v_A}{u_C - u_A} (u_X - u_A) - (v_X - v_A) \right\} \left\{ \frac{v_C - v_A}{u_C - u_A} (u_B - u_A) - (v_B - v_A) \right\} > 0 \quad (101)$$

at uC−uA≠0. A point X is decided on a diagonal line AC if $$\frac{v_C - v_A}{u_C - u_A} (u_X - u_A) - (v_X - v_A) = 0 \quad (102)$$

A point X is decided to be a triangle ACD interior if $$\left\{ \frac{v_C - v_A}{u_C - u_A} (u_X - u_A) - (v_X - v_A) \right\} \left\{ \frac{v_C - v_A}{u_C - u_A} (u_D - u_A) - (v_D - v_A) \right\} > 0 \quad (103)$$

so as to transfer the result to the above described illumination intensity distribution space coordinate calculating apparatus. The illumination intensity distribution space coordinate calculating apparatus inputs the internal point x(uX, vX) of the general square polygon ABCD and the result to be decided by the above described existence domain deciding apparatus to be displayed with the coordinates of the vertex A of the general square polygon ABCD being (uA, vA), the coordinates of the vertex B being (uB, vB), the coordinates of the vertex C being (uC, vC), the coordinates of the vertex D being (uD, vD). When the point X is in the triangle ABC interior in the result of the above described existence domain deciding apparatus, the (s, t) are obtained by $$\begin{pmatrix} s \\ t \end{pmatrix} = \frac{1}{(u_C - u_A)(v_B - v_A) - (u_B - u_A)(v_C - v_A)} \begin{pmatrix} v_B - v_A & u_A - u_B \\ v_A - v_C & u_C - u_A \end{pmatrix} \begin{pmatrix} u_X - u_A \\ v_X - v_A \end{pmatrix} \quad (104)$$

at the time of (uC−uA)(vB−vA)−(uB−uA)(vC−vA)≠0 so as to transfer the value to the above described interpolating apparatus. At (uC−uA)(vB−vA)−(uB−uA)(vC−vA)=0, the error signal is returned so as to complete the processing operation, because there is no solution. S is obtained by $$s = \frac{v_X - v_A}{v_C - v_A} \quad (105)$$

at uC−uA=0 and vC−vA≠0 when the point X is on a diagonal line AC in the result of the above described existence domain deciding apparatus so as to transfer the value to the above described-interpolating apparatus. S is obtained by $$s = \frac{u_X - u_A}{u_C - u_A} \quad (106)$$

at uC−uA≠0 so as to transfer the value to the above described interpolating apparatus. At time except for it, the error signal is returned so as to complete the processing operation, because there is no solution. (s, r) is obtained by $$\binom{s}{r} = \quad (107)$$

$$\frac{1}{(u_C-u_A)(v_D-v_A)-(u_D-u_A)(v_C-v_A)} \begin{pmatrix} v_D-v_A & u_A-u_D \\ v_A-v_C & u_C-u_A \end{pmatrix} \begin{pmatrix} u_X-u_A \\ v_X-v_A \end{pmatrix}$$

at (uC−uA)(vD−vA)−(uD−uA)(vC−vA)≠0 when the X is in the triangle ACD interior in the result of the above described existence domain deciding apparatus so as to transfer the value to the above described interpolating apparatus. At the time of (uC−uA)(vD−vA)−(uD−uA)(vC−vA)=0, the error signals are returned to as to complete the processing operation, because there is no solution. The above described interpolating apparatus makes an illumination intensity value in a point of the coordinates calculated by the above described illumination intensity distributing space coordinate calculating apparatus an illumination intensity value in a point which is closest to the coordinate calculated by the above described illumination intensity distribution space coordinate calculating apparatus and is given an illumination intensity value or is obtained by the interpolation of the illumination intensity value in a point which is close to the coordinate calculated by the above described illumination intensity distribution space coordinate calculating apparatus and is given the illumination intensity value so as to transfer it to the above described output apparatus in accordance with a point of the coordinates calculated by the above described illumination intensity distribution sauce coordinates calculating apparatus and the illumination density distribution data general square polygon ABCE. The above described output apparatus outputs to the displaying apparatus as the illumination intensity value of the internal point X of the general square polygon ABCD the illumination intensity value calculated by the above described interpolating apparatus.

BRIEF DESCRIPTION OF THE DRAWINGS

These and other objects and features of the present invention will become apparent from the following description taken in conjunction with the preferred embodiment thereof with reference to the accompanying drawings, in which;

FIG. 18 is an illustration view of the calculation order of the form-factor value in the same embodiment;

FIG. 27 is a graph of the analytic result of the error when the first embodiment is realized with the compute program.

DETAILED DESCRIPTION OF THE INVENTION

Figure 1:
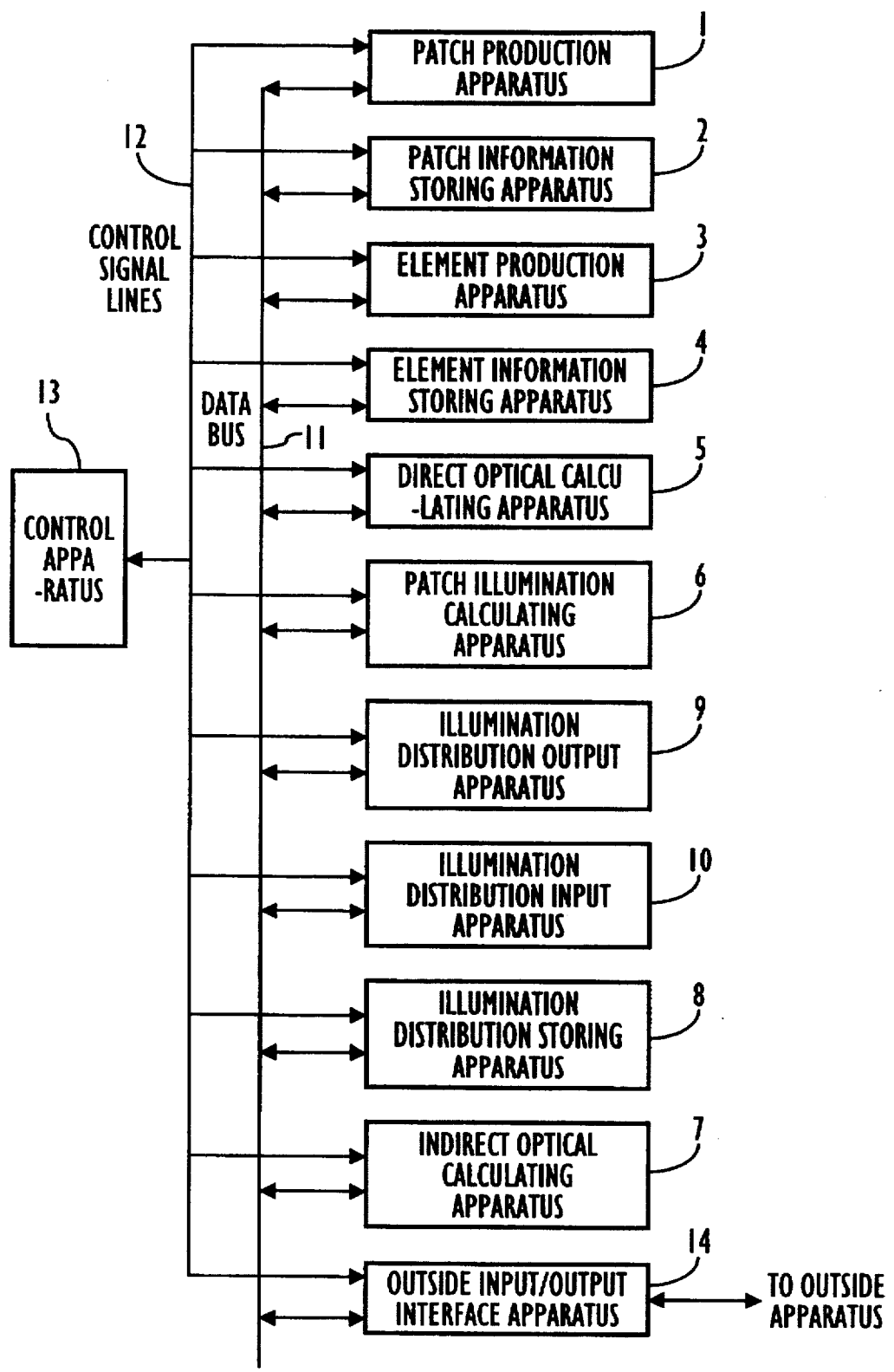
FIG. 1 is a block diagram of an image producing apparatus in a first embodiment of the present invention.

Before the description of the present invention proceeds, it is to be noted that like parts are designated by like reference numerals throughout the accompanying drawings.

An image producing apparatus in a first embodiment of the present invention will be described hereinafter with reference to the drawings.

FIG. 1 shows the whole construction of the image producing apparatus in the first embodiment of the present invention.

In FIG. 1, reference numeral 1 is a patch producing apparatus for producing the patch information composed of coordinates of the calculation representative point position of the patch, the vertex coordinates of the patch, the area of the patch, the normal vector, the reflectivity, the identification number, reference numeral 2 is a patch information storing apparatus for storing the patch information produced by the patch reproducing apparatus 1, reference numeral 3 is an element producing apparatus for producing element information composed of the coordinates of the calculation representative point position of the element, the area of the element, the normal vector, the reflectivity, the identification number from the patch information,, reference numeral 4 is a element information storing apparatus for storing the element information produced by the element producing apparatus 3, reference numeral 5 is a direct light calculating apparatus for calculating with the use of the sampling and the interpolation the illumination intensity value to be directed obtained from the light source, reference numeral 6 is a patch illumination intensity calculating apparatus for calculating the illumination intensity value in the calculation representative point of the patch from the illustration intensity value in the calculation representative point of the element, reference numeral 7 is a direct light calculating apparatus for calculating the illumination intensity value to be obtained by the interaction o the body, reference numeral 8 is an illumination intensity distribution storing apparatus for storing the illumination intensity value of the element unit and the patch unit calculated by the direct light calculating apparatus 5, the patch illumination intensity calculating apparatus 6, the direct light calculating apparatus 7, reference numeral 9 is a illumination intensity distribution outputting apparatus for effecting external outputting operation, while converting from the internal data type from the external data type the illumination intensity distribution stored in the illumination intensity distributing storing apparatus 8, reference numeral 10 is an illumination intensity distributing inputting apparatus for converting the illumination intensity distribution inputting apparatus to be inputted from the outside, transferring the converted data to the illumination intensity distribution storing apparatus 8, storing it, reference numeral 11 is a data bus, reference numeral 12 is a control signal line, reference numeral 13 is a controlling apparatus for effecting the scheduling management and the controlling operation through the control signal line 12, reference numeral 14 is an external input, output interface apparatus for effecting the input, output of the data with the external apparatus.

The image producing apparatus in a first embodiment composed as described hereinabove will be described in its operation.

A patch producing apparatus 1 produces patch information composed of the coordinates of the calculation representative point position of the patch which becomes the radiation unit in the interpolation calculation and the direct light calculation time, the vertex coordinates of the patch, the area of the patch, the normal vector, the reflectivity and the identification number when polygon information composed of vertex coordinates of the polygon for defining the body, the reflectivity and identifier for giving identification of a triangle polygon, a general square polygon, a parallel quadrilateral polygon is inputted from the external apparatus through the above described eternal input, output interface apparatus and the above described data bus. The polygon information is inputted with as file type, or a direct keyboard when, for example, the external apparatus is a computer for normal work station or the like.

As clear from the description of the identifier, the polygons to e handled are a triangle polygon, a general square polygon, a parallel quadrilateral polygon in type. As they are respectively different in the method of the patch information, respective types and a producing method of producing patches for them will be described hereinafter.

Figure 2:
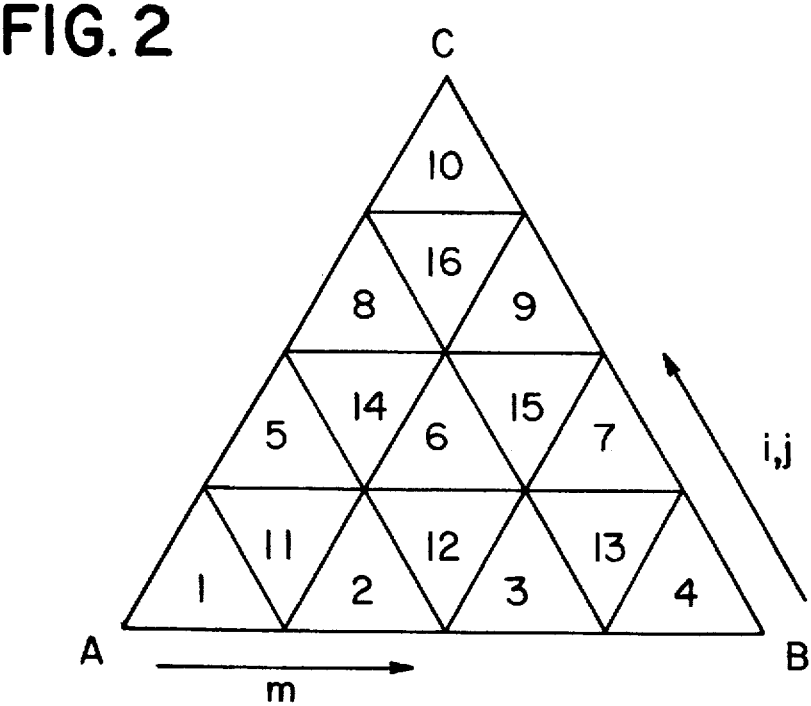
FIG. 2 is a view where a triangular polygon is divided in patch in the embodiment.

A method of producing the patch information will be described in the case of the triangle polygon. Assume that position vectors of the vertex are a, b, c with respect to the triangle polygon ABC. A patch decomposition number np is obtained with an equation (1) with the use of the patch decomposition width given form outside. Assume that the respective sides of the triangle polygon ABC are equally np divided, and equal dividing points corresponding to the adjacent sides are connected, and the triangle polygon ABC is divided into a normal triangle patch congruent to each other similar to the former triangle polygon ABC of np (np+1)/2 directed in the direction the same as the former triangle polygon ABC and an opposite triangle congruent to each other similar to the former triangle polygon ABC of the np (np−1)/2 directed in the opposite direction to the former triangle polygon ABC. A mi integer coordinate system is composed as in FIG. 2 with a m axis parallel to a side AB, an i axis parallel to a side BC with the normal triangle patch including a vertex A as a standard with respect to the normal triangle patch. Identification numbers are attached in accordance with the equation (3). In FIG. 2, np=4. A mj integer coordinate system is composed with a m axis parallel to the side AB, a j axis parallel to the side BC with the opposite direction triangle patch closest to the vertex A as a standard even with respect to the opposite diction triangle patch. Identification numbers are patched in accordance with the equation (4). Table 1 shows the relation between the identification number of the normal triangle patch in FIG. 2 and the (m, i) coordinate, Table 2 shows the relation between the identification number of the opposite direction triangle patch and the (m,i) coordinate. The position vector x of the calculation representative point of the normal direction triangle of the (m, i) in the mi coordinate system is obtained by the equation (5). The position vectors p, q, r of the vertex of the normal direction triangle patch in the (m, i) are obtained by an equation (6), an equation (7), an equation (8). A position vector x of the calculation representative point of the opposite direction triangle patch of the (m, i) in the mj coordinate system is obtained by an equation (9). The position vectors p, q, r of the vertex of the opposite direction triangle patch in the (m, k) are obtained by an equation (10), an equation (11), an equation (12). When the former coordination system is a right-hand coordinate system, the normal vector of the normal direction triangle patch, the opposite direction triangle patch is obtained by the equation (14). In the case of the left-hand coordinate system, the normal vector of the normal direction triangle patch, the opposite direction triangle patch are obtained by the equation (14). The area of the normal direction triangle patch, the opposite direction triangle patch is obtained by the equation (15). The reflectivity produced the patch information with the use of the value the same as the former triangle polygon ABC.

Figure 3:
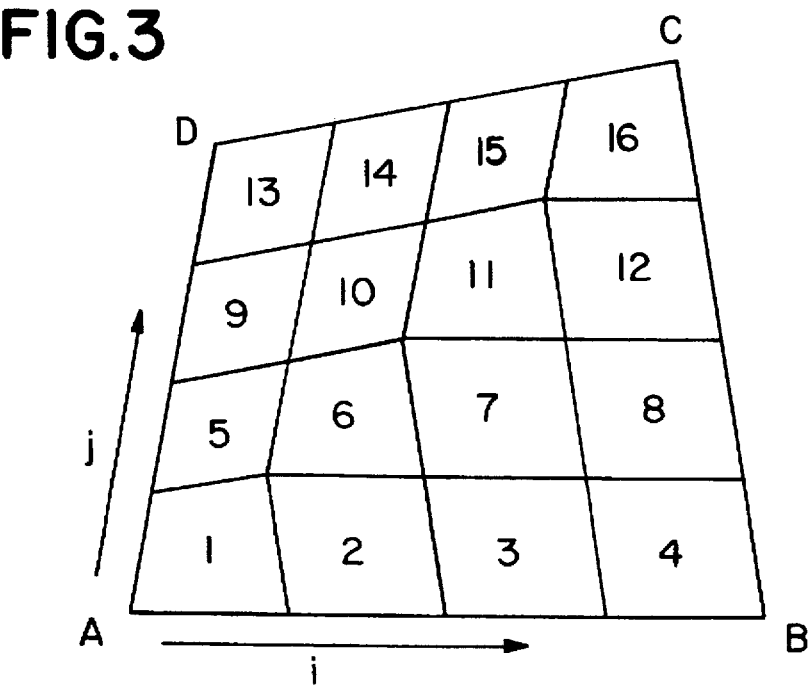
FIG. 3 is a view where a general square polygon is divided in patch in the same embodiment.

A method of producing the patch information in the case of the general square polygon will be described. The position vectors of the vertex are a, b, c, d with respect to the general square polygon ABCD. The patch decomposition number np is obtained by the equation (1) with the use of the patch decomposition given from the outside. The respective sides of the general square polygon ABCD and the diagonal lien AC are equally np divided, the equal dividing point of each side and the equal dividing point corresponding to the diagonal line are connected with line segments, and are divided into a parallel quadrilateral patch congruent to each other of two types of each np (np−1)/2, and into the general square patch congruent to each other similar to the former general square polygon ABCD of np number. The ij integer coordinate system is composed like FIG. 3 with an i axis along the side AB, a j axis along the side AD with the general square patch including the vertex A being provided as a standard. The identification numbers are attached in accordance with the equation (16). In FIG. 3, assume that np =4. The position vector x of the calculation representative point of the general square, the parallel square patch of the (i,j) at the ij coordinate system are obtained as follows. in i>j, the group of the parallel square patch on the triangle ACD side is shown. In this case, it is obtained by the equation (17). In the i=j, the group of the general square patch on the diagonal lien AC is shown. It is obtained by the equation (18) in this case. In the i, j, the group of the parallel square patch on the triangle ABC side is shown. In this case, it is obtained by the equation (19). When the position vectors p,q, r,s of the vertex of the general square, the parallel square patch in this (i, j) are i>j, it is obtained by the equation (20), the equation (21), the equation (23). In the i=j, it is obtained by the equation (24, the equation (25), the equation (26), the equation (27). In the i<j, it is obtained by the equation (28), the equation (29), the equation (30), the equation (31). When the former coordinate system is the right-hand coordinate system, the normal vector of the general square, the parallel square patch is obtained by the equation (33). When the area of the general square, the parallel square patch is i>j in the (i, j), it is obtained by the equation (34). In the i=j, it is obtained by the equation (35). In the j<j, it is obtained by the equation (36). The reflectivity produced the path information with the use of the value the same as the former general square polygon ABCD.

A method of producing the patch information in the case of the parallel square polygon will be described. the position vectors of the vertex are a, b, c, d with respect to the parallel square polygon ABCD. Patch decomposition numbers mp, np are obtained by the equation (37), the equation (38) with the use of the patch decomposition width given from the outside. The sides AB, CD are equally np divided, the sides BC, DA are generally mp divided. The equal dividing points corresponding to the opposite sides are connected with lien segments, are divided into a parallel quadrilateral patch congruent to each other similar to the former parallel quadrilateral polygon ABCD of the mp×np number. As in the case of the general square polygon, the ij integer coordinate system is composed with an i axis along the side AB, a j axis along he side AD with the parallel square patch including the vertex A being provided as a reference. The identification numbers are attached in accordance with the equation (17). The position vectors p, q, r, s, of the vertex of the parallel quadrilateral patch in the (i, j) are obtained by the equation (40), the equation (41), the equation (42), the equation (43).

When the former coordinate system is the right-hand coordinate, the normal vector of the parallel quadrilateral patch is obtained with the equation (32). When it is a left-hand coordinate, the normal vector of the parallel quadrilateral patch is obtained by the equation (33). The area of the parallel quadrilateral is obtained by the equation (44). The reflectivity produces the patch information with the use of the value the same as the former parallel quadrilateral polygon ABCD.

The patch information storing apparatus 2 retains in a table form the patch information to be transferred through the data bus 11, produced by the patch reproducing apparatus 1. The patch information produced from one polygon is retained in one group form in the identification number order, is provided with identifiers from which polygon the patch information is identified. In this manner, it is found that from which polygon the patch information is produced.

The element reproducing apparatus 3 reads out through the data bus 11 the patch information stored in the patch information storing apparatus 2 so as to produce the element function composed of the coordinates of the calculation representative point position which is the calculation unit in the direct light calculation and the direct light calculation time, the area of the element, the normal vector, the reflectivity and the identification number. The patch of the patches which are the objects of the embodiment information production is triangle patch, the general square patch, the parallel square patch produced in the above described patch information production. As the producing method of the patch information is different in type, the type of the respective patches and the producing method of the elements about them will be described.

Figure 4:
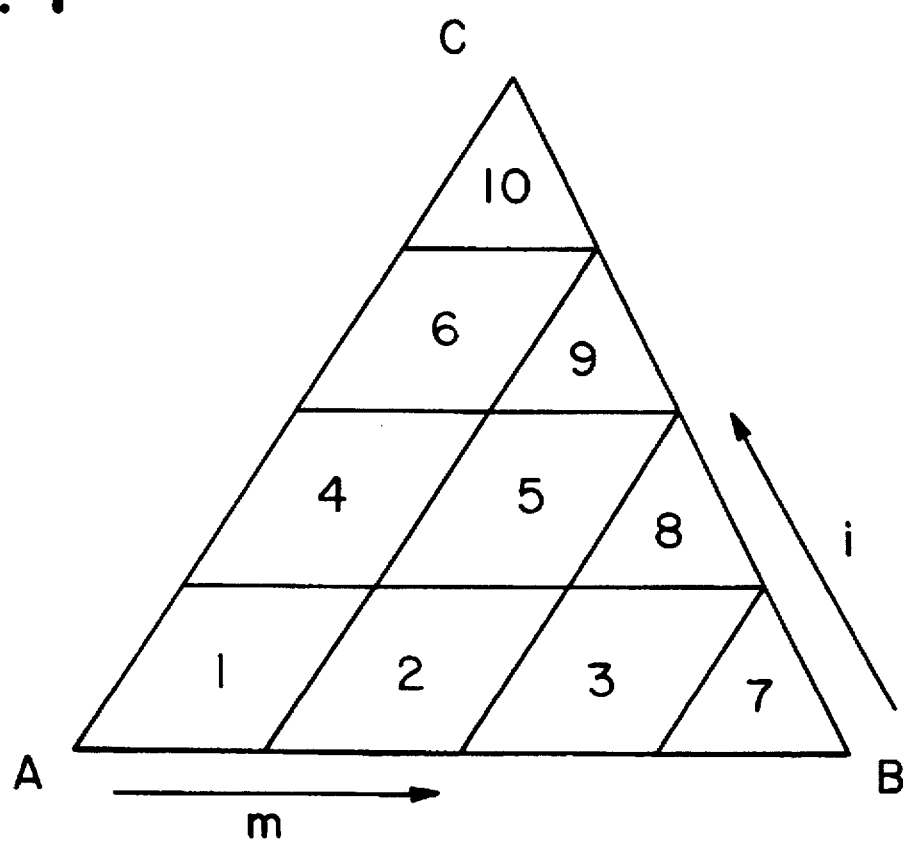
FIG. 4 is a view where a triangle patch is divided in element in the same embodiment.

The position vectors of the vertex are a, b, c with respect to the triangle patch ABC. The element decomposition width is decided, the element decomposition number ne is obtained by the equation (45) by the use of the element decomposition width given from the outside or from the inclination of the shadow boundary of the ratio between the patch for effecting the light source and the radiation and the maximum side of the triangle patch ABC. The respective sides of the triangle patch ABC is equally ne divided, and the equal dividing points corresponding to the side BC from the equal dividing point of the side AB, CA are connected with line segments, are divided into the parallel quadrilateral element congruent to each other of ne(ne−1)/2 and a triangle element congruement to each other similar to the former triangle patch ABC of ne number. The mi integer coordinate system is provided as in FIG. 4 with m axis parallel to the side AB, i axis parallel to the side BC with the parallel quadrilateral element including the vertex A being provided as a standard with respect to the parallel quadrilateral element. The identification numbers are attached in accordance with the equation (46). In FIG. 4, ne=4. The identification numbers are attached in accordance with the equation (47) even with respect to the triangle element. Table 3 shows the relationship between the identification number and the (m, i) coordinate in the case of the parallel quadrilateral element. Table 4 shows a case of the triangle element. The position vector x of the calculation representative point of the parallel quadrilateral element of the (m, i) in the mi coordinate system is obtained by the equation (48). The position vector x of the calculation representative position of the (i) triangle element of the i coordinate system is obtained by the equation (49). Assume that the normal vectors of the parallel quadrilateral element, the triangle element are the same as the normal vector of the former triangle patch. The area of the parallel quadrilateral element is obtained by the equation (50). The area of the triangle element is obtained by the equation (51). The reflectivity reproduces the element information with the use of the value the same as the former triangle patch ABC.

The position vectors of the vertex are a, b, c with respect to the general square patch ABCD. The element decomposition width is decided, the element decomposition number ne is obtained by the equation (45) by the use of the element decomposition width given from the outside or from the inclination of the shadow boundary of the ratio between the patch for effecting the light source and the radiation and the maximum side of the general square patch ABCD. The respective side of the general square patch ABCD and the diagonal line AC are equally ne divided, the equal dividing point of the respective sides and the equal dividing point equal to the diagonal line are connected with line segments and are divided into the parallel quadrilateral element congruent to each other of two types of each ne (ne−1)/2 and the general square element congruent to each other similar to the former square patch ABCD of ne number. The ij integer coordinate system is compose as in the case of the patch information production with an i axis along the side AB, a j axis along the side AD with the general square element including the vertex A being provided as a standard. The identification numbers are attached in accordance with the equation (52). When the position vector x of the calculation representative point of the general square, the parallel quadrilateral element of the (i, j) in the ij coordinates system is obtained by the equation (53) in the i>j. In the i=j, it is obtained by the equation (54). In the i<j, it is obtained by the equation (55). The normal vector of the general square, the parallel quadrilateral element is assumed the normal vector the same as the former general square patch ABCD. When the area of the general square, the parallel quadrilateral element is j>j, it is obtained by the equation (56). It is obtained by the equation (57) in the i=j. In the i<j, it is obtained by the equation (58). The reflectivity produces the element information with the use the value the same as the former general patch ABCD.

The position vectors of the vertex are a, b, c with respect to the parallel quadrilateral patch ABCD. The element decomposition width is decided, the element decomposition number ne is obtained by the equation (45) by the use of the element decomposition width given from the outside or from the inclination of the shadow boundary of the ratio between the patch for effecting the light source and the radiation and the maximum side of the parallel quadrilateral patch ABCD. The respective sides of the parallel quadrilateral patch ABCD is equally ne divided, and the equal dividing points corresponding to the opposite side are connected with line segments, are divided into the parallel quadrilateral element congruent to each other of ne(ne−1)/2 and a triangle element congruent to each other similar to the former parallel quadrilateral patch ABCD of ne piece number. As in the general square patch, the ij integer coordinate system si composed with an i axis along the side AB, a j axis along the side AD with the parallel quadrilateral element including the vertex A being provided with a standard. The identification numbers are attached in accordance with the equation (52). The position vector x of the calculation representative portion of the parallel quadrilateral element of the (i, j) in the ij coordinate system is obtained by the equation (59). The normal of the parallel quadrilateral element is assume to be the same as the normal vector of the former parallel quadrilateral patch. The area f the parallel quadrilateral patch is obtained by the equation (60). The reflectivity produced the element information with the uee the value the same as the former parallel quadrilateral patch ABCD.

Figure 5:
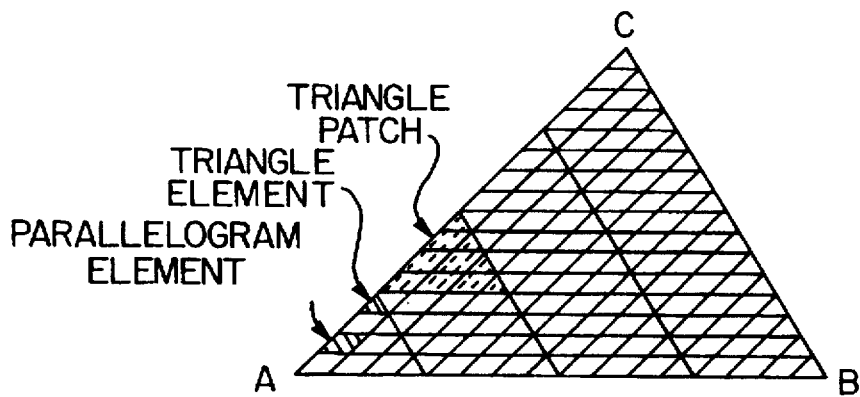
FIG. 5 is a view where a triangle polygon gone is divided in patch, divided in element in the same embodiment.
Figure 6:
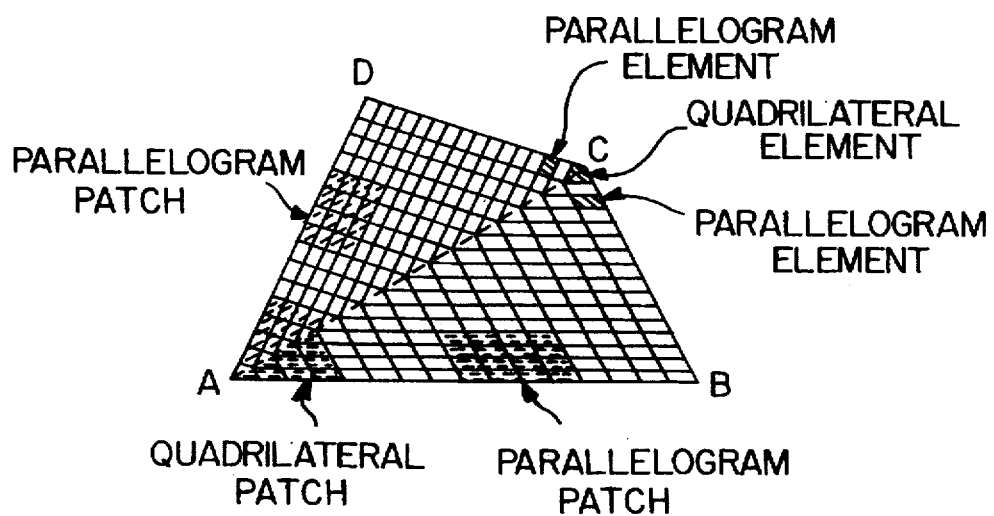
FIG. 6 is a view where a general square polygon is divided in patch, is divided in element in the same embodiment.
Figure 7:
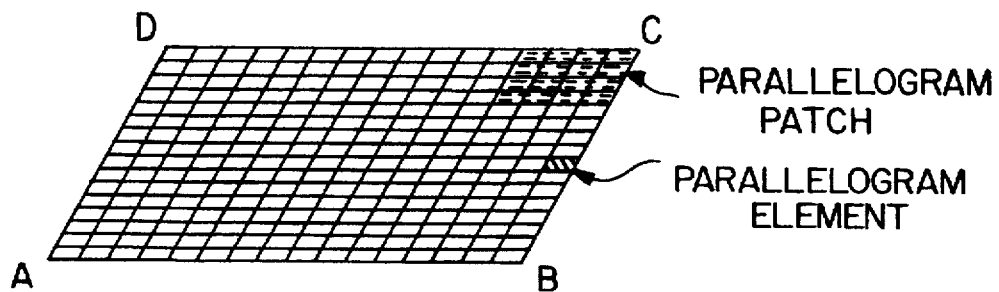
FIG. 7 is a view where the parallel quadrilateral polygon is divided in patch, is divided in element in the same embodiment.

FIG. 5 shows a triangle polygon, FIG. 6 shows a general square polygon, FIG. 7 shows a parallel quadrilateral polygon in the case of the division into the patch and the element.

The element information storing apparatus 4 retains in a table form the element information transferred through the data bus 11 reproduced in the element producing apparatus 3. The element information produced from one patch is retained in one group in the order of the identification numbers and the identifiers are attached so that the identification about the production from the patch may be effected.

Figure 8:
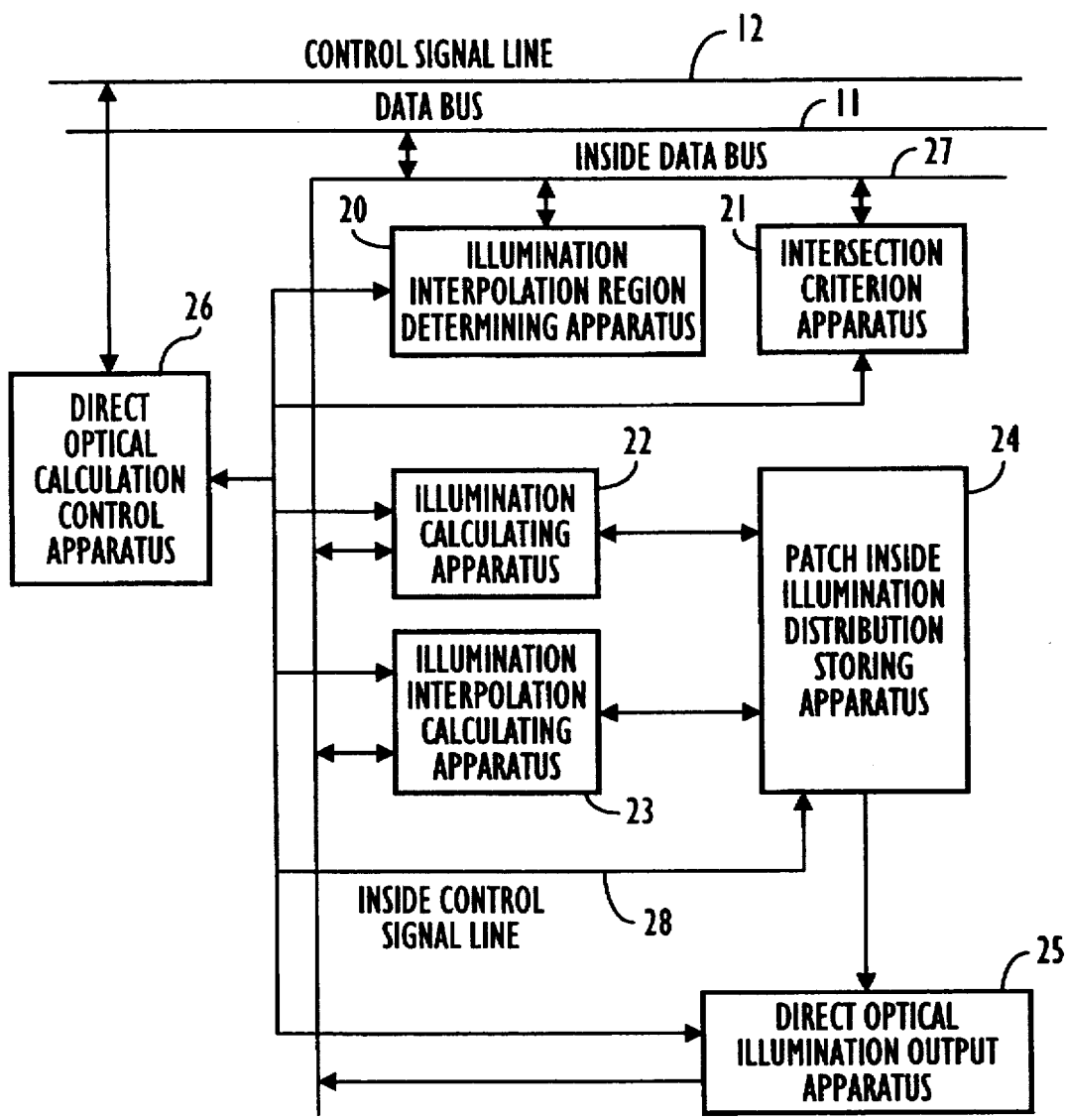
FIG. 8 is a block diagram of a direct illuminance calculating apparatus in the same embodiment.

The direct light calculating apparatus 5 is adapted to calculate the illumination intensity value to be directly obtained from the light source. The direct light calculating apparatus 5 will be described with reference to FIG. 8. In FIG. 8, reference numeral 20 is an illumination intensity interpolation domain deciding apparatus for deciding the domain to be interpolated in the illumination intensity, reference numeral 21 is an intersection deciding apparatus for effecting the intersection test to check the presence of the scanning body between the calculation representative points of the light source and the element, reference numeral 22 is an illumination intensity calculating apparatus of calculating the illumination intensity value in the calculation representative point of the element, reference numeral 23 is an illumination intensity interpolation calculating apparatus for obtaining with the interpolation calculation the illumination intensity value of the calculation representative point of the element within the interpolation domain with the use of the illumination intensity value of the sample element, reference numeral 24 is a patch internal illumination intensity distribution storing apparatus for temporarily storing the illumination intensity value in the calculation representative point of the element within the patch, reference numeral 25 is a direct light illumination intensity outputting apparatus for outputting the illumination intensity value stored in the patch internal illumination intensity distribution storing apparatus 24, reference numeral 26 is a direct light calculation controlling apparatus for effecting the scheduling management and the control of the respective apparatus for composing the direct light calculating apparatus 5, reference numeral 27 is a internal bus, reference numeral 28 is an internal control signal line.

The direct light calculation apparatus 5 composed as described hereinabove will be described hereinafter in its operation.

The internal data bus 20 is connected with the data bus 11. The illumination intensity interpolation domain deciding apparatus 20 connected with the internal data bus 27 read out the patch information from the patch information storing apparatus 2 through the internal data bus 27. The element information of the element included in the patch interior from the identification of the patch is read out from the element information storing apparatus 4 so as to select the sample element from among the elements. The element to be selected as the sample element is different in the form of the patch. In the case of the triangle patch, the element of three parallel quadrilaterals corresponding to the vertex is selected as the sample element with respect to the group of the parallel quadrilateral element arranged in a triangle. Two triangle elements corresponding to the end point is selected as the sample element with respect to the group of the triangle element similar to the former triangle patch arranged in a linear line. In the case of the general quadrilateral patch, two general square elements corresponding to the end point is selected as the sample element with respect to the group of the general square element similar to the former general square patch arranged on the diagonal line.

Three elements corresponding to the vertex are selected as the sample element respectively to the each group with respect to the group of the parallel quadrilateral element arranged in two triangle shape which can be made when the group of the general square element similar to the former general square patch arranged on diagonal line is removed. In the case of the parallel square patch, two parallel quadrilateral elements corresponding to the end with respect to the group of the parallel quadrilateral element similar to the former parallel quadrilateral patch arranged on the diagonal line as in the general quadrilateral in terms of position are selected as the sample element. Three elements corresponding to the vertex are selected as sample element respectively to each group with respect to the group of the parallel quadrilateral element similar to the former quadrilateral patch arranged in diagonal line.

Light source information composed of the additional invention such as light source intensity, the coordinate the light source position, the type of the light source, direction dependence and so on are inputted from the external portion apparatus through the external input, output interface apparatus 14 and the data bus 11 to the illumination intensity interpolation domain deciding apparatus 20. The light source information is also directly inputted from the film form, or the key board when the external apparatus is a normal computer as in the polygon information. The intersection test to check the presence of the screening body among the calculation representative points of the light source and the sample element is effected with the intersection deciding apparatus 21 connected with the internal data bus 27 with the use of the element information of the light source information and the sample element. A method of deciding whether or not polygons to be intersected on the line segment connecting the calculation representative points of the light source and the element is simplest as a intersection testing method. Intersecting points are calculated from the equation of the plane including the polygon and the equation of the straight lines including the lien segments for connecting the calculation representative points of the light source and the element with respect to all the polygons. The intersection test is effected by whether or not the intersecting point stays in the domain for stipulating the polygon and stays on the line segment for connecting the calculation representative points of the light source and the element. In addition, there are intersection deciding methods. Any intersection on deciding method to be used normally in the ray-tracing will do. More time is taken in the intersection test when the intersecting test is effected to all the polygons. The speed of the intersection test will be remarkably made faster if the intersection test is adapted to be effected only for the polygons belong to the partial space through which the position of the light source is connected with the calculation representative point of the element with the space existing of the body being divided in advance, polygons belonging to the divided partial space being classified. A faster intersection tests will do with the use of the Shadow Buffer method and the Bounding volume method. A much faster operation can be effected if these faster intersection tests are used as in the above description.

By the intersection test results, the boundary of the interpolation domain of the illumination intensity and the domain of the shadow so as to the decide the interpolation domain of the illumination intensity and the domain of the shadow. A method of deciding the interpolation domain is different between the triangle patch and the general square patch, the parallel quadrilateral patch. Each of them will be described concretely hereinafter.

Figure 9:
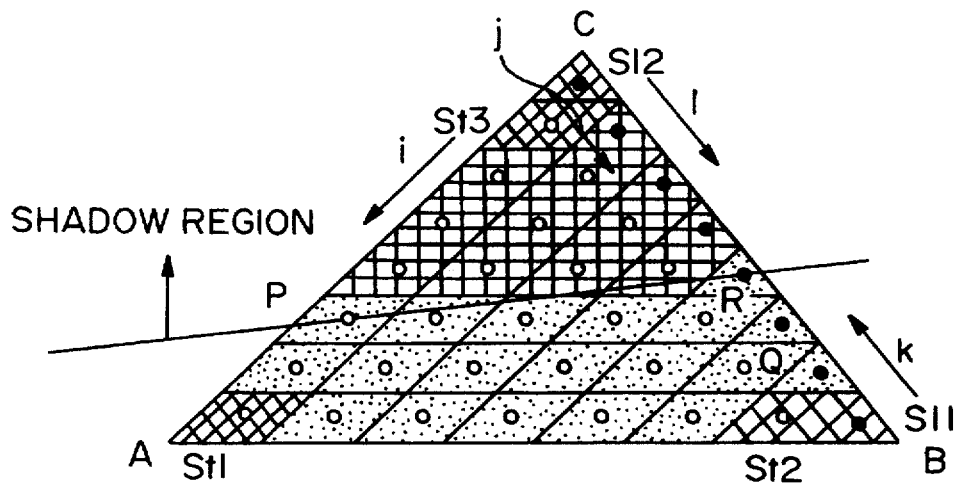
FIG. 9 is an illustrating view of an shadow boundary referring algorithm in one point intersection in a triangle patch in the same embodiment.
Figure 10:
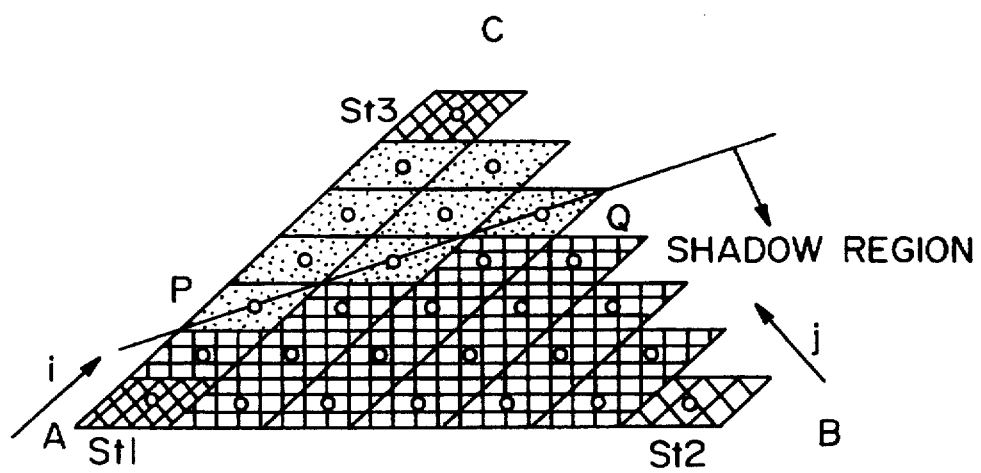
FIG. 10 is an illustrating view of an shadow boundary referring algorithm in two-point intersection in a triangle patch in the same embodiment.

In the case of the triangle patch, the intersection test is effected on three sample elements corresponding to the vertex with respect to the group of the parallel quadrilateral element arranged in a triangle shape. When three sample elements are not intersection in the result of the intersection test, it is decided that all the parallel quadrilateral elements of the group of the parallel quadrilateral arranged in a triangle shape belong to the domain of the shadow. When three sample elements are intersected in the result of the intersection test, it is decided that all the parallel quadrilateral elements of the group of the parallel quadrilateral element arranged in a triangle shape belong to the domain of the shadow. When one sample element of three sample elements is intersected in the result of the intersection test, and two sample elements are not intersected, the description will be given with the use of FIG. 9. In FIG. 9, the sample element of the group of the parallel quadrilateral element arranged in a triangle shape shows the situation decided that St3 has been intersected in St1, St2, St3. The intersection test is repeated until the intersecting operation is effected no longer with respect to the respective parallel quadrilateral element arranged along two sides of the triangle in the i, j direction in FIG. 9 with St3 as a basic point. Assume that the parallel quadrilateral element which has been intersected no longer from the first time in the result of the intersection test is P, Q in FIG. 9, and it is decided that the parallel quadrilateral element including the calculation representative point belong to the interpolation domain of the illumination intensity in a domain surrounded by the calculation representative points of St1, St2, Q, P, and the parallel quadrilateral element except for it belong to the domain of the shadow. The same thing will be effected even when St1 and St2 have been intersected. When two sample elements of the three sample elements are intersected in the result of the intersection test, and one sample element is not intersected, the description will be given with the use of FIG. 10. FIG. 10 shows a situation decided where St1, St2 are intersected. The intersection test is adapted until the intersection is effected no longer with respect to the respective parallel quadrilateral elements arranged along two sides of the triangle in the i, j direction in FIG. 10. Assume that the parallel quadrilateral element which has been intersected no longer from the first time is P, Q in FIG. 10, and it is decided that the parallel quadrilateral element including the calculation representative point belong to the interpolation domain of the illumination intensity in a domain surrounded by the calculation representative points of St3, P, Q and the parallel quadrilateral element except for it belong to the domain of the shadow. The same thing will be effected even when St1, St3 and St2, St3 have been intersected.

The intersection test is effected upon the two sample elements with respect to the group of the triangle element similar to the former triangle patch arranged in a straight line. When both the sample elements are intersected in the result of the intersection test, it is decided that all the triangle elements of the group of the triangle element arranged in a straight line belong to the interpolation domain of the illumination intensity. When both two sample are intersected in the result of the intersection test, it is decided that all the triangle elements of the group of the triangle element arranged in a straight line belong to the domain of the shadow. When one sample element of the two sample elements is intersected in the result of the intersection test, and one sample element is not intersected, the description will be given with the use of FIG. 9. In FIG. 9, it is decided showing that the sample element of the group of the triangle element arranged in a straight line is intersected in S12, of S11, S12. The intersection test is repeated until the intersection is effected no longer with respect to the triangle element in the one direction of FIG. 9 with S12 being provided as a basic point. Assume that the triangle element which has been intersected for the first time in the result of the intersection test is R in FIG. 9, it is decided that the triangle element between the S11, R belong to the interpolation domain of the illumination intensity and it is decided that the triangle element except for it belong to the shadow of the shadow. The same thing can be effected even when the S11 has been intersected.

In the general square, it is effected as in the parallel quadrilateral element of the triangle patch with respect to the group of the parallel quadrilateral element arranged in two triangle shape. It is effected as in the triangle element of the triangle patch with respect to the general square element on the diagonal line. The intersection test is effected upon the three small elements with respect to the group of the parallel quadrilateral element arranged in two triangles. When three sample elements are not intersected in the result of the intersection test, it is decided that the all the parallel quadrilateral elements of the group of the parallel quadrilateral element arranged in a triangle shape belong to the interpolation domain of the illumination intensity. When three sample elements are intersected in the sort of the intersection test, it is decided that all the parallel quadrilateral element of the group of the parallel quadrilateral element arranged a triangular shape belong to the domain of the shadow. When one sample of three sample elements is intersected in the result of the intersection test. When two sample element is not intersected, the intersection test is repeated until the intersection is effected no longer with respect to the respective parallel element arranged along two sides of the triangle with the intersected sample element being provided as a basic point. It is decided the parallel quadrilateral element including the representative point belong to the interpolation domain of the illumination intensity in a domain surrounded by the calculation representative point of the two sample element decided that the intersection is not effected in the calculation representative point of the parallel quadrilateral element not intersected of the first time and the in the first intersection test. It is decided that the parallel quadrilateral element except for it belong to the domain of the shadow. When two sample elements of three sample elements are intersected in the result of the intersection test, a one sample element is not intersected, the intersection test is repeated until the intersection is effected no longer with respect to the respective parallel quadrilateral element arranged along two sides of the triangle towards the element not intersected with intersected two sample elements being provided as a basic point. It is decided that the parallel quadrilateral element including the calculation representative point belong to the interpolation domain of the illumination intensity and the parallel quadrilateral element except for it belong to the domain of the shadow in a domain surrounded by the calculation representative portion of the parallel quadrilateral element not intersected for the first time and by the calculation representative portion of the one sample element decided that the intersections not effected at the first intersection test. The intersection test is effected on two sample elements with respect to the group of the general square element arranged on the diagonal line. When two sample elements are not intersected in the result of the intersection test, it is decided that all the general square elements of the group of the general square element arranged on the diagonal line belong to the interpolation domain of the illumination intensity. When the two sample elements are not intersected in the result of the intersection test, it is decided that all the general square elements of the group of the general square element arranged on a diagonal line belong to the domain of the shadow. When one sample element of two sample elements in the result of the intersection test, and one sample element is not intersected, the intersection is repeated until the intersection is effected no longer with respect of the respective general square elements in an order towards the sample element not intersected with the intersected element being provided as a basic point. It is decided that the general square element between the calculation representative point of the element which has been intersected of the first time and the sample elements decided that the intersection is effected no longer at the first intersection test belong to the intersection domain of the illumination intensity. It is decided that the general square element except for it belong to the domain of the shadow.

Even in the parallel square patch, the similar thing can be effected as in the general square patch. The intersection test is effected upon three sample elements with respect to the group of the parallel quadrilateral element arranged in two triangle shapes. When three sample elements are not intersected in the result of the intersection test, it is decided that all the parallel quadrilateral elements o the group of the parallel quadrilateral element arranged in a triangle shape belong to the interpolation domain of the illumination intensity. When three sample elements are intersected in the result of the intersection test, it is decided that all the parallel quadrilateral elements of the group of the parallel quadrilateral element arranged in a triangle shape belong to the domain of the shadow. When one sample element of three sample elements is intersected in the result of the intersection test, two sample elements are not intersected, the intersection test with respect to the respective parallel quadrilateral arranged long two sides of the triangle is repeated until the intersection is effected no longer. The parallel quadrilateral element including the calculation representative point belong to the interpolation domain of the illumination intensity in a domain surrounded by the calculation representative point of the parallel quadrilateral element which has not been intersected for the first time and the calculation representative point of two sample elements decided that the intersection is not effected in the first intersection test. It is decided that the parallel quadrilateral element except for it belong to the domain of the shadow. When two sample elements of three sample elements are intersected in the result of the intersection test, and one sample element is not intersected, the intersection in test is repeated until the intersection is effected no longer with respect to the respective parallel quadrilateral arranged along two sides of the triangle towards the element not intersected with the selected two sample element being provided as a basic point. It is decided that the parallel quadrilateral element including the calculation representative pint belong to the interpolation domain of the illumination intensity in a domain surrounded by the calculation representative pint of the parallel quadrilateral element which has been effected no loner for the fist time and the calculation representative pint of one sample element decided that the intersection is not effected in the first intersection test. It is decided that the parallel quadrilateral except for it belong to the domain of the shadow.

The intersection test is effected upon two sample elements with respect to the group of the parallel quadrilateral element arranged on a diagonal line. When two sample elements are not intersected in the result of the intersection test, it is decided that all the parallel quadrilateral elements of the group of the parallel quadrilateral element arranged on the diagonal line belong to the interpolation domain of the illumination intensity. When two sample elements are not intersected in the result of the intersection test, it is decided that all the parallel quadrilateral elements of the group of the parallel quadrilateral arranged on a diagonal line belong to the domain of the shadow. When one sample of the two sample elements is intersected in the result of the intersection test, and the one sample is not intersected, the intersection test is reaped until the intersection is effected no longer with respect to the respective parallel quadrilateral elements in an order towards the sample element not intersected with the intersected sample element being provided as a basic point. It is decided that the parallel quadrilateral element between the calculation representative point of the element not intersected for the first and the sample element decided that the intersection is not effected in the first intersection test belong to the domain of the intersection of the illumination intensity. It is decided that the parallel quadrilateral element except for it belong to the domain of the shadow.

The illumination intensity calculating apparatus 22 connected with the internal data bus 27 calculates the illuminating value in the calculation representative point of the element which becomes a basic point of the intersection of the elements including the illumination intersection region with the use of the element information and the light source information with respect to the illumination intensity intersection domain decided like this. The elements which become a basic point of the intersection are St1, St2, P, Q with respect to the group of the parallel quadrilateral element arranged in the triangle shape of FIG. 9 and S11, R with respect to the group of the triangle elements arranged in a straight line, are St3, P, Q in FIG. 10. The calculation model for the calculation of the illumination intensity value is contained in accordance with the equation (108) in the case of the direction dependent point light source with the use of the model of the irregular reflection in the case of the point light source.

$$B = \frac{\rho Gr \cdot N}{\|r\|(c_0 + c_1\|r\| + c_2\|r\|^2)} \quad (108)$$

wherein G is a light source intensity in a direction of a calculation representative point of the element for obtaining the illumination intensity value, r is a vector where the calculation representative point of the element is a start, the light source is an end, ρ is a reflectivity of the element, N is a normal vector of the element.

The patch internal illumination intensity distribution storing apparatus 24 stores in accordance with the element identification numbers the illumination intensity value of the element of the patch interior. The illumination value is initialized into the condition of 0 so as to transfer the illumination intensity value in the calculation representative point of the element which becomes the basic point of the interpolation obtained by the illumination intensity calculation apparatus 22 to the patch internal illumination intensity distribution storing apparatus 24 of the condition for renewing the illumination intensity value to a obtained value and storing it in the corresponding storing domain in accordance with the identification number of the element.

Figure 11:
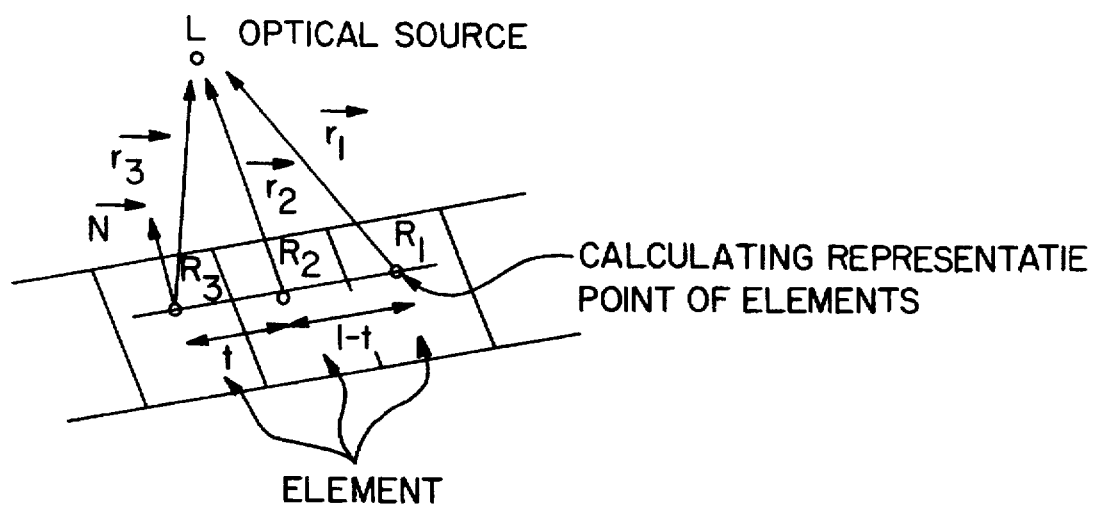
FIG. 11 is an illustrating view for interpolation equation guidance in a point light source in the same embodiment.

The illumination intensity interpolation calculation apparatus 23 connected with the internal data bus 27 calculation the illumination intensity value in the calculation representative point of the element remaining within the illumination intensity interpolating domain. The interpolation equation to use is different in accordance with the point light source and the direction dependent point light source. The illumination intensity value is obtained respectively with the use of the nest interposition equation. The point light source will be described in accordance with FIG. 11. Assume that the relation of r2=tr1+(1−t)rs is established where the position of the point light source is L, the light source intensity of the point light source is G, points R1, r2, R3 are positions of the calculation representative points of the elements, the illumination intensity values (radiosity values) in the points r1, R2, R3 are B1, B2, B3. The normal vectors of the elements are N, the reflectivity of the element is ρ, the vector (R1L) is r1, the vectors (R2L) is r2, the vectors (R3L) is r3. The illumination intensity value B1, B3 is represented by $$B_1 = \frac{\rho Gr_1 \cdot N}{\|r_1\|(c_0 + c_1\|r_1\| + c_2\|r_1\|^2)} \quad (109)$$

$$B_3 = \frac{\rho Gr_3 \cdot N}{\|r_3\|(c_0 + c_1\|r_3\| + c_2\|r_3\|^2)} \quad (110)$$

in accordance wit the calculation model of the irregular reflection. Assume that the illumination intensity value B1, B3 are known, the relation of the equation (63) is established as for B2. The equation (63) is equivalent to the calculation model of the former irregular reflection in terms of the calculation precision. If $$\|r_1\| \approx \|r_3\| \quad (111)$$

is established in the equation (63), the equation (63) becomes the equation (62). Am equation (111) is replaced by the equation (61) when the distance from R1 to L or from R3 to the L is larger than the distance between R1 and R3.

Figure 12:
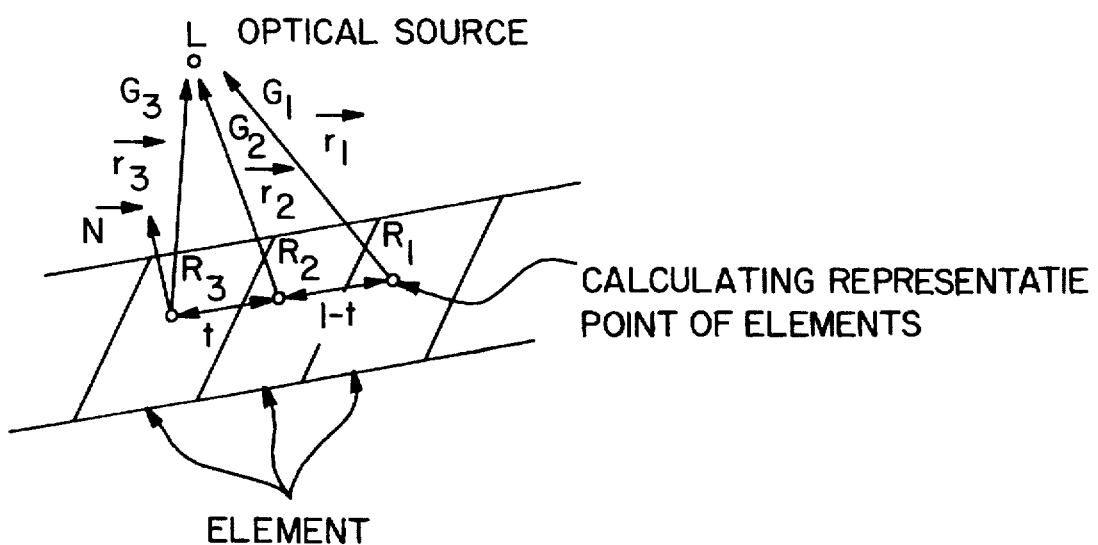
FIG. 12 is an illustrating view of interpolation equation guidance in a direction dependent point light source in the same embodiment.

The direction dependent point light source will be described hereinafter in accordance with FIG. 12. The relationship of the r2=tr1+(1−t)r3 is established wherein A point L is a position the direction dependent point light source, points R1, r2, R3 are positions of the calculation representative point of the element, the illumination intensity values (radiosity values) in the points R1, R2, R3 are B1, B2, B3, the light source intensity in the points R1, r2, r3 directions are G1, G2, G3, the normal vector element is N, the reflectivity of the element is p, the vector (R1L) is r1, the vector (R2L) is r2, the vector (R3L) are rs. The illumination intensity values B1, B3 become $$B_1 = \frac{\rho G_1 r_1 \cdot N}{\|r_1\|(c_0 + c_1\|r_1\| + c_2\|r_1\|^2)} \quad (112)$$

$$B_3 = \frac{\rho G_3 r_3 \cdot N}{\|r_3\|(c_0 + c_1\|r_3\| + c_2\|r_3\|^2)} \quad (113)$$

in accordance with the calculation equation of the direction dependent point light source. When the illumination intensity values B1, B3 are known, an equation (65) is established if G1≠0 and G3≠0 as for B2, an equation (66) is established if G1=0 and G3≠0, an equation (67) is established if G1 ≠0 and G3=0, an equation (68) is established if G1=0 and G3≠0. The above described equation (65), equation (66), equation (67), equation (68) are equivalent to the illumination intensity calculation equation of the former direction dependent point light source in terms of the calculation precision. When the equation (64) is established as in the case of the point light source, the equation (69) is established if G1≠0 and G3≠0 in accordance with the equation (65), the equation (66), the equation (67), the equation (68). The equation (70) is established if G1=0 and G3≠0. The equation (71) is established if G1≠0 and G3=0. An equation (72) is established if G1=0 and G3=0.

Figure 19:
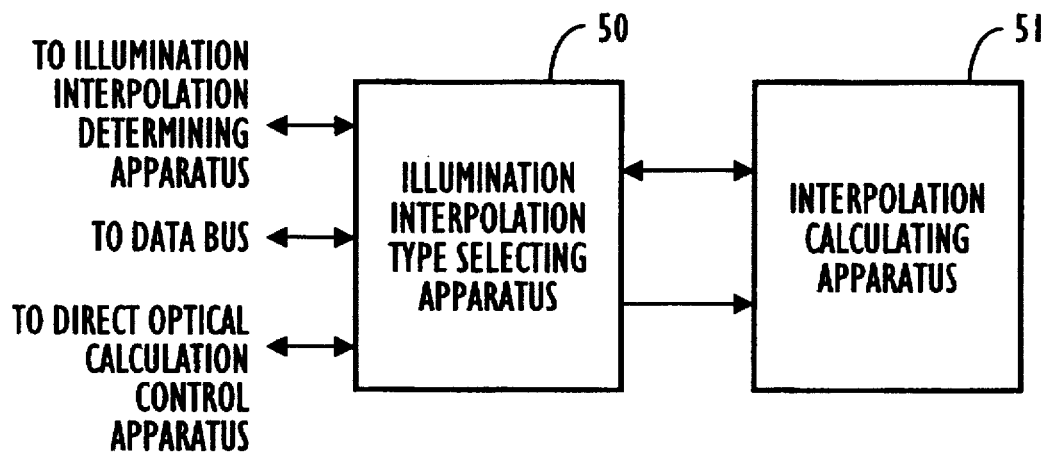
FIG. 19 is a block diagram of an illumination intensity interpolating calculating apparatus in the same embodiment.

When the interpolation calculation is effected in the calculation accuracy with the calculation model equation of the former irregular reflection calculation model and the calculation intensity calculation equation of the direction dependent point light source being equivalent, the illumination intensity interpolation calculating apparatus 23 effects identification between the point light source and the direction dependent point light source so as to effect the interpolation in accordance with the equation (63) in the case of the point light source, the interpolation calculation in accordance with the equation (65), the equation (66), the equation (67), the equation (68) in the case of the direction dependent point light source. Although the calculation accuracy is slightly reduced, the illumination interpolation calculation apparatus 23 can be realized by the construction of FIG. 19 so as to provided the higher speed. The calculation accuracy can be adjusted with the threshold value of the equation (61) or the equation (64). In FIG. 19, reference numeral 50 is an illumination intensity interpolation type selecting apparatus, reference numeral 51 is an interpolation calculation apparatus. In an illumination interpolation calculating apparatus 23 composed in this manner, the illumination intensity interpolation type selecting apparatus 50 selections the interpolation type by whether or not the conditions equation (61), the equation (64) are satisfied. When the conditional equation (61) is not satisfied in the case of the point light source, the equation (63) is selected. When the conditional equation (64) is not satisfied in the case of the direction dependent point light source, the equation (65), the equation (66), the equation (67) or the equation (68) is selected in accordance with the condition of the light source intensity. The actual interpolating calculation is effected by the interpolation calculating apparatus 51 in accordance with the selection. When the conditional equation (61) is satisfied in the case of the point light source, the equation (62) is selected. When the condition equation (64) is satisfied in the case of the direction dependent pint light source, the equation (69), the equation (70), the equation (71) or the equation (72) is selected. The actual interpolating equation is effected by the interpolation calculating apparatus 51 in accordance with the section. Parameter t necessary for the interpolation calculation sets an integer coordinate system parallel to two sides extending from the vertex from each vertex, with the identification number of the element being shown as the function of the coordinate in the integer coordinate system, obtains a parameter t from the coordinates in the inter coordinate system of the element which become a basic point of the interpolation and the coordinates of the element for reflecting the interpolation. The identification number of the element interpolated is also calculation from the coordinates. A value obtained by the illumination intensity interpolation calculating apparatus 23 is transferred to the patch internal illumination intensity distribution storing apparatus 24 and the obtained value is renewed and stored as the illumination intensity value in the calculation representative point of the element in the storing domain equivalent to the identification number of the element. The direct light illumination intensity outputting apparatus 25 is connected with the internal data bus 27, and transfers, stores the data stored in the patch internal illumination intensify distribution storing apparatus after the completion of the calculation of the illumination intensity value as the illumination intensity value and the non-radiation energy value (unshot value) to the illumination intensity distribution storing apparatus 8 through the internal data bus 27 and the data bus 11. After the transferring operation, the patch internal illumination intensity distribution storing apparatus 24 initialize into the condition of the illumination intensity value 0.

The above described direct light calculation is effected upon all the patches per light source. In the case of a plurality of light sources, the direct light calculation with respect to all the patches are repeated by the light source number. The direct light calculation controlling apparatus 26 effects the scheduling management and the controlling operation in accordance with the above described processing procedure of these one series of processing operation.

The patch illumination intensity calculating apparatus 6 calculates the illumination intensity value in the calculation representative point of the patch from the illumination intensity value in the calculation representative point of the element calculated by the direct light calculating apparatus 5 stored in the illumination intensity distribution storing apparatus. The calculating method comprises steps of calculating the energies of the engagement through the multification of the area by the illumination intensity value in the calculation representative point of the element, obtaining the energies across all the elements of the patch interior, dividing the total by the area of the patch so as to calculate the illumination intensity value of the patch. The illumination intensity value obtained in accordance with the calculating method is transferred, and stored into the storing domain provided in accordance with the identification number of the patch of the illumination intensity value illumination intensity distribution storing apparatus 8.

The direct light calculating apparatus 7 obtains the illumination intensity value to be obtained by the interaction among the bodies. The indirect light calculating apparatus 7 will be described in two embodiments.

Figure 13:
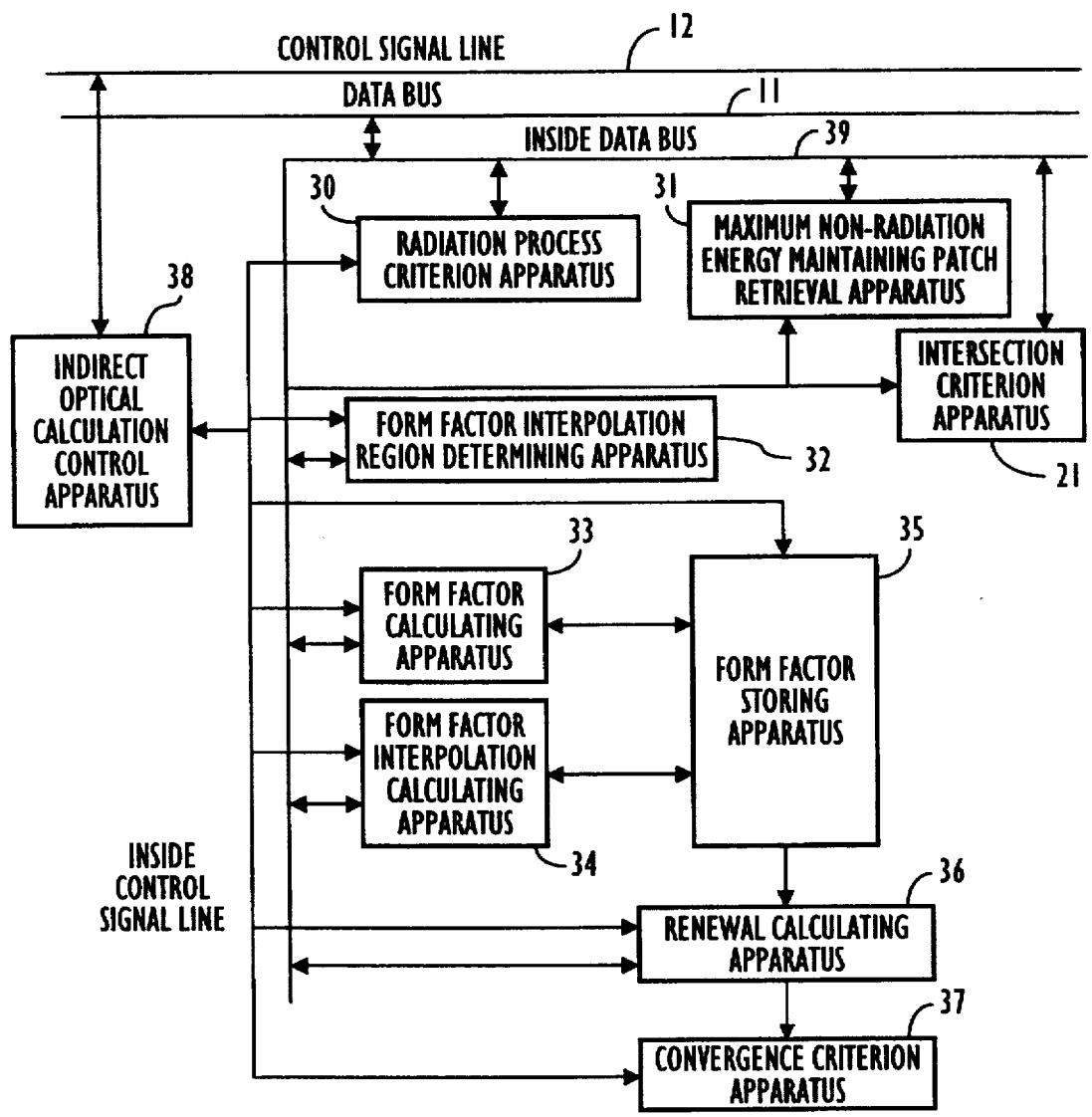
FIG. 13 is a block diagram in a fist embodiment of an interreflection illuminance calculating apparatus in the same embodiment.

A first embodiment of the indirect light calculating apparatus 7 will be described in its operation in accordance with FIG. 13. In FIG. 13, reference normal 30 is a radiation method deciding apparatus for deciding whether or not the radiation is effected in the patch unit or in the element unit, reference numeral 31 is a maximum non-radiation energy obtaining patch referring apparatus for referring the patch for retaining the maximum non-radiation energies, reference numeral 32 is a form-factor intersecting domain deciding apparatus for deciding the interpolation domain of the form-factor and the domain of the shadow by the referring operation of the boundary between the form-factor interpolation domain and the domain of the shadow, reference numeral 34 is a form-factor interpolation calculating apparatus for calculating by the interpolating calculation the form-factor within the form-factor interpolation domain, reference numeral 35 is a form-factor storing apparatus reference numeral 36 is a renewal calculating apparatus for calculating, adding the illumination intensity value to be obtained by the mutual reflection, reference numeral 37 is a focus deciding apparatus for deciding whether or not the indirect light calculation is effected by necessary frequency, reference numeral 38 is a direct light calculation controlling apparatus for effecting the scheduling management and the operation control between the apparatuses, reference numeral 39 is a internal data bus, reference numeral 40 is a internal control signal line. The indirect light calculating apparatus 7 as constructed above will be described hereinafter in this operation.

The maximum non-radiation energy retaining patch referring apparatus 31 decides the patch for retaining the maximum non-radiation energies by the referring the illumination intensity value of the patch stored in the illumination intensity distribution storing apparatus 8 so as to decide the patch for retaining the maximum non-radiation energy. After the decision, all the patches except for the patch for retaining the maximum non-radiation energies effects the following operation with respect to individuals respectively with a patch which becomes an object of the radiation. The radiation method deciding apparatus 30 effect the threshold decision with the ratio of the distance, and the larger area value through the comparison between the calculation representative point of the patch for retaining the maximum non-relation energies and the patch area which becomes an object of the radiation. The calculation error is increased when the radiation is effected between the approached patch and the element. In order to d the calculation error, the radiation has to be effected between the element and the element in the case of approach. The threshold decision gives the decision as to whether or not the approaching operation is effected with respect to each other, and shows the approaching in the case of the larger threshold value.

When the for-factor interpolation domain deciding apparatus 32 has been decided that the decision result of the radiation method deciding apparatus 30 is a threshold value or lower, the radiation to the element which becomes an object of the radiation from the patch for remaining the maximum non-radiation energies, because they are not approached t each other as described hereinabove. The sample element is selected from the element of the patch interior portion of the radiation object. The selecting method of the sample element is to select as the sample element the three parallel quadrilateral corresponding to the vertex with respect to the group of the parallel quadrilateral arranged in a triangle shape in the case of the triangle path as in the illumination intensity interpolation, and to select as the sample element the two triangles elements corresponding to the end with respect to the triangle element similar to the former triangle patch arranged in a straight line. The method is to select as the sample element the two general square element corresponding to the end with respect to the group of the general square element similar to the former general square patch arranged on the diagonal line, and selects as the sample element three elements corresponding to the vertex respectively with respect to each group with respect to the group of the parallel quadrilateral arranged in two triangles which can be made when the group of the general square element similar to the former general square patch arranged on the diagonal line. In the case of the parallel quadrilateral patch, two parallel quadrilateral element corresponding to the end are selected as the sample with respect to the parallel quadrilateral element similar to the former parallel quadrilateral patch arranged on the diagonal line. Three elements corresponding to the vertex are selected as sample element respectively to the respective groups with respect to the group of the parallel quadrilateral element similar to the former parallel quadrilateral arranged in two triangles which can be made when the group of the parallel quadrilateral element similar to the former parallel quadrilateral patch arranged on the diagonal line.

The interpolation domain of the form-factor is decided. The decision as to whether or not the radiation energies reach from an inner product of a vector where the calculation representative point of the patch having the maximum non-radiation energies is a start, and the calculation representative point of the sample element is an end, and a normal vector of a patch having the maximum non-radiation energies, and an inter productive of the triangle patch is effected on three sample elements with respect of the group of the parallel element arranged on a triangle shape in the case of the triangle patch. This is effected s as to remove it as the radiosity does not reach onto the reverse side of the radiation face and on the face of the position to be directed at the reverse with respect to the radiation face. When Ni is a normal vector of the patch on the radiation side, Nj is a normal vector of the element which becomes an object of the radiation, rij is a vector where the calculation representative point of the patch on the radiation side is a start, the calculation representative point of the element which becomes an object of the radiation is an end, $$N_i \cdot r_{ij} > 0, N_j \cdot r_{ij} < 0 \qquad (114)$$

when the above described condition are represented by the equation.

Decision is effected as to whether nor not the radiation energies are reached by the application of the equation (114) to the sample element. The intersection test is effected by the intersection testing apparatus 21 between the calculation representative point of the patch having the maximum non-radiation energies and the calculation representative point of the sample element. When the radiation energies are reached in three sample elements, and the intersection is not effected in the result of the intersection test, it is decided that the all the parallel quadrilateral element of the group of the parallel quadrilateral element arranged in a triangle shape belong to the intersection domain of the form-factor. When the radiation energies are reached in three sample elements or intersection is effected in the result of the intersection test, it is decided that all the parallel quadrilateral elements of the group of the parallel quadrilateral element arranged in a triangle shape belong to the domain of the shadow. When the radiation energies are not reached in one sample element of three sample elements, or the intersection is effected in the result of the intersection test, the radiation energies are reached in two sample elements, the intersection is not effected, coordinates system is set along two sides of the triangle as in the decision of the interpolation domain of the illumination intensity so as to decide the interpolation domain of the form-factor. The decision and intersection decision as to whether or not the radiation energies are reached with respect to the respective parallel quadrilateral elements arranged along two sides of the triangle with the intersected sample element being provided as a basic point are reached until the radiation energies are reached, and the intersection is effected no longer. It is decided that the parallel quadrilateral element including the calculation representative point belong to the interpolation domain of the form-factor in a domain surrounded by the calculation representative point of the parallel quadrilateral element not intersected and the calculation representative point of two sample elements decided where the radiation energies are reached for the first time and the intersection is not effected. It is decided that the parallel quadrilateral element except for it belong to the domain of the shadow. When radiation energies are not reached in two sample elements of three sample elements, or the intersection is effected in the result of the intersection test, radiation energies are reached in one sample element, and the intersection is not effected, it cam be effected as in the decision of the interpolation area of the illumination intensity. The decision and intersection decision as to whether or not the radiation energies are reached are repeated until the radiation energies are reached and the intersection is effected no longer with respect to the respective parallel quadrilateral element arranged along two sides of the triangle towards the element not intersected with intersected two sample elements being provided as a basic point. It is decided that the parallel quadrilateral element including the calculation representative point belong to the intersection domain of the form-factor in a domain surrounded by the calculation representative point of the parallel quadrilateral element not intersected and the calculation representative point of the one sample element decided that the radiation energies are reached for the first time and the intersection is no effected in the intersection test. It is determined that parallel quadrilateral element except or it belong of the domain of the shadow. When the decision and the intersection section as to whether or not the radiation energies are reached to the two sample elements with respect to the group of the triangle element similar to the former triangle patch arranged in a straight line, the radiation energies are reached in two sample elements, and intersection is not effected in the result of the intersection decision, it is decided that the all the triangle elements of the group of the triangle element arranged in a straight line belong to the interpolation domain of the form-factor. When the radiation energies are not reached in the sample elements or the intersection is effected in the result of the intersection test, it is decided that all the triangle elements of the group of the triangle element arranged in a straight line belong to the domain of the shadow. When the radiation energies are not reached in one sample element of two sample elements or the intersection is effected in the result of tee intersection decision, the radiation energies are reached in one sample element, and the intersection is not effected, the decision and the intersection decision as to whether or not the radiation energies are reached with respect to the respective triangle element in an order towards the sample element here the radiation energies are reached and the intersection is not effected with the intersected sample element being provided as a basic point are repeated until the radiation energies are reached and intersection is effected no longer. It is decided the triangle element between the calculation representative point of the element where the radiation energies are reached for he fist time and the intersection is effected no longer and the sample element decided that the radiation energies are reached for the first time and the intersection is not effected in the intersection test belong to the interpolation domain of the form-factor. It is decided that the triangle element except for it belong to the domain of the shadow. In the case of the general square patch and the parallel quadrilateral patch, it is divided into a group of the element arranged in two triangle and a group of the element arranged on a diagonal line. A method similar to the group of the element arranged on a straight line and to the group of the element arranged on the triangle of the case of the triangle patch is applied as in the decision of the interpolation domain of the illumination intensity with respect to each other so as to decide the interpolation domain of the form-factor.

The form-factor calculating apparatus 33 calculates a form-factor value of the element which becomes a basic point of the intersection from the patch for retaining the maximum non-radiation energies in the calculation representative point of the element which becomes a basic point of the intersection of the elements to be included in the form-factor interpolation. The calculation equation of the form-factor as in the case of the interpolation illumination intensity in the position of the element which becomes a basic point of the interpolation becomes as follows, $$F_{ij} = -\frac{1}{A_i} \int_{A_i} \int_{A_j} \frac{(N_i \cdot r_{ij})(N_j \cdot r_{ij})}{\pi \|r_{ij}\|^4} dA_j dA_i = \quad (115)$$

$$-\frac{(N_i \cdot r_{ij})(N_j \cdot r_{ij})}{\pi \|r_{ij}\|^4} A_j$$

where Fij is a form-factor value to the element which becomes an object of the radiation from the patch for retaining the maximum non-radiation energies, rij is a vector where the calculation representative point of the patch for retaining the maximum non-radiation energies is a start, the calculation representative point of the element which becomes an object of the radiation is an end, Ai is an patch area for retaining the maximum non-radiation energies, Aj is an area of an element which becomes an object of the radiation.

As seen from the equation (115), the relation of $$F_{ji} = F_{ij} \frac{A_i}{A_j} \quad (116)$$

is established. If the equation (115) is obtained, it can be converted to the form-factor value to the patch for retaining the maximum non-radiation energies from the element which becomes an object of the radiation with the use of the equation (116).

The form-factor value obtained by the form-factor calculation apparatus 33 is transferred, renewed, stored into the storing domain provided in accordance with the identification number of the element for obtaining the form-factor value of the form-factor storing apparatus 35 in a condition initialized to 0.

Figure 15:
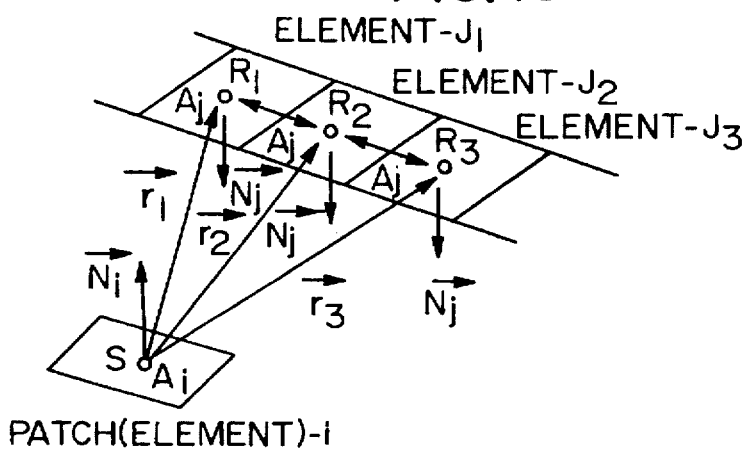
FIG. 15 is an illustrating view of interpolation equation guidance of a form-factor in the same embodiment.

The form-factor interpolation calculating apparatus 34 calculates with the interpolation calculation the form-factor value in the calculation representative point of the remaining element within the form-factor interpolation domain decided by the form-factor interpolation domain deciding apparatus 32. The interpolation calculation equation to be used will be described in accordance with FIG. 15. Assume that the relation of the r2=tr1+(1−t)r3 is established, wherein a point S is a position of the representative point of a patch (element) i, the normal vector of the patch (element) i is Ni, points R1, R2, R3 are positions of the calculation representative points of the elements j1, j2, j3, the normal vector of the elements j1, j2, j3 are Nj, the area of the patch (element) i is Ai, the area of the elements j1, j2, j3 is Aj, the form-factors to the element from the patch (element) i are Fij, the vector (R1L) is r1, the vector (R2L) is r2, the vector (R3L) is r3. Factors Fij1, Fij3 from the equation (115) are $$F_{ij_1} = -\frac{(N_i \cdot r_1)(N_j \cdot r_1)}{\pi \|r_1\|^4} A_j \quad (117)$$

$$F_{ij_3} = -\frac{(N_i \cdot r_3)(N_j \cdot r_3)}{\pi \|r_3\|^4} A_i \quad (118)$$

Therefore, the form-factor Fij2 is obtained by the equation (75) if the form-factor Fij1, Fij3 are known. The equation (75) can be changed into $$F_{j_2 i} = \frac{\|r_1\|^4}{\|r_2\|^4} \left\{ t^2 + t(1-t) \frac{N_i \cdot r_3}{N_i \cdot r_1} \right\} F_{j_1 i} + \quad (119)$$

$$\frac{\|r_3\|^4}{\|r_2\|^4} \left\{ (1-t)^2 + t(1-t) \frac{N_i \cdot r_1}{N_i \cdot r_3} \right\} F_{j_3 i}$$

if the equation (116) is used. It should to be noted at this time that the area of the elements j1, j2, j3 are assumed to be all equal and Aj in the guidance of the equation (75). But in this equation (119), the assumption is not necessary. The equation (75), the equation (119) are equal to the former equation (115) in terms of precision. In the equation (75), the equation

(76) is established if $$\frac{N_i \cdot r_3}{N_i \cdot r_1} \approx 1 \quad (120)$$

If the equation (120) in the equation (119), $$F_{j_2i} = \frac{\|r_1\|^4}{\|r_2\|^4} tF_{j_1i} + \frac{\|r_3\|^4}{\|r_2\|^4} (1-t)F_{j_3i} \quad (121)$$

is established. In the equation (75), the equation (77) is established, if $$\frac{\|r_2\|^4}{\|r_1\|^4} \approx 1, \text{ or } \frac{\|r_2\|^4}{\|r_3\|^4} \approx 1 \quad (122)$$

If the equation (122) in the equation (119), The conditions of the equation (120) of $$F_{j_2i} = \left\{ t^2 + t(1-t)\frac{N_i \cdot r_3}{N_i \cdot r_1} \right\} F_{j_1i} + \quad (123)$$

$$\left\{ (1-t)^2 + t(1-t)\frac{N_i \cdot r_1}{N_i \cdot r_3} \right\} F_{j_3i}$$

can be replaced by the equation (73) and the conditions of the equation (122) can be replaced by the equation (74) as in the point light source at the time of the direct light calculation and in the direction dependent point light source. When the conditional equation (73), the equation (74) are established at the same time, the equation (75) becomes the equation (78) and the equation (119) becomes $$F_{j_2i} = tF_{j_1i} + (1-t)F_{j_3i} \quad (124)$$

Figure 20:
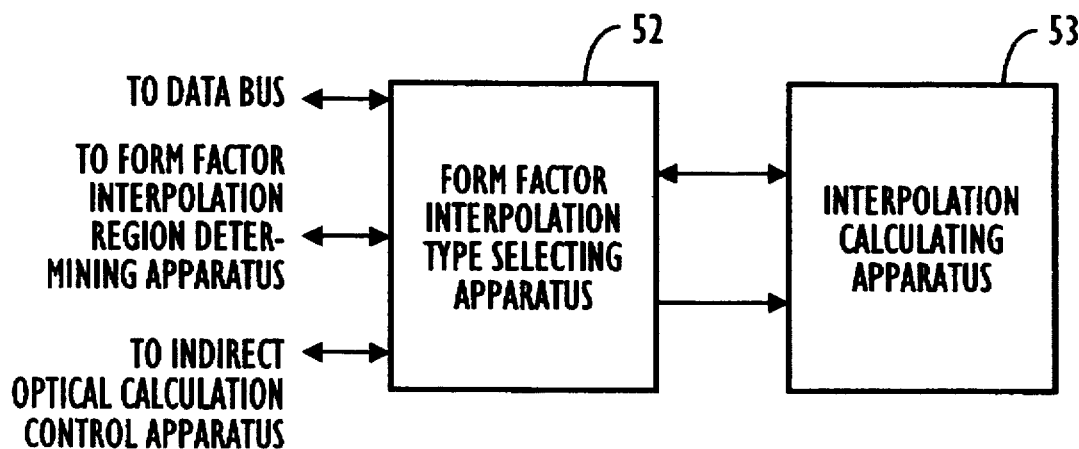
FIG. 20 is a block diagram of a form-factor interpolation calculating apparatus in the same embodiment.

From the above description, the same things can be effected even when the interpolation equation of the type of the equation (119) is considered a base although it becomes an embodiment to be described later when the interpolation equation of a type of the equation (75) is considered a base. The former-factor interpolation calculating apparatus 34 effects the interpolating calculation in accordance with the equation (75) when the equation is required to be effected with the calculation precision remaining the same as the calculation equation (115) of the former form-factor. In order to make the speed faster, the form-factor interpolation calculating apparatus 34 can be realized by the construction of FIG. 20. In FIG. 20, reference numeral 52 is a form-factor interpolation equation selecting apparatus for selecting the interpolation equation to be used, reference numeral 53 is an interpolation calculating apparatus for actually effecting the interpolating calculation. In the above described construction, a decision is effected as to whether or not the equation (73), the equation (74) are satisfied by the form-factor interpolation equation selecting apparatus 52. When the equation (73) and the equation (74) are not satisfied as the decision result, the equation (75) is selected as an interpolation equation. The equation (76) is selected as an interpolation equation when the equation (73) is satisfied, but the equation (74) is not satisfied. The equation (77) is selected as an interpolation equation when the equation (73) is not satisfied, but the equation (74) is satisfied. When both the equation (73) and the equation (74) are satisfied, the equation (78) is selected as an interpolation equation. The interpolation calculating apparatus 53 effects the actual interpolating calculation in accordance with the above described selection.

The form-factor value obtained by the form-factor interpolation calculating apparatus 34 is transferred, renewed, stored into the storing domain provided in accordance with the identification numbers of the elements of the form-factor storing apparatus 35. The renewing calculation of the illumination intensity value is effected by the renewal calculating apparatus 36 when the form-factor value is obtained with respect to all the elements of the patch interior which becomes an object of the radiation, and they are stored in the form-factor storing apparatus 35. The renewal calculating equation is $$\Delta Rad = \rho U_i F_{ij} \frac{A_i}{A_j} = \rho U_i F_{ji} \quad (125)$$

$$U_j + = \Delta Rad \quad (126)$$
$$B_j + = \Delta Rad \quad (127)$$

in the C language description, wherein ε is the reflectivity of an element which becomes an object of the radiation, Bj is an illumination intensity value of the element which becomes an object of the radiation, Uj is the non-radiation energies of the element which becomes an object of the radiation, Ui is the non-radiation energies of the patch for retaining the maximum non-radiation energies, Fij is a form-factor value calculated with the above described method, Aj is an area of the element which becomes an object of the radiation, Ai is an area of a patch for retaining the maximum non-radiation energies, ΔRad is increment intensity illumination intensity to be acquired by the element which becomes an object of the radiation. After the renewal calculation completion, the renewal calculated value is outputted to the internal data bus 39, is transferred, stored into the storing domain provided in accordance with the identification numbers of the illumination intensity distribution storing apparatus 10.

When the threshold deciding result by the ratio of distance between the calculation representative point of the patch for retaining the maximum non-radiation energies of the radiation method deciding apparatus 30 and the calculation representative point of the patch which becomes an object of the radiation, and the larger area value through the comparison between the area of the patch for retaining the maximum non-radiation energies and the area of the patch which becomes an object of the radiation is decided larger than the threshold value, the calculation error becomes larger when the radiation is effected in the patch unit so that the radiation operation is effected in the element unit. With the component elements of the patch for retaining the maximum non-radiation energies being fixed by one, the from-factor interpolation domain deciding apparatus 32 selects the sample element from the element of the patch interior of the radiation object as in the above described threshold value or lower so as to decide the interpolation domain of the form-factor and the domain of the shadow. The form-factor value to the element which becomes the basic portion of the interpolation from the component element fixed in the patch for retaining the maximum non-radiation energies in the calculation representative point of the element which becomes a basic point of the interpolation of the elements to be included in the form-factor interpolation domain is calculated by the form-factor calculating apparatus 33, and the obtained form-factor value is transferred, renewed, stored into the storing domain provided in accordance with the identification numbers of the elements for obtaining the form-factor value of the form-factor storing apparatus 35 in the condition initialized to 0. The form-factor value of the element remaining in the form-factor interpolation domain is obtained by the form-factor interpolation calculating apparatus 34 and is transferred, renewed, stored into the storing domain of the form-factor storing apparatus 35 provided in accordance with the identification numbers of the element for obtaining the form-factor. The form-factor value with respect to all the elements of the patch interior which becomes an object of the radiation is obtained. If it is stored in the form-factor storing apparatus 35, the renewal calculating apparatus 36 effects the renewal calculating operation in accordance with the renewal calculating equations (numeral 125), (numeral 126), (numeral 127) so as to output the renewal calculated value to the internal data bus 39 for transferring, storing to the storing domain provided in accordance with the identification numbers of the illumination intensity distribution storing apparatus 10. The above described operation is effected upon all the components elements fixed among the patch for retaining the maximum non-radiation energies.

If the processing from the radiation method deciding apparatus 30 to the renewal calculating apparatus 36 is effected with respect to all the patches which become objects of the radiation, the non-radiation energy value of the patch for retaining the maximum non-radiation energies radiated is made 0, the patch radiation intensity from the illumination intense value of the obtained element is calculated by the patch illumination intensity calculating apparatus 6, and is renewed, stored into the storing domain of the illumination intensity distribution storing apparatus 8 provided in accordance with the identification numbers of the patch. Thereafter, the patch for newly retaining the maximum non-radiation energies is selected by the above described maximum non-radiation energy retaining patch referring apparatus 31 so as to repeat the processing from the radiation method deciding apparatus 30 to the renewal calculating apparatus 36. The focus deciding apparatus 37 decides whether or not the appointed frequency or the total value of the non-radiation energies becomes the appointed value or lower for each of a series of processing to the renewal calculating apparatus 36 from the radiation method deciding apparatus 30 with respect to the patch which becomes all the objects of the radiation after the patch selection for retaining the maximum non-radiation energies. When it becomes an appointed value or lower, a completion signal is fed to the indirect light calculation controlling apparatus 38 through the internal control signal line 40.

The direct light calculation controlling apparatus 38 effects the scheduling management and the operation controlling in accordance with the above described processing procedure of the above described construction apparatus through the internal controlling signal line 40 so as to complete the processing by the completion signal with the focus deciding apparatus 37.

Figure 14:
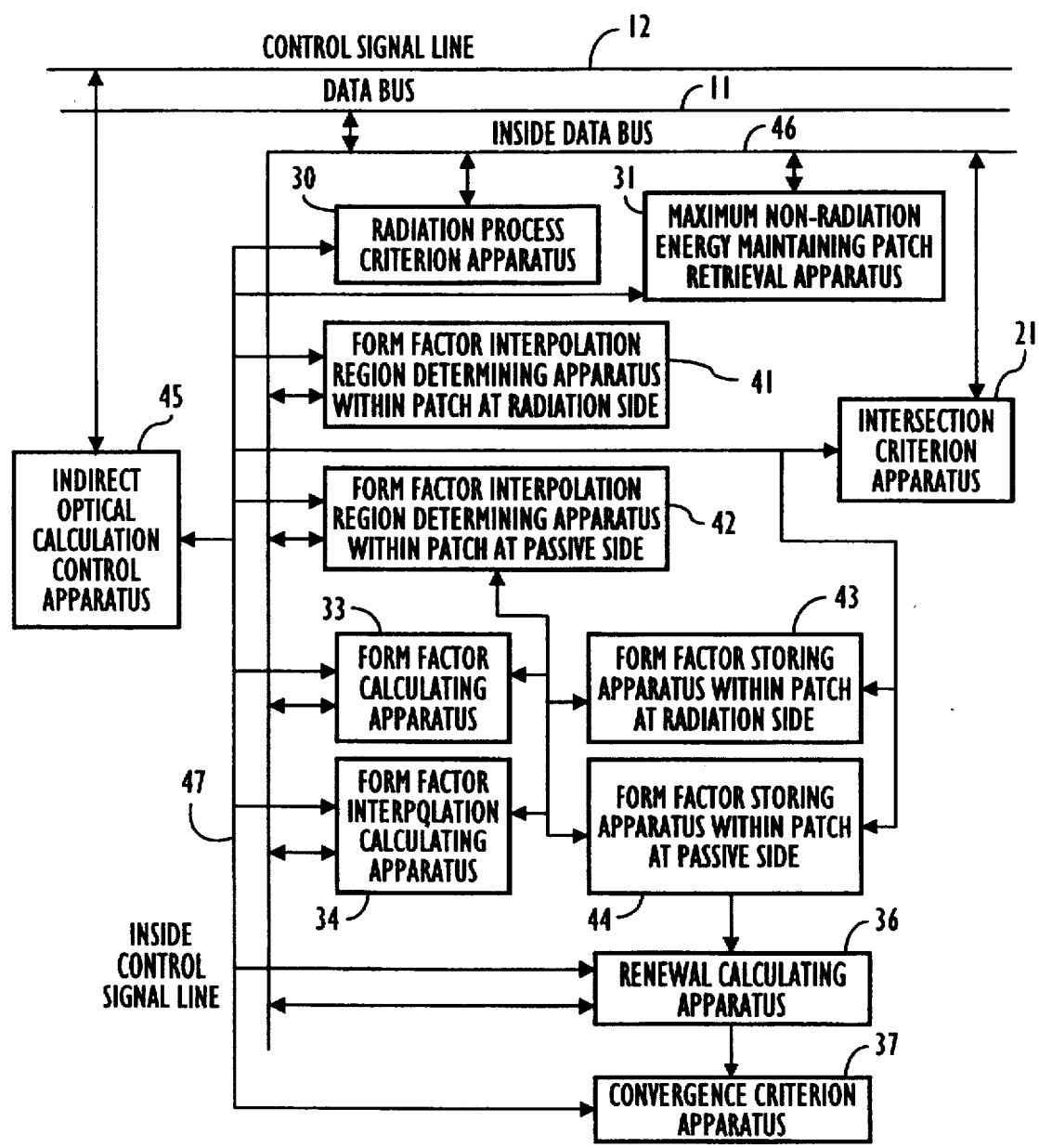
FIG. 14 is a block diagram in a second embodiment of an interreflection illuminance calculating apparatus in the same embodiment.

A second embodiment of the direct light calculating apparatus 7 will be described in its operation in accordance with FIG. 14. In FIG. 14, reference numeral 41 is a form-factor interpolation domain deciding apparatus within the patch on the radiation side for deciding the interpolation domain of the form-factor of the patch interior on the radiation side, reference numeral 42 is a passing side patch internal form-factor interpolation domain deciding apparatus for deciding the interpolation domain of the form-factor of the patch interior which becomes an object of the radiation, reference numeral 43 is a radiation side patch interior form-factor storing apparatus for storing the form-factor value of the patch interior on the radiation side, reference neutral 44 is a passive side patch internal form-factor storing apparatus for storing the form-factor value of the patch interior which becomes an object of the radiation, reference numeral 45 is an indirect light calculation controlling apparatus for effecting the scheduling management and the operation controlling operation between the apparatuses, reference numeral 46 is an internal data bus, reference numeral 47 is an internal control signal line. The indirect light calculating apparatus 7 constructed as described hereinabove will be described hereinafter in its operation.

The maximum non-radiation energy retaining patch referring apparatus 31, the radiation method deciding apparatus 30, as in a first embodiment of the above described indirect light calculating apparatus 7, effects the threshold decision with the decision of the patch for retaining the maximum non-radiation energies through the referring of the illumination intensity value of the patch stored in the illumination intensity distribution storing apparatus 8, the distance between the calculation representative point of the patch for retaining the maximum non-radiation energies and the calculation representative point of the pitch which becomes an object of the radiation, the ratio with respect to the larger area value through the comparison between the area of the patch for retaining the maximum non-radiation energies and the area of the patch which becomes an object of the radiation.

When the decision result of the radiation method deciding apparatus 30 is decided to be the threshold value or lower, as in the form-factor interpolation domain deciding apparatus 32 in the first embodiment of the above described indirect light calculating apparatus 7, the passive side patch internal form-factor interpolation domain deciding apparatus 42 selects the sample element from the element of the patch interior of the radiation object, refers the boundary of the interpolation domain of the form-factor and the domain of the shadow by the decision and the intersection decision result as to whether or not the radiation energies are reached so as to decide the interpolation domain and the domain of the shadow of the form-factor. The decision algorithm is similar to the case of the form-factor interpolation domain deciding apparatus 32 in the first embodiment of the above described indirect light calculating apparatus 7.

The form-factor calculating apparatus 33 calculates in accordance with (numeral 119) the form-factor value to the element which becomes the base of the interpolation from the patch for retaining the maximum non-radiation energies in the calculation representative point of the element which becomes a basic point of the interpolation of the elements to be included in the form-factor interpolation domain. The form-fact value obtained by the form-factor storing apparatus 44 is transferred, renewed, stored into the storing domain provided in accordance with the identification numbers of the element for obtaining the form-factor value of the passive side patch internal form-factor storing apparatus 44 of the condition initialized to 0.

The form-factor interpolation calculating apparatus 34 calculates by the interpolation calculation of the form-factor value in the calculation representative point of the remaining element within the form-factor interpolation domain decided by the passive side patch internal form-factor interpolation domain deciding apparatus 42. The calculating method by the form-factor interpolation calculating apparatus 34 realizes by the construction of FIG. 20 the form-factor interpolation calculating apparatus 34 when the interpolation calculation is effected in accordance with the (numeral 73) as in the case of the first embodiment of the above described indirect light calculating apparatus 7, or the faster speed is required to be effected. The form-factor value obtained by the form-factor interpolation calculating apparatus 34 is transferred, renewed, stored into the storing domain provided in accordance with the identification numbers of the element of the passive side patch internal form-factor storing apparatus 44. The form-factor value is obtained with respect to all the elements of the patch interior which becomes an object of the radiation so as to effect the renewal calculation of the illumination intensity value as in the first embodiment of the above described indirect light calculating apparatus 7 by the renewal calculating apparatus 36 if it is stored in the passive side patch internal form-factor storing apparatus 44. After the renewal calculation completion, the value calculated in the renewal is outputted to the internal data bus 46, is transferred, stored into the storing domain provided in accordance with the identifying numbers of the illumination intensity distribution distributing apparatus 10.

The radiation is effected in the element unit as the calculation error become larger if the radiation is effected in the patch unit when the threshold value deciding result is decided larger than the threshold value by the distance between the calculation representative point of the patch for retaining the maximum non-radiation energies of the radiation method deciding apparatus 30 and the calculation representative position of the patch which becomes an object of the radiation, and the ratio with respect to the larger area value through the comparison between the area of the patch for retaining the maximum non-radiation energies and the area of the patch which becomes an object of the radiation. Schematically, the form-factor to the element for composing the patch for retaining the maximum non-radiation energy from the sample element of the elements of the patch interior of the radiation object is obtained by the sampling and the interpolation calculation. The form-factor to the element for composing the patch for retaining the maximum non-radiation energies form the element of the patch interior of the radiation object is obtained in accordance with it. It will be described in detail hereinafter.

Figure 16:
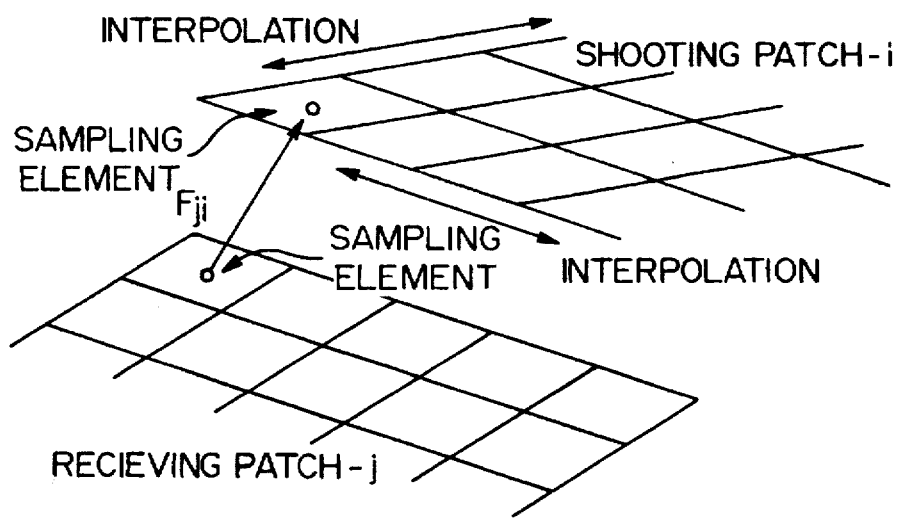
FIG. 16 is an illustrating view of an interpolation algorithm of the radiation side patch of the form-factor value calculation in the same embodiment.

The radiation side patch internal form-factor interpolation deciding apparatus 41 decides the form-factor interpolation domain in obtaining the form-factor value to the element for composing the patch for retaining the maximum non-radiation energies from the sample element with the sample element of the elements of the patch interior of the radiation object being fixed by one. The position of the sample element for fixing among the elements of the patch interior of the radiation object is the same as in the above described case, and selects the sample element from the element for composing the patch for retaining the maximum portion energies after the fixing operation. The sample element for selecting among the patches for retaining the maximum non-radiation energies is similar to the case of the first embodiment of the direct light calculating apparatus 7. A decision is effected as to whether or not the radiation energies are reached from an inner product with respect to a vector where the calculation representative point of the sample element of the patch for retaining the maximum non-radiation energies is a start, the calculation representative point of the sample element of the element of the patch interior of the fixed radiation object is an end, and the normal vector of the patch for retaining the maximum non-radiation energies, and the inner product of the normal vector of the patch of the object of the radiation. The intersection test to check the presence of the screening body between the calculation representative point of the sample element of the patch for retaining the maximum non-radiation energies and the calculation representative point of the sample element of the element of the patch interior of the fixed radiation object is effected by the intersection testing apparatus 22. By the intersection test result, the boundary of the interpolation domain of the form-factor and the domain of the shadow of the patch interior for retaining the maximum non-radiation energies is referred so as to decide the interpolation domain and the domain of the shadow of the form-factor. These algorithms are similar to the case of the first embodiment of the indirect light calculating apparatus 7. The form-factor calculating apparatus 33 calculates in accordance with the equation (115) the form-factor to the element which becomes the basic point of the interpolating calculation of the element to be concluded in the form-factor interpolation domain of the patch interior for retaining the maximum non-radiation energies form the fixed sample element in the patch interior of the radiation object. The position of the element which becomes a basic point of the interpolation calculation is similar to the case of the first embodiment of the indirect light calculating apparatus 7. The obtained form-factor value is transferred, renewed, stored into the storing domain of the radiation side patch internal form-factor storing apparatus 43 of the condition initialized to 0 provided in accordance with the identification numbers of the elements of the patch interior for retaining the maximum non-radiation energies. The form-factor interpolation calculating apparatus 34 calculates by the interpolation calculation the form-factor value in the calculation representative point of the remaining element within the form-factor interpolation domain of the patch interior for retaining the maximum non-radiation energies. The calculating method by the form-factor interpolation calculating apparatus 34 realizes by the construction of FIG. 20 the form-factor interpolation calculation apparatus 34 when the interpolation calculation is effected, and further, the speed is made faster in accordance with the equation (75) as in the first embodiment of the above described indirect light calculating apparatus 7. The form-factor value obtained by the form-factor interpolation calculating apparatus 34 is transferred, renewed, stored into the storing domain provided in accordance with the identification numbers of the elements of the radiation side patch interval form-factor storing apparatus 43. The above described processing is shown in FIG. 16 in a model.

Figure 17:
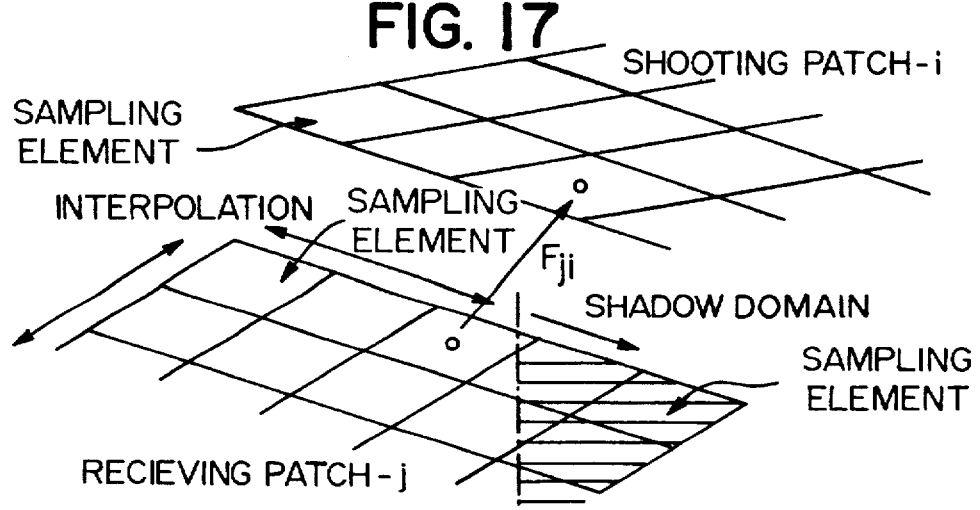
FIG. 17 is an illustrating view of an interpolation algorithm of the patch which becomes an object of the radiation of the form-factor value calculation in the same embodiment.

The form-factor value is obtained with respect to the sample element of the patch interior which is an object of the radiation. A series of processing to be stored in the above described radiation side patch interior form-factor storing apparatus is effected with respect to all the sample elements of the elements of the patch interior of the radiation object. When these processing is completed, the form-factor value to the element of the patch interior for retaining the maximum non-radiation energies is obtained from all the sample elements of the patch interior which becomes an object of the radiation when these processing has been completed. In order to effect the renewal calculation, it is required to obtain the form-factor value to all the elements of the patch interior for retaining the maximum non-radiation energies form all the elements of the patch interior which becomes an object of the radiation. As the form-factor value to the element of the patch interior for retaining the maximum non-radiation energies from all the sample elements of the patch interior which becomes the an object of the radiation, the interpolation domain of the form-factor from these values is obtained, and the remaining form-factor value is obtained by the interpolation calculation. FIG. 18 is a view of it shown in a model. The a11 through c'11 are sample elements of the patch which becomes an object of the radiation. The value shown in the under columns accompanied by it is the form-factor value into the element of the patch interior for retaining the maximum non-radiation energies from the sampling element. F value shown in the under column is an upper value with the element of the patch interior for retaining the maximum non-radiation energies being fixed by eight when they are seen from the patch side which becomes an object of radiation. The interpolation domain of the form-factor is decided with the use of the value so as to obtain by the interpolation calculation the form-factor value within the domain. The form-factor value into the element of the patch interior for retaining the maximum non-radiation energies from all the sample elements of the patch interior which becomes an object of the radiation stored in the radiation side patch internal form-factor storing apparatus 43 are copied on the storing domain of the element position corresponding to it when seen from the patch point of view which becomes the object of the radiation of the passive patch internal form-factor storing apparatus. The form-factor value into the fixed element of the patch interior for retaining the maximum non-radiation energies from the sample element of the patch interior which becomes an object of the radiation when the element of the patch interior for retaining the maximum non-radiation energies is fixed is equivalent to the condition to be obtained. The passive side patch internal form-factor interpolation domain deciding apparatus 42 refers to what the form-factor value copied is 0. That the form-factor value is 0 is that the radiation energies are not reached or the interpolation is effected in the intersection test. The interpolation domain of the form-factor is decided with the use of algorithm as in the decision of the interpolation domain of the form-factor in the reaching condition and the interpolation condition of the radiation energies of the sample element. FIG. 17 is a view showing in a model. When the basic point of the interpolation of the interpolation domain of the form-factor is different from the former position of the sample element, the form-factor value into the element fixed into the patch interior for retaining the maximum non-radiation energies from the element which becomes the basic point of the interpolation is calculated by the form-factor calculating apparatus 33 in accordance with the equation (115). The form-factor value obtained by the form-factor calculating apparatus 33 is transferred, renewed, stored into the storing domain provided in accordance with the identification numbers of the elements for obtaining the form-factor value of the passive side patch internal form-factor storing apparatus 44. In the subsequent processing, the form-factor interpolation calculating apparatus 34 as in the following processing as described hereinabove calculates the form-factor value in the calculation representative point of the remaining element within the form-factor interpolating domain decided by the passive side patch internal form-factor interpolation domain deciding apparatus 42. The calculating method by the form-factor interpolation calculating apparatus 34 realizes by the construction of FIG. 20 the form-factor interpolation calculating apparatus 34 when the interpolation calculation is effected in accordance with the equation (75) as in the case of the first embodiment of the above described indirect light calculating apparatus 7, or the faster speed is required to be effected. The form-factor value obtained by the form-factor interpolation calculating apparatus 34 is transferred, renewed, stored to the storing domain provided in accordance with the identification numbers of the element of the passive side patch internal form-factor storing apparatus 44. The form-factor value is obtained with respect to all the elements of the patch interior which becomes an object of the radiation so as to effect the renewing calculation of the illumination intensity value as in the first embodiment of the above described indirect light calculating apparatus 7 by the renewal calculating apparatus 36 if it is stored in the passive side patch internal form-factor storing apparatus 44. After the renewal calculation completion, the value calculated in the renewal is outputted to the internal data bus 46, is transferred, stored into the storing domain provided in accordance with the identifying numbers of the illumination intensity distribution distributing apparatus 10.

If processing from the radiation method deciding apparatus 30 to the renewal calculating apparatus 36 is effected with respect to all the patches which become objects of the radiation, the non-radiation energy value of the patch for retaining the maximum non-radiation energies radiated is made 0, the patch radiation intensity from the illumination intensity value of the obtained element is calculated by the patch illumination intensity calculating apparatus 6, and is renewed, stored into the storing domain of the illumination intensity distribution storing apparatus 8 provided in accordance with the identification numbers of the patch. Thereafter, the patch for newly retaining the maximum non-radiation energies is selected by the above described maximum non-radiation energy retaining patch referring apparatus 31 so as to repeat the processing from the radiation method deciding apparatus 30 to the renewal calculating apparatus 36. The focus deciding apparatus 37 decides whether or not the appointed frequency or the total value of the non-radiation energies becomes the appointed value or lower for a series of processing to the renewal calculating apparatus 36 from the radiation method deciding apparatus 30 with respect to the patches which become all the objects of the radiation after the patch selection for retaining the maximum non-radiation energies. When it becomes an appointed value or lower, a completion signal is fed to the indirect light calculation controlling apparatus 45 through the internal control signal line 47. The direct light calculation controlling apparatus 45 effects the scheduling management and the operation controlling in accordance with the above described processing procedure of the above described construction apparatus through the internal controlling signal line 47 so as to complete the processing with the completion signal by the focus deciding apparatus 37.

The illumination distribution outputting apparatus 9 outputs to an external apparatus through the above described external input, output interface apparatus and the above described bus while converting from the internal data form to the external data form the illumination intensity distribution at the optional time point specified by the controlling apparatus 13 stored in the illumination intensity distribution storing apparatus 8. When the external apparatus is a normal computer, the illumination intensity data is retained in the final form. When the image is produced actually, an operation of pasting the obtained illumination intensity data into a form, a so-called illumination intensity mapping operation is necessary. Although the illumination intensity data stored in the illumination intensity distribution storing apparatus 8, namely, the internal data form is illumination intensity data for each patch, the illumination intensity mapping operation is effected in the normal polygon unit. This has to be changed into the illumination intensity data for each polygon which is the external data form. The conversion is effected with the use of the identification numbers attached onto the above described element and the patch unit.

The illumination intensity distribution inputting apparatus 10 converts into the internal data form the illumination intensity distribution inputted from the external apparatus through the external input, output interface apparatus 14 and the bus 12. When the external apparatus is a normal computer, the illumination intensity distribution data retained in the file form is adapted to be inputted. The conversion is an inverse conversion from the above described internal form to the external form, and is effected with the identification numbers attached on the elements and the patch units. The converted data is transferred, stored into the illumination intensity distributions storing apparatus 8. The controlling apparatus 13 effects the scheduling management of the above described construction apparatus and the operation controlling through the controlling signal line 13 in accordance with the above described algorithm.

A triangle illumination intensity mapping apparatus in the second embodiment of the present invention will be described with reference to the drawings.

Figure 21:
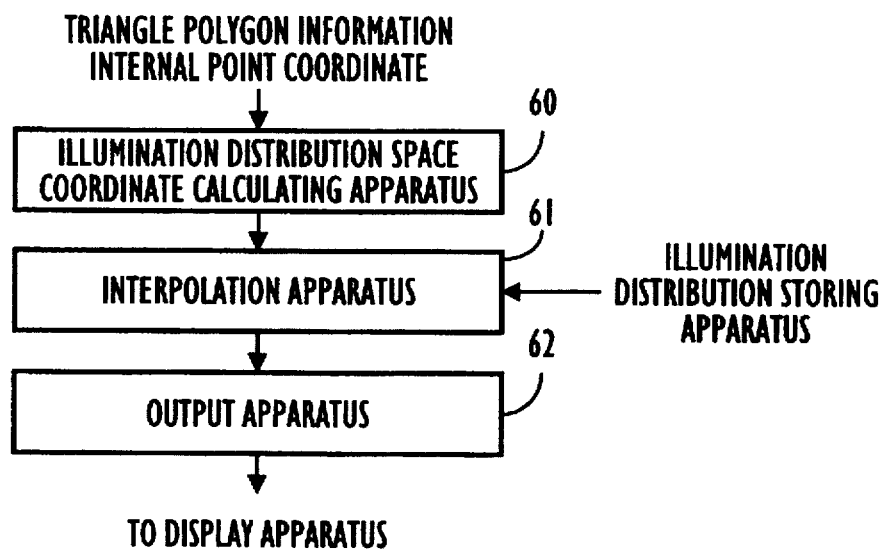
FIG. 21 is a block diagram of a triangle illumination intensity mapping apparatus in a second embodiment.

FIG. 21 shows the whole construction of the triangle illumination intensity mapping apparatus in the second embodiment of the present invention.

In FIG. 21, reference numeral 60 is an illumination intensity space coordinate calculating apparatus for converting into the coordinates of the corresponding points in the illumination intensity space the coordinates of the points of the space with the form being defined actually, reference numeral 61 is an interpolating apparatus for obtaining the illumination intensity value of the calculation points by the interpolation of the illumination intensity value of the point having the illumination intensity value near the coordinates point calculated by the illumination intensity space coordinate calculating apparatus 60, reference numeral 62 is an output apparatus for outputting the illumination intensity value obtained.

The triangle illumination intensity mapping apparatus in the second embodiment composed as described hereinabove will be described hereinafter in detail in its operation.

The space where the polygon is defined has a case of the tertiary coordinate system where the object exists actually and a case of a secondary coordinate system defined locally onto the same plane as the polygon. The explanation is given in the respective cases. In the illumination intensity space of the triangle polygon, an original point is made one vertex where a triangle polygon exists. The illumination intensity distribution data is on the inner lattice point of the triangle in the secondary space of the isosceles triangle normalized so that the remaining two vertexes may become respectively (1,0), (0,1).

Figure 23:
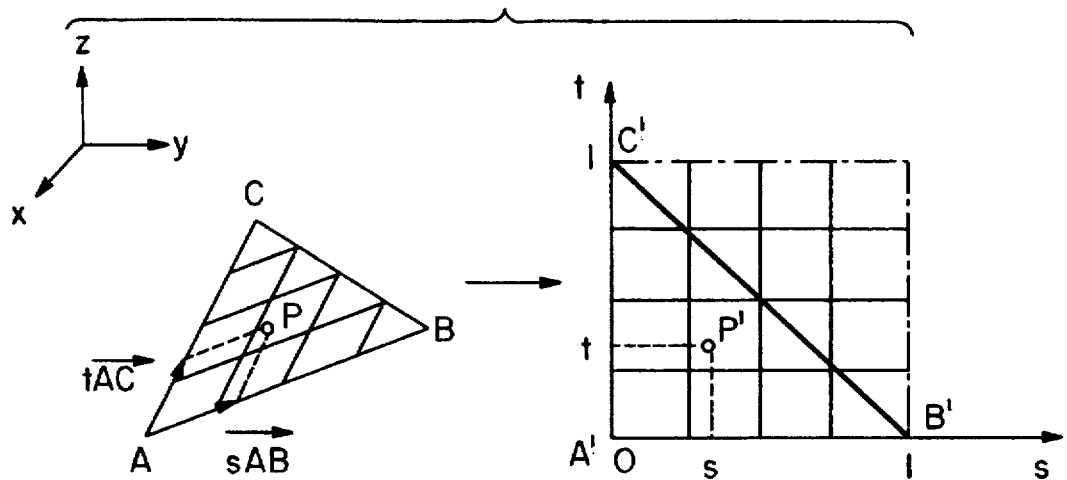
FIG. 23 is a illustrating views of the illumination intensity mapping when the space where the shape in the second embodiment is tertiary.

The algorithm with the coordinates of a point of the tertiary space where the shape is defined being converted into the coordinates of the corresponding point in the illumination intensity space will be described in accordance with FIGS. 23($a$) and 23($b$). The coordinates of the three vertexes of the triangle polygon ABC and the coordinates of the internal point of the triangle polygon ABC for the calculation of the illumination intensity value are inputted in the illumination intensity distribution space coordinate calculating apparatus 60. Assume that the coordinates of the vertex A are ($a_1$, $a_2$, $a_3$), the coordinates of the vertex B are ($b_1$, $b_2$, $b_3$), the coordinates of the vertex C are ($c_1$, $c_2$, $c_3$), a point in the illumination intensity distribution space corresponding to the vertex A is A'(0,0), a point in the illumination intensity distribution space corresponding to the vertex B is B'(1, 0), a point of the illumination intensity distribution space corresponding to the vertex C is C'(0,0), the internal point of the triangle polygon ABC for calculating the illumination intensity value is P ($p_1$, $p_2$, $p_3$), the coordinates of a point P' in the illumination distribution space corresponding to a point P are (s,t). Consider a local coordinate shape with an AB vector and an AC vector being provided as a basic bottom, and (AP vector) =s(AB vector)+ t(AC vector), $0 \leq s+t \leq 1$ are established about the point P. The vector equation is considered a simultaneous equation about s, t if it is considered with components. In the solution (s,t) when it is regarded as a simultaneous equation, an equation (79) is given in $(b_1-a_1)(c_2-a_2)-(c_1-a_1)(b_2-a_2) \neq 0$, an equation (80) is given in $(b_1-a_1)(c_3-a_3)-(c_1-a_1)(b_3-a_3) \neq 0$, an equation (81) is given in $(b_2-a_2)(c_3-a_3)-(c_2-a_2)(b_3-a_3) \neq 0$. As the obtained point P is guaranteed to be an internal point of the triangle polygon ABC, it is classified without fail into either of the above described cases.

The illumination intensity distribution space coordinate calculating apparatus 60 obtains (s,t) by the equation (79) in $(b_1-a_1)(c_2-a_2)-(c_1-a_1)(b_2-a_2) \neq 0$, obtains (s,t) by the equation (80) in $(b_1-a_1)(c_3-a_3)-(c_1-a_1)(b_3-a_3) \neq 0$, obtains (s,t) by the equation (81) in $(b_2-a_2)(c_3-a_3)-(c_2-a_2)(b_3-a_3)=0$. The obtained (s,t) is transferred to the interpolation apparatus 61. If data which interferes with the above classification is given, a solution is not provided. The error signal is returned so as to complete the processing.

Assume that the interpolating apparatus 61 makes an illumination intensity value in the (s,t) an illumination intensity value in a lattice point, which is given an illumination intensity value, is closest to the (s,t) in accordance with the coordinate value (s,t) calculated by the illumination intensity distribution space coordinate calculating apparatus 60, an illumination intensity distribution data given onto the lattice point of the triangle polygon ABC. In order to improve the quality of the produced images, the illumination intensity value in the (s,t) is obtained by the dual line form interpolation of the illumination intensity value of the lattice point which is given an illumination intensity value.

The outputting apparatus 62 outputs it to the display apparatus as the illumination intensity value of the internal point P of the triangle polygon ABC.

Figure 24:
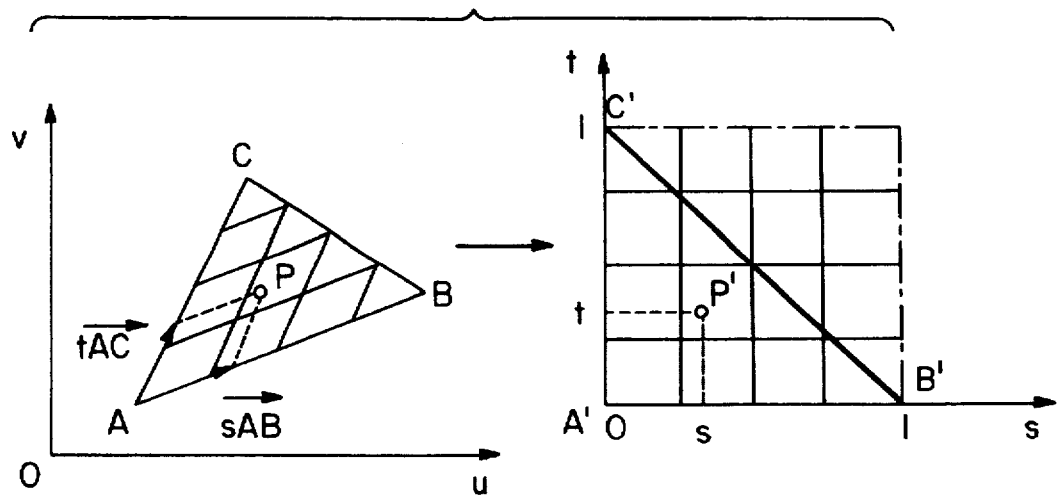
FIG. 24 is an illustrating views of the illumination intensity mapping when the space where the shape of the second embodiment is defined is a local secondary plane.

The data to be inputted to the illumination intensity distribution space coordinate calculating apparatus 60 as in the tertiary coordinates even in the secondary coordinates locally defined are the coordinates of the three vertexes of the triangle polygon ABC and the coordinates of the internal point of the triangle polygon ABC for calculating the illumination intensity value. The algorithm of the conversion will be described in accordance with FIGS. 24($a$) and 24($b$). When the local coordinate system defined on the plane the same as the triangle polygon ABC is made uv, the coordinates of the vertex A of the triangle polygon ABC are ($u_A$, $v_A$), the coordinates of the vertex B are made ($u_B$, $v_B$), the coordinates of the vertex C are made ($u_C$, $v_C$), the internal point of the triangle polygon ABC is P ($u_P$, $v_P$), the point of the illumination intensity distribution space corresponding to the vertex A is A'(0, 0), the point of the illumination intensity distribution space corresponding to the vertex B is B'(1,0), the point of the illumination intensity distribution space corresponding to the vertex C is C'(0,1), the coordinates of the point p' in the illumination intensity distribution space corresponding to the P are made (s,t). Assume the local coordinate form with AB vector and AC vector being provided as a basic bottom, (AP vector)=s(AB vector)+t(AC vector), $0 \leq s+t \leq 1$ are established about the point P. The vector equation is regarded as a simultaneous equation about s, t in terms of the component. The solution (s,t) when it is considered a simultaneous equation is given by the equation (100) in $(u_B-u_A)(v_C-v_A)-(u_C-u_A)(v_B-v_A) \neq 0$. In the illumination intensity space coordinate calculating apparatus 60, the (s,t) is obtained by the equation (100) in $(u_B-u_A)(v_C-v_A)-(u_C-u_A)(v_B-v_A) \neq 0$. As there is no solution in the $(u_B-u_A)(v_C-v_A)-(u_C-u_A)(v_B-v_A)=0$, the error signal is returned so as to complete the processing. The interpolation apparatus 61 makes the illumination intensity value in the (s,t) an illumination intensity value in the lattice point which is closet to the (s,t) and given the illumination intensity value in accordance with the coordinates value (s,t) calculated by the illumination intensity distribution space coordinate calculating apparatus 60 and the illumination intensity distribution data which is given onto the lattice point of the triangle polygon ABC. In order to improve the quality of the produced images, the illumination intensity value in the (s,t) is obtained by the dual line form interpolation of the illumination intensity value of the lattice point which is close to the (s,t) and given an illumination intensity value. The outputting apparatus 62 outputs to the display apparatus as the illumination intensity value of the internal point of the triangle polygon ABC.

The square illumination intensity mapping apparatus in a third embodiment of the present invention will be described hereinafter with reference to the drawings.

Figure 22:
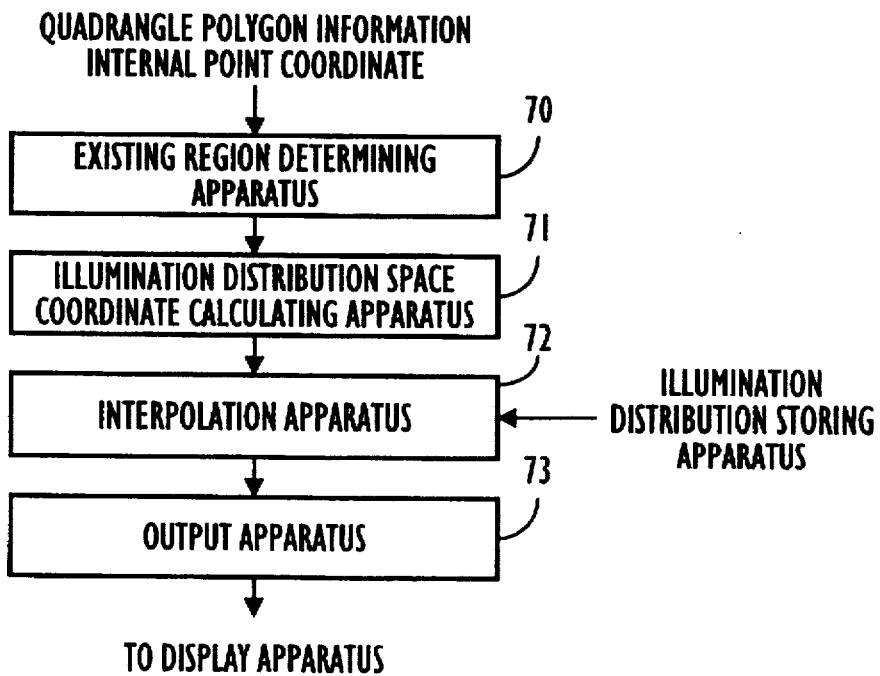
FIG. 22 is a block diagram of a square illumination intensity mapping apparatus in a third embodiment.

FIG. 22 shows the whole construction of the square illumination intensity mapping apparatus in the third embodiment of the present invention.

In FIG. 22, reference numeral 70 is an existence domain deciding apparatus for deciding which domain of two triangle domains and the diagonal lines the internal point for calculating the illumination intensity value exists in, the two triangle domains and diagonal lines can be provided when the square polygon is divided by he diagonal line, reference numeral 71 is an illumination intensity space coordinate calculating apparatus for converting into the coordinates of the corresponding points in the illumination intensity space the coordinates of the points of the space with the form being defined actually, reference numeral 72 is an interpolating apparatus for obtaining the illumination intensity value of the calculation points by the interpolation of the illumination intensity value of the point having the illumination intensity value near the coordinates point calculated by the illumination intensity space coordinate calculating apparatus 71, reference numeral 73 is an output apparatus for outputting the illumination intensity value obtained.

The square illumination intensity mapping apparatus in the third embodiment composed as described hereinabove will be described hereinafter in detail in its operation.

As described in the case of the above described triangle illumination intensity mapping apparatus, the space where the polygon is defined is divided into the case of the tertiary coordinate system where the object exists actually and a case of a secondary coordinate system where is defined locally onto the same plane as the polygon. The explanation is given in the respective cases. In the illumination intensity space of the square polygon, an original point is made one vertex where a triangle polygon exists. The illumination intensity distribution data is on the inner grid point of the triangle in the secondary space of the square normalized so that the remaining two vertexes may become respectively $(1,0)$, $(1,1)$ $(0,1)$.

A case where the space with the shape being defined is a tertiary coordinate will be described. Here the coordinates of the vertex A of the square polygon ABCD are (d1, d2, d3), the normal vector of the square polygon ABCD is N(Nx, Ny, Nz), the internal point of the square polygon ABCD is X (x1, x2, x3), the illumination intensity distribution space corresponding to the vertex A is A'U0,0), the point of the illumination distribution space corresponding to the vertex B is B'(1, 0), the point of the illumination intensity distribution space corresponding to the vertex C is C'(1, 1), the point of the illumination intensity distribution space corresponding to the vertex D is D'(0, 1), the coordinates of the point in the illumination intensity distribution space corresponding to the internal point X when the internal point X exists in the triangle ABC are (s+t,s), the coordinates of the point in the illumination intensity distribution space corresponding to the internal point X where the internal point X is a point on the diagonal line AC are (s, s), the coordinates of the point of the illumination intensity distribution space corresponding to the internal point X when the internal point x exists it the triangle ACD re (s,s+r).

The internal point of the square polygon ABCD where the coordinate of the four vertexes of the internal square polygon ABCD, the normal vector of the square polygon, the illumination intensity value are required calculated is inputted to the existence domain deciding apparatus 70. The existence domain deciding apparatus 70 decides whether the inputted internal point X is an triangle ABC internal, on the diagonal AC or the triangle ACD interior. In the outline of the algorithm of the existence domain decision, the square and the internal point are projected onto the coordinate plane of the tertiary space, and straight lien including the diagonal line is obtained on the projection plane. It is decided whether the projection point of the internal point exists on which side of the domain to be divided by the straight line or exists on the straight line. Assume that the decision of the coordinate plane to be projected is composed of component except of the largest component of the absolute value of the components of the normal sector. When the largest component of the absolute value of the components of the normal vector is a x component, yz plane is made a projection plane. It is decided likewise even in the other case. The detail description will be given about the above described algorithm. Refer the largest of the Nx, Ny, Nz with respect to the coordinate (a1, a2, a3) of the vertex A of the inputted square polygon ABCD, the coordinates (b1, b2, b3) of the vertex B, the coordinates (c1, c2, c3) of the vertex C, the coordinates (d1, d2, d3) of the vertex D, the normal vector N (Nx, Ny, Nz) of the general square polygon ABCD, and the internal point X (x1, x2, x3) of the general square polygon ABCD to be displayed. If Nx is largest, the square polygon ABCD and the internal point X are projected onto the yz plane so that the point A and the original point may be superposed. At this time, the coordinates of the projection plane of the vertex A is $(0,0,0)$, the coordinates on the projection plane of the vertex B are (0, d2, d3), the coordinates on the projection plane of the internal point X are (0, x2, x3). The equation of the straight line inldign the diagonal line AC is given with x=0, (c3–a3)(y–a2)–(c2–a2)(z–a3). If (x2–a2)(b2–a2) >0 in c2–a2=0, the internal x exists in the domain the same as the vertex B with respect to the domain to be divided by the straight AC, the internal X can be decided as the triangle ABC interior. Similarly, if x2–a2=0, the point X can be decided on the diagonal line AC. If (x2–a2))d2–a2) >0, the point X can be decided as the triangle ACD interior. If the equation (2) in the c2–a2≠0, the internal X exists the domain the same as the vertex B with respect to the domain which can be made when it is divided by the straight line AC, so that the point X can be decided as the triangle ABC interior. If the equation (83), the point X can be decided as on the diagonal line AC similarly. If the equation (84), the point X can be decided as the triangle ACD interior. Even when Ny and Nz are largest, the it can be effected, likewise. From the above description, the operation of the existence domain deciding apparatus 70 becomes as follows. Reference the largest of the absolute values among Nx, Ny, Nz. If Nx is largest, (x2–a2) (b2–a2)>0 in the c2–a2=0, the point X is decided as the triangle ABC interior. If X2–a2=0, the pit X is decided as on the diagonal AC. If (x2–a2) (d2 –a2)>0, the point X is decided as the triangle ACD interior. If the equation (82) in the c2–a2=0, the point X is decided as on the diagonal AC. If (x2–a2) (d2–a2)>0, the point X is decided as the triangle ACD interior. If the equation (82) in c2–a2≠0, the point X is decided as the triangle ABC interior. If equation (83), the point X is decided as on the diagonal line AC. If the equation (84), the point x is decided as the triangle ACD interior. If Ny is largest, if (x1–a1)(b1–a1)>0 in c1–a1=0, the point X is decided as the triangle ABC interior. If x1–a1=0, the point X is decided as on the diagonal AC. If (x1–a1) (d1–as1)>0, the point x is decided as the triangle ACD interior. If the equation (85) i the c1–a1≠0, the point X is decided as the triangle ABC interior. If the equation (86), the point x is decided as on the diagonal lien AC. If the equation (87), the point X is decided as the triangle ACD interior. If Nz is largest, if (x1–a1) (b1–as1)>0 in the c1–as=0, the point X is decided as the triangle ABC interior. If x1–a1=0, the point X is decided on the diagonal line AC. If (x1–as1)(d1–a1)>0, the point X is decided as the triangle ACD interior. If the equation (88) in C1–a1≠0, the point X is decided as the triangle ABC interior. If the equation (89), the point x is decided on the diagonal AC. If the equation (90), the point X is decided as triangle ACD interior. The result is transferred to the illumination intensity distribution space coordinate calculating apparatus 71.

Figure 25:
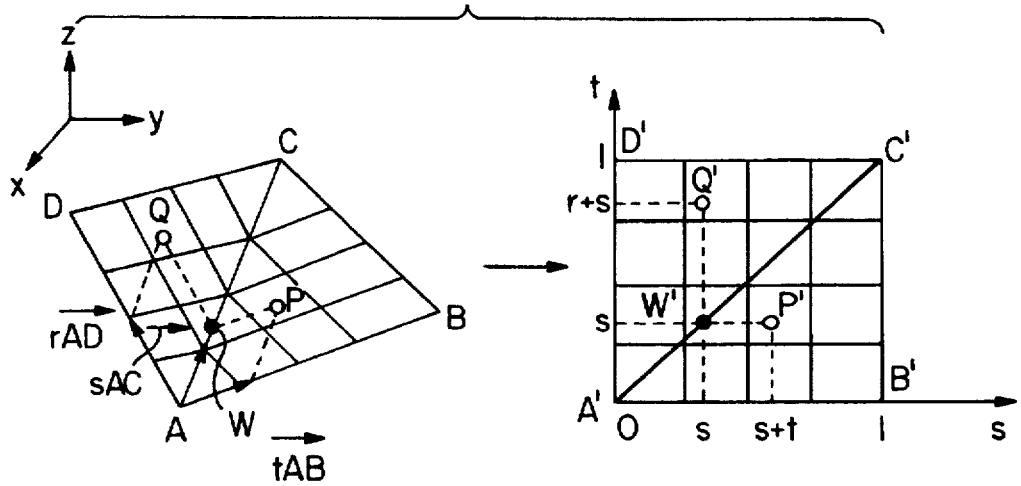
FIG. 25 is an illustrating views of the illumination intensity mapping when the space where the shape in the third embodiment is defined is a tertiary plane.

The illumination intensity distribution space coordinate calculating apparatus 71 converts the coordinates of the point of the tertiary space where the shape is defined into the coordinates of the corresponding point in the illumination intensity space. The algorithm of the conversion will be described in accordance with FIGS. 25($a$) and 25($b$). When the internal point X is in the triangle ABC interior, namely, in the position of the point P of FIG. 25($a$), (vector AP)= t(vector AB)+s(vector AC), 0≦s+t≦s+t≦1 is established. When the internal point X is on the diagonal line AC, namely, when it is in a position of the point w of FIG. 25($a$), (vector AW)=s (vector AC), 0≦s+r≦1. When the internal point x exists within the triangle ACD, namely, when it is exists in a position of a point Q of FIG. 25($a$), (vector AQ)=s (vector AC)+r (vector AD), 0≦s+r≦1 is established. In the above described expression, the basic bottom vectors are made (vector AB) (vector AC), (vector AC), (vector AC) (vector AD). As the respective basic bottom vectors are converted into the (vector A'B')(vector A'C'), (vector A'C'), (vector A'C') (vector A'D'), the coordinates of the illumination intensity space corresponding to the point P is given (st t,s), the coordinates of the point W' of the illumination intensity space corresponding to the point W is given (s, s), the coordinates of the a point Q' of the illumination intensity space corresponding to the point q is given (s,r+s). The calculating method of the concrete s, t, r is similar to the case of the above described triangle illumination intensity mapping apparatus. The operation of the illumination intensity distribution space coordinates calculating apparatus 71 is realized as follows. The coordinates (a1, a2, 13) of the vertex A of the square polygon ABCD, the coordinates (b1, b2, b3) of the vertex B, the coordinates (c1, c2, c3) of the vertex C, the coordinates (d1, d2, d3) of the vertex D, the internal point X (X1, x2, x3) of the general square polygon ABCD to be displayed, and decision results decided by the existence domain deciding apparatus 70 are inputted to the illumination intensity distribution space coordinate calculating apparatus 71. When the point X is in the triangle ABC interior in the decision results of the existence domain deciding apparatus 70, the (s, t) is obtained by the equation (91) in (c1–a1)(b2–a2)–(b1–a1)(c2–a2)≠0. The (s, t) is obtained by the equation (93) in (c2–a2)(b3–a3)–(b2–a2)(c3–a3)≠0. At a time except for it, there is not no solution so that the error signals are returned to complete the processing. When the point X is on the diagonal line AC in the decision result of the existence domain deciding apparatus 70, s is obtained by the equation (94) in c1–a1≠0. s is obtained by the equation (95) in c2–a2≠0. s is obtained by the equation (96) in c3–a3≠0. At a time except for it, the is not resolution so that the errors signals are returned to complete the processing. When the point X is in the trial ACD interior in the decision result of the existence domain deciding apparatus 70, the (s, r) is obtained by the equation (97) in (a1—a1)(d2–a2)–(d1–a1)(c2–a2)≠0. The (s, r) is obtained by the equation (98) in (c1–a1)(d3–a3)–(d1–a1)(c3–a3)≠0. the (s, r) is obtained by the equation (99) in (c2–a2)(d3–a3)–(d2–a2)(c3–a3)≠0. In the cases except for it, there is no solution so that the error signals are returned to complete the processing. As a result, the coordinates value in the illumination intensity space of the obtained internal point X is transferred to the interpolation apparatus 72.

The interpolation apparatus 72 makes the illumination intensity value in the point of the calculated coordinates in accordance with the coordinates value calculation by the illumination intensity distribution space coordinates calculating apparatus 60, and the illumination intensity distribution data given onto the lattice point of the square polygon ABCD an illumination intensity value in the lattice point given the illumination intensity value which is closest to the point of the coordinates calculated. In order to improve the grade of the produced image, the illumination intensity value in the point of the calculation coordinates by the dual line form interpolation of the illumination intensity value of the lattice point given the illumination intensity value which is lose to the point of the calculated coordinates. The obtained illumination intensity value is transferred to the output apparatus 73. The outputting apparatus 73 outputs to the displaying apparatus as the illumination intensity value of the internal point X of the square polygon ABCD.

The secondary coordinate system defined locally will be described. In the uv coordinate system defined on the plane the same as the square polygon ABCD, the coordinates of the vertex A of the square polygon ABCD are (uA, vA), the coordinates of the vertex B are (uB, vB), the coordinates of the vertex C are (uC, vC), the coordinates of the vertex D are (uD, vD), the optical interior point of the square polygon ABCD is X (uX, vX), the point of the illumination intensity distribution space corresponding to the vertex A is A'(0,0), the point of the illumination distribution space corresponding to the vertex B is B'(1, 0), the point of the illumination intensity distribution space corresponding to the vertex C is C'(1, 1), the point of the illumination intensity distribution space corresponding to the vertex D is D'(0, 1), the coordinates of the point in the illumination intensity distribution space corresponding to the internal point X when the internal point X exists in the triangle ABC are (s+t,s), the coordinates of the point in the illumination intensity distribution space corresponding to the internal point X where the internal point X is a point on the diagonal line AC are (s, s), the coordinates of the point of the illumination intensity distribution space corresponding to the internal point X when the internal point x exists it the triangle ACD re (s,s+r).

The internal point of the square polygon ABCD where the coordinate of the four vertexes of the internal square polygon ABCD, the normal vector of the square polygon, the illumination intensity value are required calculated is inputted to the existence domain deciding apparatus 70. The existence domain deciding apparatus 70, as in the above described case, decides whether the inputted internal point X is an triangle ABC internal, on the diagonal AC or the triangle ACD interior. The difference from the above described case is that the square and the internal point are not necessary to be projected onto the coordinate plane of the tertiary space. In the uv plane, the a straight line including he diagonal line is obtained. The decision has only to be effected as to whether the internal point exists on which side of the domains divided by the straight line or on which straight line. The deciding method can be effected with the principle the same as in the above described case. The operation of the existence domain deciding apparatus 70 is as follows. The point x is decided as the triangle ABC internal if (uX-uA)(uB-uA).0 in the uC-uA=0 with respect to the coordinates of the vertex A o the square polygon ABCD inputted to the existence domain deciding apparatus 70 are (uA, VA), the coordinates of the vertex B are (uB, vB), the coordinates of the vertex C are (uC, vC), the coordinates of the vertex D are (uD, vD) and the internal point X (uX, vX) of the general square polygon ABCD to be displayed. The point X is decided as on the diagonal lane AC if uX-uA=0. The point is decided as the triangle ACD internal if (uX-uA) (uD-uA). The point x is decided as the triangle AC interior if the equation (101) in the uC-uA≠0. The point x is decided as on the diagonal AC if the equation (102). The point X is decided as the triangle ACD interior if the equation (103). The decision result is transferred to the illumination intensity distribution space coordinate calculating apparatus 71).

Figure 26:
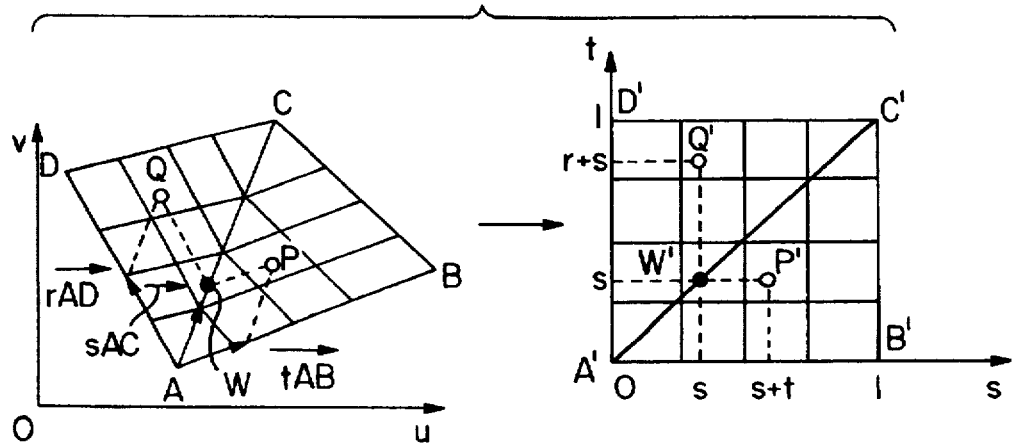
FIG. 26 is an illustrating views of the illumination intensity mapping when the space where the shape in the third embodiment is defined is a local secondary plane.

The operation algorithm of the illumination intensity distribution apace coordinates calculating apparatus 71 is, likewise, as follows. FIGS. 26(a) and 26(b) is shown as a view corresponding to FIGS. 25(a) and 25(b) as reference. The decision result decided by the coordinate of the four vertexes of the square polygon ABCD, the coordinates of the internal point to be displayed, and the existence domain deciding apparatus 70 are inputted to the illumination intensity distributing space coordinates calculating apparatus 71. The (s, t) is obtained by the equation (104) in (uC-uA) (vB-vA)-(uS-uA) (vC-vA) ≠0 when the point X is in the triangle ABC interior in the decision result of the existence domain deciding apparatus 70. As there is no solution in (uC-uA) (vB-vA) -(uB-uA) (vC-vA)=0, the error signals are returned to complete the processing. When the point X is on the diagonal line AC in the decision result of the existence domain deciding apparatus 70, the s is obtained by the equation (105) in the uC-uA=o and vC-vA)≠0. The s is obtained by the equation (106) in uC-uA≠0. As there is no solution in cases except for it, the error signal are returned to complete the processing. When the point x is in the triangle ACD interior in the decision result of the existence domain deciding apparatus 70, the (s,r) is obtained by the equation (107) in (uC-uA) (vD-vA)-(uD-uA)(vC-vA)≠0. As there is no solution in the (uC-uA) (vD-vA)-(uD-uA)(vC -vA)=0, the error signal are returned to complete the processing. The obtained coordinate value is transferred to the interpolation apparatus 72.

The interpolation apparatus 72 makes the illumination intensity value in the point of the calculated coordinates an illumination intensity value in the lattice point given the illumination intensity value which is closest to the point of the calculated coordinates in accordance with the coordinates value calculated by the illumination intensity distribution space coordinate calculating apparatus 60, the illumination intensity distribution data given onto the lattice point of the square polygon ABCD. In order to improve the producing images, the illumination intensity value in the point of the coordinates calculated by the dual line form interpolation of the illumination intensity value of the lattice point to be given the illumination intensity value which is close to the point of the coordinates calculated. The obtained illumination intensity value is transferred to the outputting apparatus 73. The outputting apparatus 73 is outputted to the displaying apparatus as the illumination intensity value o the internal point X of the square polygon ABCD.

In the first embodiment, the illumination intensity calculation or the form-factor calculation is once effected by the decision of the element decomposition number by the distance from the patch for retaining the light source and the maximum non-radiation energies. If the domain of the shadow exists in the calculated patch, the decomposition number of the element is redecided by the inclination of the boundary of the shadow, the feedback is applied, the illumination calculation or the form-factor calculation is effected again so that the calculation of the illumination intensity value by the element division of the adaption type can be effected. Although the reflectivity of the element is made evenly the same as the former polygon in the present patent, the calculation can be effected with a different value given to the each lent in the form-factor calculation.

The patch and the element can be produced which is less in the calculation precision, the earlier in the calculation of the calculation representative point, the calculation representative point is a lattice point even with respect to the general square polygon and the triangle polygon not handled conventionally in addition to the parallel quadrilateral polygon. The triangle polygon is divided into triangle patches congruent to each other similar to the former triangle polygon. These congruent triangle patches are respectively divided into the groups of the congruent to each other and the triangle elements congruent to each other similar to the former triangle patch. Thus, the calculation precision is made constant within each group. The calculation of the calculation present point is easily obtained with the formula o the dividing point. The distance between the calculation representative points of these elements become equal to each group interior so that the calculation representative points form the lattice point within the respective groups. The general square polygon is divided into the group of the general square patch congruent to each other and into the group of the parallel square patch congruent to each other of two types. The general square patch is divided into the group of the general square element congruent to teach other, and the group of the parallel quadrilateral element congruent to each other of two types. The parallel quadrilateral patch is divided into the parallel quadrilateral element congruent to each other similar to the former parallel quadrilateral patch. The calculation accuracy becomes constant within the respective group as in the case of the general polygon. The calculation of the calculation representative point is easily obtained by the formula of the dividing point. As the distance among the calculation representative points of these elements becomes equal within each group, these calculation representative points form lattice points within each group. The same things can be said about the parallel quadrilateral polygon.

In the present invention, the intersection deciding number is reduced by the ray-casting method with the sue of the coherence o the shadow and the illumination intensity domain so as to obtain the illumination intensity value and form-factor value by the direct light by the interpolation calculation. A new interpolation equation which is not dropped in the calculation accuracy by the interpolation calculation is guided. The boundary of the interpolation domain of the shadow main and the illumination intensity (form-factor) is automatically referred with the use of the interpolation equation. The present invention effects the intersection decision with respect to the element of a port sampled within the polygon, obtains the illumination from the intersection decision result and the interpolation domain of the form-factor and can interpolate the interior of the interpolation domain by the ray-casting method which is easier in parallel by the above describe construction, is higher in the efficiency of the parallel effect. The problem can be solved by it.

In order to satisfy the requirements which are important in the interpolation, do not drop in the calculation precision if the interpolation equation is used, are improved in higher speed, the interpolation equation where the attenuation of the light through the distance is considered, the calculation precision is equivalent to the former calculation equation, especially conditions where the distance from the calculation representative point of the patch (element) having the light source and the maximum non-radiation energies to the element which becomes a target is far are satisfied, so that an interpolation equation whose former interpolation equation is simplified is newly introduced.

The experiment result realized as the computer program in accordance with the construction of the above described invention is shown in Table 4 and FIG. 27. As seven boxes are placed in a room of 4.8×4.8×3.2 (m³) as the data used for experiments, a computer used for experiments are Solbourne series 5/600. The indirect light calculation is effected by 10 number of patch numbers. In the Table 4, Normal is the processing result by the conventional ray-casting method, Sampling is effected by the method of the present invention. It is found out from the result of the experiment that the processing speed is faster at speed 2.6–11.9 times. The difference of the fast speed is caused from the difference of the element number per one patch. The calculation precision almost remain before as clear from FIG. 27. The element of 87.3 through 97.5% stays within 10% in error. The triangle illumination intensity mapping apparatus and the square illumination intensity mapping apparatus in the present invention is provided where the basic bottom is locally fixed for each polygon with respect to the triangle polygon and the general square polygon, the point of the internal portion is shown with the basic bottom vector, the coordinates in the illumination intensity distribution space can be calculated easily by the conversion of the basic bottom vector into the normalized illumination intensity distribution space, the illumination intensity value in the internal point in accordance with the coordinates can be calculated, the illumination intensity mapping can be effected with precision and high speed, and further improvements are easier to effect.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

TABLE 1

| discrimination number | 1 | 2 | 3 | 4 | 5 | 6 |
|---|---|---|---|---|---|---|
| (m,i) | (1,1) | (2,1) | (3,1) | (4,1) | (2,2) | (3,2) |
| discrimination number | 7 | 8 | 9 | 10 | | |
| (m,i) | (4,2) | (3,3) | (4,3) | (4,4) | | |

TABLE 2

| discrimination number | 11 | 12 | 13 | 14 | 15 | 16 |
|---|---|---|---|---|---|---|
| (m,i) | (2,1) | (3,1) | (4,1) | (3,2) | (4,2) | (4,3) |

TABLE 3

| discrimination number | 1 | 2 | 3 | 4 | 5 | 6 |
|---|---|---|---|---|---|---|
| (m,i) | (1,1) | (2,1) | (3,1) | (2,2) | (3,2) | (3,3) |

TABLE 4

| discrimination number | 7 | 8 | 9 | 10 |
|---|---|---|---|---|
| (i) | (1) | (2) | (3) | (4) |

TABLE 5

| | 51 | | | |
|---|---|---|---|---|
| The number of polygons | | | | |
| Patch size (cm) | 40 | 80 | 40 | 80 |
| The number of patches | 1256 | 320 | 1256 | 320 |
| Element size (cm) | 4 | 4 | 8 | 8 |
| The number of elements | 125450 | 125450 | 31368 | 31368 |
| Sampling direct CPU time (sec) | 33.69 | 21.02 | 22.35 | 10.30 |
| Normal direct CPU time (sec) | 229.02 | 250.42 | 59.45 | 59.35 |
| Sampling interreflection CPU time (sec) | 2231.93 | 353.68 | 1440.35 | 193.95 |
| Normal interreflection CPU time (sec) | 14189.10 | 3974.23 | 3723.62 | 945.73 |
| Sampling total CPU time (sec) | 2290.17 | 398.45 | 1469.05 | 210.60 |
| Normal total CPU time (sec) | 14445.93 | 4248.95 | 3789.18 | 1011.23 |
| Total time ratio Normal/Sampling | 6.4 | 10.7 | 2.6 | 4.8 |
| Mean value by Normal | 5.062 | 5.047 | 5.155 | 5.136 |
| Standard deviation of error | 0.200 | 0.235 | 0.059 | 0.133 |

What is claimed is:

1. An image producing apparatus for generating images using the distribution of illumination intensity values on a surface of an object consisting of quadrangle polygons, triangle polygons, or parallelogram polygons in a three dimensional space, said apparatus comprising:

a patch producing apparatus for producing two pairs of the same size parallelogram patches and the same size quadrangle patches from a quadrangle polygon, the same size triangle patches from a triangle polygon, or the same size parallelogram patches from a parallelogram polygon;

an element producing apparatus for producing two pairs of the same size parallelogram elements and the same size quadrangle elements from a quadrangle patch, the same size triangle elements and the same size parallelogram elements from a triangle patch, or the same size parallelogram elements from a parallelogram patch;

an illumination intensity interpolation domain deciding apparatus which selects sample elements in a patch and decides whether an element in the patch belongs to the interpolation domain which can be gotten the illumination intensity or the domain of shadows which can not be gotten the illumination intensity in accordance with the results of intersection decisions for said sample elements;

an illumination intensity interpolation calculating apparatus which calculates two radiosity values, $B_1$ and $B_3$ obtained from a light source for two elements in said interpolation domain with calculation representative points $R_1$ and $R_3$, decides whether a condition of $$\text{(Min-threshold)} \leq \frac{\min(\|\overline{R_1L}\|,\|\overline{R_3L}\|)}{\overline{R_1R_3}} \quad (1)$$

is satisfied or not, where "||·||" represents the length of a vector, and calculates a radiosity value $B_2$ obtained from the light source for a element with a calculation representative point $R_2$ which has the relation of $$R_2L = tR_1L + (1-t)R_3L$$

with using the roughly approximate interpolation equation if said condition is satisfied, or with using the accurately approximate interpolation equation if said condition is not satisfied;

a radiation method deciding apparatus which selects the patch with the maximum unshot energy, calculates the distance between the calculation representative point of the patch with the maximum unshot energy and the calculation representative point of a patch receiving the unshot energy from the patch with the maximum unshot energy and area values of the patch with the maximum unshot energy and the patch receiving the unshot energy, decides whether the condition that the ratio of said distance to the larger area value of said two area values is smaller than the threshold value is satisfied or not, and decides whether the radiation from the patch with the maximum unshot energy to the patch receiving the unshot energy is carried out with dividing the patch with the maximum unshot energy into elements or not dividing according to the consequence of the decision for said condition;

a form-factor interpolation domain deciding apparatus which selects sample elements in a patch receiving the unshot energy and decides whether an element in the patch belongs to the interpolation domain for form-factor calculation which can be gotten the unshot energy or the shadow domain for form-factor calculation which can not be gotten the unshot energy in accordance with the results of the intersection decisions for said sample elements;

a form-factor interpolation calculating apparatus which calculates two form-factor values, $F_{ij1}$ and $F_{ij3}$ for two elements in said interpolation domain for form-factor calculation, $j_1$ and $j_3$, with calculation representative points $R_1$ and $R_3$ that are obtained from the relation with patch (element) i with the calculation representative point S and the normal vector $N_i$, decides whether two conditions of $$\text{(Min-threshold1)} \leq \frac{N_i \cdot \overline{R_3S}}{N_i \cdot \overline{R_1S}} \leq \text{(Max-threshold1)} \quad (2)$$

and $$\text{(Min-threshold2)} \leq \frac{\min(\|\overline{R_1S}\|,\|\overline{R_3S}\|)}{\overline{R_1R_3}} \quad (3)$$

are satisfied or not, where "·" represents inner product, calculates a form-factor value $F_{ij2}$ for a element $j_2$ with a calculation representative point $R_2$ which has the relation of $$R_2S = tR_1S + (1-t)R_3S$$

with using one of 4 interpolation equations classified by approximation levels according to the consequence of the satisfactions for said conditions, and calculates the radiosity value for an element obtained from the patch with the maximum unshot energy with using the form-factor value for the element;

an illumination intensity mapping apparatus which calculates a coordinates value at a point on the illumination intensity distribution space that is the direct product space consisting of a position on a surface and a illumination intensity at the position obtained from the calculation on said illumination intensity interpolation calculating apparatus and said radiosity calculating apparatus from coordinates values of the point and vertices of the polygon including the point on the 3 dimensional space, and outputs the illumination intensity value of the coordinates value at the point on the illumination intensity distribution space to the displaying apparatus.

2. The apparatus as claimed in claim 1, wherein said patch producing apparatus for producing patches by the equal division of the respective sides of the quadrangle polygon and the diagonal lines with a decomposition number corresponding to calculation precision with respect to the quadrangle polygon, and by the division thereof with line segments for connecting equally dividing points on the respective sides with corresponding equally dividing points on the diagonal lines, for producing patches by the equal division of the respective sides of the triangle polygon with the decomposition number corresponding to the calculation precision with respect to the triangle polygon, by the division thereof with line segments for connecting the corresponding equally dividing points among the adjacent sides of the triangle polygon, for producing patches by the equal division of the sides of the respective sets, with two decomposition numbers corresponding to the calculation precision opposite two sets of respective sides of the parallelogram polygon with respect to the parallelogram polygon, and by the division thereof with the line segments for connecting the corresponding equally dividing points of the opposite sides, in obtaining the radiosity values on the polygon surfaces when a shape in the three dimensional space is defined with a quadrangle polygon, triangle polygon, a parallelogram polygon, where radiosity values are calculated in accordance with patches produced by the patch producing apparatus.

3. The apparatus as claimed in claim 1, wherein said element producing apparatus for producing elements, by the division of the polygon into quadrangle patches, by the equal division of the respective sides of the square polygon and one of the diagonal lines with a decomposition number corresponding to calculation precision with respect to the quadrangle patch, and by the division thereof with line segments for connecting the equally dividing points on the respective sides with corresponding equally dividing points on the diagonal lines, in obtaining the radiosity values on the polygon surfaces when a shape in the three dimensional space is defined with a polygon, where radiosity values are calculated in accordance with elements produced by the element producing apparatus.

4. The apparatus as claimed in claim 1, wherein said element producing apparatus for producing elements, by the division of the polygon into triangles, by the equal division of the respective sides of the triangle patch with the decomposition number corresponding to the calculation precision, by the division thereof with line segments for connecting the equally dividing points of the side opposite to the reference point with the equally dividing points corresponding to each of the remaining sides with the reference point from the triangle vertex being fixed by one, in obtaining the radiosity values on the polygon surfaces when a shape in the three dimensional space is defined with a polygon, where radiosity values are calculated in accordance with elements produced by the element producing apparatus.

5. The apparatus as claimed in claim 1, wherein said element producing apparatus for producing elements by the equal division of the respective sides of the square patch and the diagonal lines with a decomposition number corresponding to calculation precision with respect to the quadrangle patch, by the division thereof with line segments for connecting the equally dividing points on the respective sides with the corresponding equally dividing points on the diagonal lines, for producing elements by the equal division of the respective sides of the triangle patch with the decomposition number corresponding to the calculation precision with respect to the triangle patch, by the division thereof with line segments for connecting the equally dividing points of the sides opposite to the reference point with the equally dividing points corresponding to each of the remaining sides with the reference point from the triangle vertex being fixed by one, for producing elements by the equal division of the respective sides of the parallelogram patch with the decomposition number corresponding to the calculation precision with respect to the patch upon the parallelogram and by the division thereof with the line segments for connecting the corresponding equally dividing points of the opposite sides, in obtaining the radiosity values on the polygon surfaces when a shape in the three dimensional space is defined with a polygon, where radiosity values are calculated in accordance with elements produced by the element producing apparatus.

6. The apparatus as claimed in claim 1, wherein said illumination intensity interpolation domain deciding apparatus which selects a sample element for each group with respect to a group of a parallel quadrilateral element arranged in a triangle shape which can be made when the triangle patch has been element-divided, and a group of a triangle element arranged in a straight line shape, effects an interpolation decision upon the sample element, decides an element belonging to the interpolation domain of the illumination intensity and the domain of the shadow for each group in accordance with the intersection decision result, where a radiosity value is calculated with respect to the interpolation domain of the illumination intensity to be decided by the illumination intensity interpolation domain deciding apparatus.

7. The apparatus as claimed in claim 1, wherein said illumination intensity interpolation domain deciding apparatus which selects a sample element for each group with respect to a group of a quadrangle element arranged in a diagonal line which can be made when quadrangle patch has been element-divided, and a group of two parallel quadrilateral elements arranged in a triangle shape, effects an interpolation decision upon the sample element, decides an element belonging to the interpolation domain of the illumination intensity and an element belonging to the domain of the shadow for each group in accordance with the intersection decision result, where a radiosity value is calculated with respect to the interpolation domain of the illumination intensity to be decided by the illumination intensity interpolation domain deciding apparatus.

8. The apparatus of claim 1, wherein the roughly approximate interpolation equation in said illumination intensity interpolation calculating apparatus is given the equation below for a point light source:

$$B_2 = tB_1 + (1-t)B_3 \tag{4}$$

9. The apparatus of claim 1, wherein the roughly approximate interpolation equation in said illumination intensity interpolation calculating apparatus is given equations below for a direction dependent point light source:

if $G_1 \neq 0$ and $G_3 \neq 0$, $\quad(5)$ $$B_2 = G_2 \left\{ t \frac{B_1}{G_1} + (1-t) \frac{B_3}{G_3} \right\},$$

if $G_1 = 0$ and $G_3 \neq 0$, $\quad(6)$ $$B_2 = G_2 \left\{ t \frac{pr_1 \cdot N}{\|r_1\|(c_0 + c_1\|r_1\| + c_2\|r_1\|^2)} + (1-t) \frac{B_3}{G_3} \right\},$$

if $G_1 \neq 0$ and $G_3 = 0$, $\quad(7)$ $$B_2 = G_2 \left\{ t \frac{B_1}{G_1} + (1-t) \frac{pr_3 \cdot N}{\|r_3\|(c_0 + c_1\|r_3\| + c_2\|r_3\|^2)} \right\},$$

if $G_1 = 0$ and $G_3 = 0$, $\quad(8)$ $$B_2 = G_2 \left\{ t \frac{pr_1 \cdot N}{\|r_1\|(c_0 + c_1\|r_1\| + c_2\|r_1\|^2)} + (1-t) \frac{pr_3 \cdot N}{\|r_3\|(c_0 + c_1\|r_3\| + c_2\|r_3\|^2)} \right\},$$

where N is the normal vector of the element, $c_0$, $c_1$, and $c_2$ are constant values determined by the decrement of the space, $\tau_1 = R_1 L$, $\tau_2 = R_2 L$, $\tau_3 = R_3 L$, each $G_1$, $G_2$, and $G_3$ is the light intensity from the light source toward $R_1$, $R_2$, and $R_3$ and p is the reflection constant of an element.

10. The apparatus of claim 1, wherein the accurately approximate interpolation equation in said illumination intensity interpolation calculating apparatus is given the equation below for a point light source:

$$B_2 = t \frac{\|r_2\|(c_0 + c_1\|r_1\| + c_2\|r_1\|^2)}{\|r_2\|(c_0 + c_1\|r_2\| + c_2\|r_2\|^2)} B_1 + \tag{9}$$

$$(1-t) \frac{\|r_3\|(c_0 + c_1\|r_3\| + c_2\|r_3\|^2)}{\|r_2\|(c_0 + c_1\|r_2\| + c_2\|r_2\|^2)} B_3,$$

where $c_0$, $c_1$, and $c_2$ are constant values determined by the decrement of the space, $\tau_1 = R_1 L$, $\tau_2 = R_2 L$, $\tau_3 = R_3 L$, 11. The apparatus of claim 1, wherein the accurately approximate interpolation equation in said illumination intensity interpolation calculating apparatus is given equations below for a direction dependent point light source:

if $G_1 \neq 0$ and $G_3 \neq 0$, (10)

$$B_2 = t \frac{G_2\|r_1\|(c_0 + c_1\|r_1\| + c_2\|r_1\|^2)}{G_1\|r_2\|(c_0 + c_1\|r_2\| + c_2\|r_2\|^2)} B_1 + (1-t) \frac{G_2\|r_3\|(c_0 + c_1\|r_3\| + c_2\|r_3\|^2)}{G_3\|r_2\|(c_0 + c_1\|r_2\| + c_2\|r_2\|^2)} B_3,$$

if $G_1 = 0$ and $G_3 \neq 0$, (11)

$$B_3 = \frac{G_2}{\|r_2\|(c_0 + c_1\|r_2\| + c_2\|r_2\|^2)} \left\{ tpr_1 \cdot N + (1-t) \frac{\|r_3\|(c_0 + c_1\|r_3\| + c_2\|r_3\|^2)}{G_3} B_3 \right\},$$

if $G_1 \neq 0$ and $G_3 = 0$, (12)

$$B_2 = \frac{G_2}{\|r_2\|(c_0 + c_1\|r_2\| + c_2\|r_2\|^2)} \left\{ t \frac{\|r_1\|(c_0 + c_1\|r_1\| + c_2\|r_1\|^2)}{G_1} B_1 + (1-t)pr_3 \cdot N \right\},$$

if $G_1 = 0$ and $G_3 = 0$, (13)

$$B_2 = \frac{G_2}{\|r_2\|(c_0 + c_1\|r_2\| + c_2\|r_2\|^2)} \{tpr_1 \cdot N + (1-t)pr_3 \cdot N\},$$

where N is the normal vector of the element, $c_0$, $c_1$, and $c_2$ are constant values determined by the decrement of the space, $\tau_1 = R_1 L$, $\tau_2 = R_2 L$, $\tau_3 = R_3 L$, each $G_1$, $G_2$, and $G_3$ is the light intensity from the light source toward $R_1$, $R_2$, and $R_3$ and p is the reflection constant of an element.

12. The apparatus of claim 1, wherein said form-factor interpolation domain deciding apparatus which, when said condition in said radiation method deciding apparatus is satisfied, selects sample elements in the patch receiving the unshot energy from the patch with the maximum unshot energy, decides whether the sample elements can be obtained the unshot energy or not according to two values of a inner product between the vector, whose starting point is the calculation representative point of the patch with the maximum unshot energy and end point is the calculation representative point of the sample element, and the normal vector of the patch with the maximum unshot energy and a inner product between said vector and the normal vector of the patch receiving the unshot energy, decides whether there is an object interfering the arrival for the unshot energy between the patch with the maximum unshot energy and the sample element or not by the intersection decision, determines the interpolation domain and the shadow domain according to the results of said decisions, and decisions whether an element in the patch receiving the unshot energy belongs to the interpolation domain or the shadow domain.

13. The apparatus of claim 1, wherein said form-factor interpolation domain deciding apparatus which, when said condition in said radiation method deciding apparatus is satisfied, divides the patch with the maximum unshot energy into elements, selects sample elements in the patch receiving the unshot energy from an element in the patch with the maximum unshot energy, decides whether the sample element in the patch receiving the unshot energy can be obtained the unshot energy or not according to two values of a inner product between the vector, whose starting point is the calculation representative point of the element in the patch with the maximum unshot energy and end point is the calculation representative point of the sample element in the patch receiving the unshot energy, and the normal vector of the patch with the maximum unshot energy and a inner product between said vector and the normal vector of the patch receiving the unshot energy, decides whether there is an object interfering the arrival for the unshot energy between the element in the patch with the maximum unshot energy and the sample element or not by the intersection decision, determines the interpolation domain and the shadow domain according to the results of said decisions, and decides whether an element in the patch receiving the unshot energy belongs to the interpolation domain or the shadow domain.

14. The apparatus of claim 1, wherein said form-factor interpolation domain deciding apparatus which, when said condition in said radiation method deciding apparatus is satisfied, divides the patch with the maximum unshot energy into elements, selects sample elements in the patch with the maximum unshot energy, selects sample elements in the patch receiving the unshot energy from an element in the patch with the maximum unshot energy, for each fixed sample element in the patch receiving the unshot energy and every sample elements in the patch with the maximum unshot energy, repeats the operation below;

deciding whether the fixed sample element in the patch receiving the unshot energy can be obtained the unshot energy or not according to two values of a inner product between the vector, whose starting point is the calculation representative point of the element in the patch with the maximum unshot energy and end point is the calculation representative point of the fixed sample element, and the normal vector of the patch with the maximum unshot energy and a inner product between said vector and the normal vector of the patch receiving the unshot energy;

deciding whether there is an object interfering the arrival for the unshot energy between the element in the patch with the maximum unshot energy and the sample element or not by the intersection decision;

determining the interpolation domain and the shadow domain according in the patch with the maximum unshot energy to the results of said decisions;

and storing the results of the decision whether an element in the patch with the maximum unshot energy belongs to the interpolation domain or the shadow domain for the fixed sample element;

and decides whether an element in the patch receiving the unshot energy belongs to the interpolation domain or the shadow domain for every elements in the patch with the maximum unshot energy by said storing results.

15. The apparatus of claim 1, wherein one of 4 interpolation equations classified by approximation levels in said form-factor interpolation calculating apparatus is given the equation below:

if neither the upper condition in said form-factor interpolation calculating apparatus nor the lower condition in said form-factor interpolation calculating apparatus is satisfied, $$F_{ij_2} = \frac{\|r_1\|^4}{\|r_2\|^4} \left\{ t^2 + t(1-t)\frac{N_i \cdot r_3}{N_i \cdot r_1} \right\} F_{ij_1} + \frac{\|r_3\|^4}{\|r_2\|^4} \left\{ (1-t)^2 + t(1-t)\frac{N_i \cdot r_1}{N_i \cdot r_3} \right\} F_{ij_3}, \quad (14)$$

where $\tau_1 = R_1 S$, $\tau_2 = R_2 S$, $\tau_3 = R_3 S$.

16. The apparatus of claim 1, wherein one of 4 interpolation equations classified by approximation levels in said form-factor interpolation calculating apparatus is given the equation below:

if the upper condition in said form-factor interpolation calculating apparatus is satisfied but the lower condition in said form-factor interpolation calculating apparatus is not satisfied, $$F_{ij_2} = \frac{\|r_1\|^4}{\|r_2\|^4} t F_{ij_1} + \frac{\|r_3\|^4}{\|r_2\|^4} (1-t) F_{ij_2}, \quad (15)$$

where $\tau_1 = R_1 S$, $\tau_2 = R_2 S$, $\tau_3 = R_3 S$.

17. The apparatus of claim 1, wherein one of 4 interpolation equations classified by approximation levels in said form-factor interpolation calculating apparatus is given the equation below:

if the upper condition in said form-factor interpolation calculating apparatus is not satisfied but the lower condition in said form-factor interpolation calculating apparatus is satisfied, $$F_{ij_1} = \left\{ t^2 + t(1-t)\frac{N_i \cdot r_3}{N_i \cdot r_1} \right\} F_{ij_1} + \left\{ (1-t)^2 + t(1-t)\frac{N_i \cdot r_1}{N_i \cdot r_3} \right\} F_{ij_2}, \quad (16)$$

where $\tau_1 = R_1 S$, $\tau_2 = R_2 S$, $\tau_3 = R_3 S$.

18. The apparatus of claim 1, wherein one of 4 interpolation equations classified by approximation levels in said form-factor interpolation calculating apparatus is given the equation below:

if both the upper condition and the lower condition in said form-factor interpolation calculating apparatus are satisfied, $$F_{ij_2} = t F_{ij_1} + (1-t) F_{ij_3}, \quad (17)$$

where $\tau_1 = R_1 S$, $\tau_2 = R_2 S$, $\tau_3 = R_3 S$.

19. The apparatus of claim 1, wherein the calculation of a coordinates value at a point on the illumination intensity distribution space in said illumination intensity mapping apparatus is given below for a triangle polygon:

when coordinates values of vertices of a triangle polygon ABC on the 3 dimensional space are given $A(a_1,a_2,a_3)$, $B(b_1,b_2,b_3)$, and $C(c_1,c_2,c_3)$, the coordinates value of an internal point of ABC on the 3 dimensional space is given $P(p_1,p_2,p_3)$, and the position coordinates value of the internal point P on the illumination intensity distribution space is given (s,t), if $(b_1-a_1)(c_2-a_2)-(c_1-a_1)(b_2-a_2) \neq 0$, (s,t) is calculated by $$\begin{pmatrix} s \\ t \end{pmatrix} = \frac{1}{(b_1-a_1)(c_2-a_2)-(c_1-a_1)(b_2-a_2)} \begin{pmatrix} c_2-a_2 & a_1-c_1 \\ a_2-b_2 & b_1-a_1 \end{pmatrix} \begin{pmatrix} p_1-a_1 \\ p_2-a_2 \end{pmatrix}, \quad (18)$$

if $(b_1-a_1)(c_3-a_3)-(c_1-a_1)(b_3-a_3) \neq 0$, (s,t) is calculated by $$\begin{pmatrix} s \\ t \end{pmatrix} = \frac{1}{(b_1-a_1)(c_3-a_3)-(c_1-a_1)(b_3-a_3)} \begin{pmatrix} c_3-a_3 & a_1-c_1 \\ a_3-b_3 & b_1-a_1 \end{pmatrix} \begin{pmatrix} p_1-a_1 \\ p_3-a_3 \end{pmatrix}, \quad (19)$$

if $(b_2-a_2)(c_3-a_3)-(c_2-a_2)(b_3-a_3) \neq 0$, (s, t) is calculated by $$\begin{pmatrix} s \\ t \end{pmatrix} = \frac{1}{(b_2-a_2)(c_3-a_3)-(c_2-a_2)(b_3-a_3)} \begin{pmatrix} c_3-c_3 & c_2-c_2 \\ c_3-b_3 & b_2-c_2 \end{pmatrix} \begin{pmatrix} p_2-a_2 \\ p_3-c_3 \end{pmatrix}, \quad (20)$$

and otherwise there is no answer for (s,t), and the point is given the illumination intensity value at the closest position for (s,t) on the illumination distribution in ABC as the illumination intensity at the point or is given the value interpolated of illumination intensity values in the neighborhood for (s,t) on the illumination distribution in ABC as the illumination intensity at the point.

20. The apparatus of claim 1, wherein the calculation of a coordinates value at a point on the illumination intensity distribution space in said illumination intensity mapping apparatus is given below for a quadrangle polygon:

when coordinates values of vertices of a quadrangle polygon ABCD on the 3 dimensional space are given $A(a_1,a_2,a_3)$, $B(b_1,b_2,b_3)$, $C(c_1,c_2,c_3)$, and $D(d_1,d_2,d_3)$, the normal vector of ABCD is given $N=(N_x, N_y, N_z)$, the coordinates value of an internal point of ABCD on the 3 dimensional space is given $X(x_1, x_2, x_3)$, and the position coordinates value of the internal point P on the illumination intensity distribution space is given (s+t,t) if X exists in the triangle ABC, (s,s) if X exists on the line segment AC, or (s,s+r) if X exists in the triangle ACD; deciding the maximum value of $N_x$, $N_y$, $N_z$;

when $N_x$ is the maximum value and $c_2-a_2=0$, deciding that X exists in the triangle ABC if $(x_2-a_2)(b_2-a_2)>0$, X exists on the line segment AC if $x_2-a_2=0$, and X exists in the triangle ACD $(x_2-a_2)(d_2-a_2)>0$ and when $N_x$ is the maximum value and $c_2-a_2\neq 0$, deciding that X exists in the triangle ABC if $$\left\{ \frac{c_3-a_3}{c_2-a_2}(x_2-a_2)-(x_3-a_3) \right\} \left\{ \frac{c_3-a_3}{c_2-a_2}(b_2-a_2)-(b_3-a_3) \right\} > 0,$$

$$\left\{ \frac{c_2-a_2}{c_1-a_1}(x_1-a_1)-(x_2-a_2) \right\} \left\{ \frac{c_2-a_2}{c_1-a_1}(d_1-a_1)-(d_2-a_2) \right\} > 0;$$

X exists on the line segment AC if $$\begin{cases} \frac{c_3-a_3}{c_2-a_2}(x_2-a_2)-(x_3-a_3)=0, \\ \frac{c_3-a_3}{c_2-a_2}(x_2-a_2)-(x_3-a_3) \end{cases} \left\{ \frac{c_3-a_3}{c_2-a_2}(d_2-a_2)-(d_3-a_3) \right\} > 0;$$

and X exists in the triangle ACD if when $N_y$ is the maximum value and $c_1-a_1=0$, deciding that X exists in the triangle ABC if $(x_1-a_1)(b_1-a_1)>0$, X exists on the line segment AC if $x_1-a_1=0$, and X exists in the triangle ACD $(x_1-a_1)(d_1-a_1)>0$, and when $N_y$ is the maximum value and $c_1-a_1\neq 0$ deciding that X exists in the triangle ABC if $$\left\{ \frac{c_3-a_3}{c_1-a_1}(x_1-a_1)-(x_3-a_3) \right\} \left\{ \frac{c_3-a_3}{c_1-a_1}(b_1-a_1)-(b_3-a_3) \right\} > 0,$$

X exists on the line segment AC if $$\frac{c_3-a_3}{c_1-a_1}(x_1-a_1)-(x_3-a_3)=0,$$

and X exists in the triangle ACD if $$\left\{ \frac{c_3-a_3}{c_1-a_1}(x_1-a_1)-(x_3-a_3) \right\} \left\{ \frac{c_3-a_3}{c_1-a_1}(d_1-a_1)-(d_3-a_3) \right\} > 0;$$

when $N_z$ is the maximum value and $c_1-a_1=0$, deciding that X exists in the triangle ABC if $(x_1-a_1)(b_1-a_1)>0$, X exists on the line segment AC if $x_1-a_1=0$, and X exists in the triangle ACD $(x_1-a_1)(d_1-a_1)>0$, and when $N_z$ is the maximum value and $c_1-a_1\neq 0$, deciding that X exists in the triangle ABC if $$\left\{ \frac{c_2-a_2}{c_1-a_1}(x_1-a_1)-(x_2-a_2) \right\} \left\{ \frac{c_2-a_2}{c_1-a_1}(b_1-a_1)-(b_2-a_2) \right\} > 0,$$

X exists on the line segment AC if $$\frac{c_2-a_2}{c_1-a_1}(x_1-a_1)-(x_2-a_2)=0,$$

and X exists in the triangle ACD if when X exists in the triangle ABC, if $$(c_1-a_1)(b_2-a_2)-(b_1-a_1)(c_2-a_2)\neq 0,$$

s and t are calculated by $$\binom{s}{t} = \frac{1}{(c_1-a_1)(b_2-a_2)-(b_1-a_1)(c_2-a_2)} \begin{pmatrix} b_2-a_2 & a_1-b_1 \\ a_2-c_2 & c_1-a_1 \end{pmatrix} \begin{pmatrix} x_1-a_1 \\ x_2-a_2 \end{pmatrix}, \quad (21)$$

if $(c_1-a_1)(b_3-a_3)-(b_1-a_1)(c_3-a_3) \neq 0$, s and t are calculated by $$\binom{s}{t} = \frac{1}{(c_1-a_1)(b_3-a_3)-(b_1-a_1)(c_3-a_3)} \begin{pmatrix} b_3-a_3 & a_1-b_1 \\ a_3-c_3 & c_1-a_1 \end{pmatrix} \begin{pmatrix} x_1-a_1 \\ x_3-a_3 \end{pmatrix}, \quad (22)$$

if $(c_2-a_2)(b_3-a_3)-(b_2-a_2)(c_3-a_3) \neq 0$, s and t are calculated by $$\binom{s}{t} = \frac{1}{(c_2-a_2)(b_3-a_3)-(b_2-c_2)(c_3-a_3)} \begin{pmatrix} b_3-c_3 & c_3-b_2 \\ a_3-c_3 & c_2-a_2 \end{pmatrix} \begin{pmatrix} x_3-a_2 \\ x_3-a_3 \end{pmatrix}, \quad (23)$$

and otherwise there is no answer for s and t;
when X exists on the line segment AC, if $c_1-a_1 \neq 0$, s is calculated by $$s = \frac{x_1-a_1}{c_1-a_1}, \quad (24)$$

if $c_2-a_2 \neq 0$ s is calculated by $$s = \frac{x_2-a_2}{c_2-a_2}, \quad (25)$$

if $c_3-a_3 \neq 0$, s is calculated by $$s = \frac{x_3-a_3}{c_3-a_3}, \quad (26)$$

and otherwise there is no answer for s;
when X exists in the triangle ACD, if
s and r are calculated by $(c_1-a_1)(d_2-a_2)-(d_2-a_2)(d_1-a_1)(a_2-a_2) \neq 0$, $$\binom{s}{r} = \frac{1}{(c_1-a_1)(d_2-a_2)-(d_1-a_1)(c_2-a_2)} \begin{pmatrix} d_2-c_2 & c_1-d_1 \\ c_2-c_2 & c_1-a_1 \end{pmatrix} \begin{pmatrix} x_1-a_1 \\ x_2-c_2 \end{pmatrix}, \quad (27)$$

if $(c_1-a_1)(d_3-a_3)-(d_1-a_1)(c_3-a_3) \neq 0$, s and r are calculated by $$\binom{s}{r} = \frac{1}{(c_1-a_1)(d_3-a_3)-(d_1-a_1)(c_3-a_3)} \begin{pmatrix} d_3-c_3 & c_1-d_1 \\ c_3-c_3 & c_1-a_1 \end{pmatrix} \begin{pmatrix} x_1-a_1 \\ x_3-c_3 \end{pmatrix}, \quad (28)$$

if $(c_2-a_2)(d_3-a_3)-(d_2-a_2)(c_3-c_3) \neq 0$, s and r are calculated by $$\binom{s}{r} = \frac{1}{(c_2-a_2)(d_3-a_3)-(d_2-c_2)(c_3-c_3)} \begin{pmatrix} d_3-a_3 & a_2-d_2 \\ a_3-c_3 & c_2-a_2 \end{pmatrix} \begin{pmatrix} x_2-c_2 \\ x_3-c_3 \end{pmatrix}, \quad (29)$$

and otherwise there is no answer for s and r;
the point X is given the illumination intensity value at the closest position for X on the illumination distribution in ABCD as the illumination intensity at the point or is given the value interpolated of illumination intensity values in the neighborhood for X on the illumination distribution in ABCD as the illumination intensity at the point.

21. The apparatus of claim 1, wherein the calculation of a coordinates value at a point on the illumination intensity distribution space in said illumination intensity mapping apparatus is given below for a triangle polygon:

when local coordinates values of vertices of a triangle polygon ABC as a 2 dimensional manifold on the 3 dimensional space are given $A(u_A,v_A)$, $B(u_B,v_B)$, and $C(u_C,v_C)$, the local coordinates value of an internal point of ABC is given $P(u_P,v_P)$, and the position coordinates value of P on the illumination intensity distribution space is given (s,t), if $(u_B-u_A)(v_C-v_A)-(u_C-u_A)(v_B-v_A) \neq 0$, (s,t) is calculated by $$\binom{s}{t} = \frac{1}{(u_B-u_A)(v_C-v_A)-(u_C-u_A)(v_B-v_A)} \begin{pmatrix} v_C-v_A & u_A-u_C \\ v_A-v_B & u_B-u_A \end{pmatrix} \begin{pmatrix} u_P-u_A \\ v_P-v_A \end{pmatrix} \quad (30)$$

and otherwise there is no answer for (s,t,) and the point is given the illumination intensity value at the closest position for (s,t) on the illumination distribution in ABC as the illumination intensity at the point or is given the value interpolated of illumination intensity values in the neighborhood for (s,t) on the illumination distribution in ABC as the illumination intensity at the point.

22. The apparatus of claim 1, wherein the calculation of a coordinates value at a point on the illumination intensity distribution space in said illumination intensity mapping apparatus is given below for a quadrangle polygon:

when local coordinates values of vertices of a quadrangle polygon ABCD as a 2 dimensional manifold on the 3 dimensional space are given $A(u_A,v_A)$, $B(u_B,v_B)$, $C(u_C,v_C)$, and $D(u_D,v_D)$, the local coordinates value of an internal point of ABCD is given $X(u_X,v_X)$, and the position coordinates value of the internal point X on the illumination intensity distribution space is given (s+t,t) if X exists in the triangle ABC, (s,s) if X exists on the line segment AC, or (s,s+r) if X exists in the triangle ACD;

when $u_C-u_A=0$, deciding that X exists in the triangle ABC if $(u_X-u_A)(u_B-u_A)>0$, X exists on the line segment AC if $u_X-u_A=0$, and X exists in the triangle ACD $(X_X-U_A)(U_D-U_A)>0$ and when $u_c-u_A \neq 0$, deciding that X exists in the triangle ABC if $$\left\{ \frac{v_C-v_A}{u_C-u_A}(u_X-u_A)-(v_X-v_A) \right\} \left\{ \frac{v_C-v_A}{u_C-u_A}(u_B-u_A)-(v_B-v_A) \right\} > 0,$$

X exists on the line segment AC if $$\frac{v_C-v_A}{u_C-u_A}(u_X-u_A)-(v_X-v_A)=0,$$

and X exists in the triangle ACD if $$\left\{ \frac{v_C-v_A}{u_C-u_A}(u_X-u_A)-(v_X-v_A) \right\} \left\{ \frac{v_C-v_A}{u_C-u_A}(u_D-u_A)-(v_D-v_A) \right\} > 0;$$

when X exists in the triangle ABC, if $$(u_C-u_A)(v_B-v_A)-(u_B-u_A)(v_C-v_A) \neq 0,$$

s and t are calculated by $$\binom{s}{t} = \frac{1}{(u_C-u_A)(v_B-v_A)-(u_B-u_A)(v_X-v_A)} \begin{pmatrix} v_B-v_A & u_A-u_B \\ v_A-v_C & u_C-u_A \end{pmatrix} \begin{pmatrix} u_X-u_A \\ v_X-v_A \end{pmatrix}, \quad (31)$$

and otherwise there is no answer for s and t;
when X exists on the line segment AC, if $u_C-u_A+0$ and $v_C-v_A \neq 0$, s is calculated by $$s = \frac{v_X-v_A}{v_C-v_A}, \quad (32)$$

if $u_C-u_A \neq 0$, s is calculated by $$s = \frac{u_X-u_A}{u_C-u_A}, \quad (33)$$

and otherwise there is no answer for s;
when X exists in the triangle ACD, if $$(u_C-u_A)(u_D-u_A)-(u_D-u_A)(v_C-v_A) \neq 0,$$

s and r are calculated by $$\binom{s}{t} = \frac{1}{(u_C-u_A)(v_D-v_A)-(u_D-u_A)(v_X-v_A)} \begin{pmatrix} v_D-v_A & u_A-u_D \\ v_A-v_C & u_C-u_A \end{pmatrix} \begin{pmatrix} u_X-u_A \\ v_X-v_A \end{pmatrix}, \quad (34)$$

and otherwise there is no answer for s and z;

the point X is given the illumination intensity value at the closest position for X on the illumination distribution in ABCD as the illumination intensity at the point or is given the value interpolated of illumination intensity values in the neighborhood for X on the illumination distribution in ABCD as the illumination intensity at the point.

* * * * *